(12) United States Patent
Siegel et al.

(10) Patent No.: US 8,741,402 B2
(45) Date of Patent: Jun. 3, 2014

(54) WEBS WITH SYNERGISTS THAT PROMOTE OR PRESERVE THE DESIRABLE COLOR OF MEAT

(75) Inventors: Dan G. Siegel, Belleville, IL (US); Kevin Philip Nelson, Appleton, WI (US); Ryan Arthur Michaud, Appleton, WI (US)

(73) Assignee: Curwood, Inc., Oshkosh, WI (US)

( * ) Notice: Subject to any disclaimer, the term of this patent is extended or adjusted under 35 U.S.C. 154(b) by 890 days.

(21) Appl. No.: 11/506,322

(22) Filed: Aug. 18, 2006

(65) Prior Publication Data

US 2007/0014953 A1 Jan. 18, 2007

Related U.S. Application Data

(63) Continuation-in-part of application No. PCT/US2005/011387, filed on Apr. 4, 2005, and a continuation-in-part of application No. 11/413,504, filed on Apr. 28, 2006, now Pat. No. 7,867,531, and a continuation-in-part of application No. 11/436,159, filed on May 17, 2006, now Pat. No. 8,110,259, and a continuation-in-part of application No. 11/451,968, filed on Jun. 12, 2006, now Pat. No. 8,029,893, which is a continuation-in-part of application No. PCT/US2005/011387, filed on Apr. 4, 2005.

(60) Provisional application No. 60/559,350, filed on Apr. 2, 2004.

(51) Int. Cl.
*B32B 1/02* (2006.01)
*B32B 1/08* (2006.01)

(52) U.S. Cl.
USPC ....... 428/34.1; 428/34.2; 428/35.7; 428/35.9; 428/36.9

(58) Field of Classification Search
USPC ............... 428/34.1, 34.2, 35.7, 35.9, 36.9
See application file for complete search history.

(56) References Cited

U.S. PATENT DOCUMENTS

| | | | |
|---|---|---|---|
| 2,101,547 A | 12/1937 | Kistler | 99/159 |
| 2,147,261 A | 2/1939 | Lewis | 99/107 |
| 2,417,889 A | 3/1947 | Stammelman | |
| 2,528,204 A | 10/1950 | Zwosta | |
| 2,621,129 A | 12/1952 | Ramsbottom et al. | |
| 2,788,278 A | 4/1957 | Zimont et al. | |
| 2,824,809 A * | 2/1958 | Schoch | 426/264 |

(Continued)

FOREIGN PATENT DOCUMENTS

| | | |
|---|---|---|
| CA | 857827 | 12/1970 |
| CA | 878423 | 8/1971 |

(Continued)

OTHER PUBLICATIONS

Sacharow, S.; Griffin, R.C.; *Food Packaging*; AVI Publishing: Westport, CT, 1970; "Red Meats," pp. 95-119.

(Continued)

*Primary Examiner* — Marc Patterson
(74) *Attorney, Agent, or Firm* — Tom J. Hall

(57) ABSTRACT

Food packaging articles, food packaging webs, and food packaging methods comprising a myoglobin blooming agent and synergist that promote or preserve the desirable appearance of food products are provided. The food contact layer of the packaging webs may comprise a myoglobin blooming agent and a synergist.

80 Claims, 3 Drawing Sheets

(56) References Cited

U.S. PATENT DOCUMENTS

| | | | |
|---|---|---|---|
| 2,863,777 A | 12/1958 | Dekker | |
| 2,895,270 A | 7/1959 | Blaess | |
| 2,902,369 A | 9/1959 | Komarik | 99/159 |
| 2,923,632 A | 2/1960 | Castberg | |
| 2,925,346 A | 2/1960 | Harper et al. | |
| 2,979,410 A | 4/1961 | Parlour | |
| 2,992,600 A | 7/1961 | Lancaster | |
| 3,003,883 A | 10/1961 | Levy | |
| 3,042,532 A | 7/1962 | Daline | |
| 3,047,403 A | 7/1962 | McConnell | |
| 3,134,678 A | 5/1964 | Wierbicki et al. | |
| 3,154,423 A | 10/1964 | Voegeli et al. | |
| 3,215,540 A | 11/1965 | Wierbicki et al. | |
| 3,355,319 A | 11/1967 | Rees | |
| 3,360,381 A | 12/1967 | Tarladgis | |
| 3,361,577 A | 1/1968 | Simon et al. | |
| 3,378,379 A | 4/1968 | Shiner et al. | |
| 3,384,993 A | 5/1968 | Kane | |
| 3,451,827 A | 6/1969 | Bridgeford | |
| 3,456,044 A | 7/1969 | Pahlke | |
| 3,526,521 A | 9/1970 | Komarik | |
| 3,537,864 A | 11/1970 | Magiera | |
| 3,590,528 A | 7/1971 | Shepherd | C08F 3/02 |
| 3,645,757 A | 2/1972 | Gordon et al. | |
| 3,666,488 A | 5/1972 | Nakao et al. | 99/107 |
| 3,713,849 A | 1/1973 | Grindrod et al. | |
| 3,740,236 A | 6/1973 | Baxley | |
| 3,741,253 A | 6/1973 | Brax et al. | |
| 3,814,821 A | 6/1974 | Oliver et al. | |
| 3,821,438 A * | 6/1974 | Brown | 426/266 |
| 3,835,618 A | 9/1974 | Perdue | |
| 3,849,241 A | 11/1974 | Butin et al. | |
| 3,911,146 A | 10/1975 | Hara et al. | 426/265 |
| 3,936,560 A | 2/1976 | Santurri et al. | 428/219 |
| 3,950,919 A | 4/1976 | Perdue | |
| 3,966,045 A | 6/1976 | Perdue | |
| 3,966,974 A | 6/1976 | Bharucha et al. | |
| 4,001,445 A | 1/1977 | Horrocks et al. | |
| 4,001,446 A | 1/1977 | Hood | |
| 4,013,797 A | 3/1977 | Gryczka | |
| 4,053,650 A | 10/1977 | Chino et al. | |
| 4,055,672 A | 10/1977 | Hirsch et al. | |
| 4,064,296 A | 12/1977 | Bornstein et al. | |
| 4,089,983 A | 5/1978 | Hood | |
| RE30,009 E | 5/1979 | Perdue et al. | |
| 4,161,545 A | 7/1979 | Green et al. | |
| 4,196,220 A | 4/1980 | Chiu et al. | |
| 4,289,832 A * | 9/1981 | Schwarz | 521/55 |
| 4,308,289 A | 12/1981 | Huisman et al. | |
| 4,391,862 A | 7/1983 | Bornstein et al. | |
| 4,397,891 A | 8/1983 | Kaelberer et al. | |
| 4,407,897 A | 10/1983 | Farrell et al. | B32B 9/00 |
| 4,416,909 A | 11/1983 | Aversano | 426/265 |
| 4,420,530 A | 12/1983 | Toyoda et al. | B32B 5/16 |
| 4,425,395 A | 1/1984 | Negishi et al. | |
| 4,425,410 A | 1/1984 | Farrell et al. | B32B 9/00 |
| 4,448,792 A | 5/1984 | Schirmer | |
| 4,457,960 A | 7/1984 | Newsome | |
| 4,476,112 A * | 10/1984 | Aversano | 426/268 |
| 4,499,225 A | 2/1985 | Kubo et al. | C08L 91/06 |
| 4,501,758 A | 2/1985 | Morris | |
| 4,510,914 A | 4/1985 | Purser | |
| 4,522,835 A | 6/1985 | Woodruff et al. | |
| 4,543,260 A | 9/1985 | Brotsky | |
| 4,610,914 A | 9/1986 | Newsome | |
| 4,611,456 A | 9/1986 | Gillio-tos et al. | |
| 4,642,239 A | 2/1987 | Ferrar et al. | 426/396 |
| 4,683,139 A * | 7/1987 | Cheng | 426/265 |
| 4,728,518 A | 3/1988 | Gonzalez et al. | |
| 4,737,391 A | 4/1988 | Lustig et al. | |
| 4,753,809 A | 6/1988 | Webb | |
| 4,755,403 A | 7/1988 | Ferguson | |
| 4,755,419 A | 7/1988 | Shah | |
| 4,756,914 A | 7/1988 | Jon et al. | |
| 4,770,944 A | 9/1988 | Farrell et al. | B32B 27/08 |
| 4,781,934 A * | 11/1988 | Shimp et al. | 426/264 |
| 4,792,484 A | 12/1988 | Moritani | B32B 5/16 |
| 4,801,486 A | 1/1989 | Quacquarella et al. | |
| 4,810,541 A | 3/1989 | Newman et al. | |
| 4,818,548 A | 4/1989 | Cheng | |
| 4,877,846 A * | 10/1989 | Chung | 525/369 |
| 4,929,480 A | 5/1990 | Midkiff et al. | |
| 4,929,482 A | 5/1990 | Moritani et al. | B65D 81/26 |
| 4,954,526 A | 9/1990 | Keefer | |
| 4,960,639 A | 10/1990 | Oda et al. | B32B 5/16 |
| 4,962,728 A | 10/1990 | Highfill | 119/3 |
| 4,981,707 A | 1/1991 | Morris | |
| 4,990,184 A | 2/1991 | Dotson et al. | C09D 5/08 |
| 5,039,705 A | 8/1991 | Keefer et al. | |
| 5,047,253 A | 9/1991 | Juhl et al. | |
| 5,055,328 A | 10/1991 | Evert et al. | |
| 5,058,761 A | 10/1991 | Williams | |
| 5,063,644 A | 11/1991 | Herrington et al. | |
| 5,108,804 A | 4/1992 | Oxley et al. | |
| 5,139,700 A | 8/1992 | Miksic et al. | |
| 5,153,038 A | 10/1992 | Koyama et al. | B32B 27/04 |
| 5,155,137 A | 10/1992 | Keefer et al. | |
| 5,209,869 A | 5/1993 | Miksic et al. | |
| 5,221,566 A | 6/1993 | Tokoh et al. | |
| 5,223,311 A | 6/1993 | Tsutsumi et al. | |
| 5,230,915 A | 7/1993 | Shahidi et al. | 426/240 |
| 5,256,458 A | 10/1993 | Oxley et al. | |
| 5,281,471 A | 1/1994 | Diete et al. | |
| 5,288,532 A | 2/1994 | Juhl et al. | |
| 5,301,394 A | 4/1994 | Richardson et al. | |
| 5,317,052 A | 5/1994 | Ohba et al. | |
| 5,352,467 A | 10/1994 | Mitchell et al. | |
| 5,374,457 A | 12/1994 | Juhl et al. | |
| 5,382,391 A | 1/1995 | Juhl et al. | |
| 5,382,470 A | 1/1995 | Vicik | |
| 5,384,149 A | 1/1995 | Lin | |
| 5,393,457 A | 2/1995 | Miksic et al. | |
| 5,405,857 A | 4/1995 | Karup et al. | |
| 5,407,611 A | 4/1995 | Wilhoit et al. | |
| 5,416,131 A | 5/1995 | Wolff et al. | B05D 3/00 |
| 5,425,956 A | 6/1995 | Shahidi et al. | 426/92 |
| 5,442,837 A | 8/1995 | Morgan | |
| 5,443,852 A | 8/1995 | Shahidi et al. | 426/92 |
| 5,472,722 A | 12/1995 | Burger | 426/264 |
| 5,481,852 A | 1/1996 | Mitchell | 53/432 |
| RE35,285 E | 6/1996 | Quacquarella et al. | |
| 5,525,357 A | 6/1996 | Keefer et al. | |
| 5,558,891 A | 9/1996 | Lawless et al. | |
| 5,573,797 A | 11/1996 | Wilhoit | |
| 5,573,800 A | 11/1996 | Wilhoit | |
| 5,573,801 A | 11/1996 | Wilhoit | |
| 5,591,468 A | 1/1997 | Stockley, III et al. | |
| 5,593,747 A | 1/1997 | Georgelos | |
| 5,597,599 A | 1/1997 | Smith et al. | |
| 5,663,002 A | 9/1997 | Schirmer | |
| 5,667,827 A | 9/1997 | Breen et al. | 426/129 |
| 5,711,978 A | 1/1998 | Breen et al. | 426/129 |
| 5,715,945 A | 2/1998 | Chandler | B65D 85/84 |
| 5,759,648 A | 6/1998 | Idlas | |
| 5,759,650 A | 6/1998 | Raines et al. | |
| 5,770,645 A | 6/1998 | Stamler et al. | |
| 5,800,412 A | 9/1998 | Zhang et al. | |
| 5,834,077 A | 11/1998 | Babrowicz | |
| 5,834,098 A | 11/1998 | Kitamura et al. | |
| 5,840,381 A | 11/1998 | Ohtsuka | |
| 5,845,769 A | 12/1998 | Yeager | |
| 5,846,582 A | 12/1998 | Mayfield et al. | |
| 5,855,975 A | 1/1999 | Miksic et al. | |
| 5,866,184 A | 2/1999 | Gorlich et al. | |
| 5,888,528 A | 3/1999 | Wellinghoff et al. | |
| 5,894,040 A | 4/1999 | Foley et al. | B27M 1/08 |
| 5,895,587 A | 4/1999 | Sorensen | |
| 5,916,613 A | 6/1999 | Stockley | |
| 5,928,770 A | 7/1999 | Quinones | |
| 5,937,618 A | 8/1999 | Chandler | B65B 11/52 |
| 5,958,805 A | 9/1999 | Quinones | |
| 5,964,532 A | 10/1999 | St. Phillips et al. | |
| 5,965,264 A | 10/1999 | Barenberg et al. | |
| 5,989,610 A | 11/1999 | Ruzek | 426/281 |

(56) References Cited

U.S. PATENT DOCUMENTS

| | | |
|---|---|---|
| 5,989,613 A | 11/1999 | Buchko |
| 5,994,444 A | 11/1999 | Trescony et al. |
| 6,020,012 A | 2/2000 | Kauffman et al. |
| 6,028,160 A | 2/2000 | Chandler et al. |
| 6,033,599 A | 3/2000 | Lozano et al. |
| 6,033,705 A | 3/2000 | Isaacs |
| 6,042,859 A | 3/2000 | Shaklai |
| 6,046,243 A | 4/2000 | Wellinghoff et al. |
| 6,068,933 A | 5/2000 | Shepard et al. |
| 6,074,715 A | 6/2000 | Lind et al. |
| 6,087,479 A | 7/2000 | Stamler et al. |
| 6,099,881 A | 8/2000 | Hanson ................... 426/263 |
| 6,113,962 A | 9/2000 | Spencer .................. 426/316 |
| 6,143,344 A | 11/2000 | Jon et al. |
| 6,204,223 B1 | 3/2001 | Holmes et al. |
| 6,210,725 B1 | 4/2001 | Colombo ............... B65D 85/00 |
| 6,221,470 B1 | 4/2001 | Ciocca et al. |
| RE37,171 E | 5/2001 | Busche et al. |
| 6,232,434 B1 | 5/2001 | Stamler et al. |
| 6,242,371 B1 | 6/2001 | Quinones |
| 6,270,829 B1 | 8/2001 | Shahlai |
| 6,270,873 B1 | 8/2001 | Darnett |
| 6,287,613 B1 | 9/2001 | Childress et al. |
| 6,299,984 B1 | 10/2001 | Forloni |
| 6,316,067 B1 | 11/2001 | Edwards et al. |
| 6,403,759 B2 | 6/2002 | Stamler et al. |
| 6,409,384 B1 | 6/2002 | Provan et al. |
| 6,420,470 B1 | 7/2002 | Miksic et al. |
| 6,439,770 B2 | 8/2002 | Catchman |
| 6,447,826 B1 | 9/2002 | Matthews ................ 426/126 |
| 6,465,109 B2 | 10/2002 | Ohtsuka ................ B32B 27/32 |
| 6,500,473 B1 | 12/2002 | Koehler et al. |
| 6,511,568 B1 | 1/2003 | Eckstein et al. |
| 6,514,583 B1 | 2/2003 | Ahlgren et al. |
| 6,521,275 B1 | 2/2003 | Mercogliano et al. |
| 6,524,002 B2 | 2/2003 | Tomic |
| 6,527,444 B1 | 3/2003 | Buchman |
| 6,533,962 B1 | 3/2003 | Tulka et al. |
| 6,562,476 B2 | 5/2003 | Shepard et al. |
| 6,565,985 B2 | 5/2003 | Ueyama et al. |
| 6,592,919 B1 | 7/2003 | Matthews et al. |
| 6,602,466 B2 | 8/2003 | Hamilton et al. ......... A61L 9/00 |
| 6,609,827 B2 | 8/2003 | Bois et al. |
| 6,610,392 B1 | 8/2003 | Ramesh et al. |
| 6,616,333 B2 | 9/2003 | Kinigakis et al. |
| 6,617,041 B2 | 9/2003 | Hahn et al. |
| 6,623,773 B2 * | 9/2003 | Meier et al. ............... 426/132 |
| 6,632,021 B2 | 10/2003 | Bois et al. |
| 6,632,785 B2 | 10/2003 | Pfeiffer et al. ........... C11D 3/22 |
| 6,651,874 B1 | 11/2003 | Pedersen |
| 6,663,283 B1 | 12/2003 | Cappel |
| 6,666,580 B2 | 12/2003 | Bois |
| 6,667,082 B2 | 12/2003 | Bamore et al. |
| 6,673,465 B2 | 1/2004 | Lordi |
| 6,673,891 B2 | 1/2004 | Stamler et al. |
| 6,682,825 B1 | 1/2004 | Kennedy et al. |
| 6,689,403 B1 | 2/2004 | Gehring et al. |
| 6,689,460 B2 | 2/2004 | Wen et al. |
| 6,699,549 B1 | 3/2004 | Ueyama et al. |
| 6,706,274 B2 | 3/2004 | Herrmann et al. ......... A61F 2/00 |
| 6,716,464 B1 | 4/2004 | Schlegel et al. ............. 426/312 |
| 6,739,113 B1 | 5/2004 | Kocher et al. |
| 6,749,910 B1 | 6/2004 | Georgelos et al. |
| 6,753,054 B1 | 6/2004 | Lind et al. |
| 6,769,227 B2 * | 8/2004 | Mumpower et al. ............ 53/411 |
| 6,773,820 B1 | 8/2004 | Wilhoit et al. |
| 6,777,046 B1 | 8/2004 | Tatarka et al. |
| 6,815,023 B1 | 11/2004 | Tatarka et al. |
| 6,858,275 B2 | 2/2005 | Ferri et al. |
| 6,861,125 B1 | 3/2005 | Carlson et al. |
| 6,861,127 B2 | 3/2005 | Glawe et al. |
| 6,869,686 B1 | 3/2005 | Idlas |
| 6,875,840 B2 | 4/2005 | Stamler et al. |
| 6,879,027 B2 | 4/2005 | Sato |
| 6,881,430 B2 | 4/2005 | Køhler et al. |
| 6,887,994 B2 | 5/2005 | Stamler et al. |
| 6,939,569 B1 | 9/2005 | Green et al. |
| 6,942,909 B2 | 9/2005 | Shirrell et al. .......... B32B 27/32 |
| 6,942,927 B2 | 9/2005 | Shepard et al. |
| 6,945,402 B1 | 9/2005 | Gueret |
| 6,964,816 B2 | 11/2005 | Schell et al. |
| 7,017,774 B2 | 3/2006 | Haedt |
| 7,018,719 B2 | 3/2006 | Ueyama et al. |
| 7,037,543 B2 | 5/2006 | Sandusky et al. .............. 426/129 |
| 7,335,327 B2 | 2/2008 | Grah et al. |
| 7,422,923 B2 | 9/2008 | Kojima et al. |
| 8,087,479 B2 | 1/2012 | Kulkarni et al. |
| 2001/0055640 A1 | 12/2001 | Meier et al. |
| 2002/0051754 A1 | 5/2002 | Schroeder et al. |
| 2002/0097923 A1 | 7/2002 | Dobreski et al. |
| 2002/0102405 A1 | 8/2002 | Chapman et al. |
| 2002/0119220 A1 | 8/2002 | Costello ................... A23B 4/00 |
| 2002/0172834 A1 * | 11/2002 | Rivett et al. .................... 428/515 |
| 2002/0196987 A1 | 12/2002 | Tilman et al. |
| 2002/0197467 A1 | 12/2002 | Johnson |
| 2003/0017194 A1 | 1/2003 | Joerger et al. |
| 2003/0039724 A1 | 2/2003 | DuCharme et al. ........... 426/135 |
| 2003/0044492 A1 | 3/2003 | Knigge et al. |
| 2003/0116450 A1 * | 6/2003 | Hoddinott .................. 206/213.1 |
| 2003/0203081 A1 | 10/2003 | Saari et al. ................. A61L 9/04 |
| 2003/0235664 A1 | 12/2003 | Merical et al. |
| 2004/0009273 A1 | 1/2004 | Shaklai |
| 2004/0039683 A1 | 2/2004 | Mcgeorge |
| 2004/0076845 A1 | 4/2004 | Albright ................... B32B 5/16 |
| 2004/0097630 A1 * | 5/2004 | Whitman et al. ............. 524/445 |
| 2004/0131805 A1 | 7/2004 | Merical et al. |
| 2004/0137202 A1 | 7/2004 | Hamilton et al. |
| 2004/0151853 A1 | 8/2004 | Shirrell et al. |
| 2004/0166262 A1 | 8/2004 | Busche et al. |
| 2005/0011387 A1 | 1/2005 | Schneider et al. |
| 2005/0019537 A1 | 1/2005 | Nakaishi et al. ......... B32B 27/08 |
| 2005/0059655 A1 | 3/2005 | Garvey et al. |
| 2005/0084636 A1 | 4/2005 | Papenfus et al. |
| 2005/0089607 A1 | 4/2005 | Numata et al. |
| 2005/0106380 A1 | 5/2005 | Gray et al. ................. B32B 5/16 |
| 2005/0129969 A1 | 6/2005 | Schell et al. |
| 2005/0249848 A1 | 11/2005 | Charest et al. |
| 2005/0254731 A1 | 11/2005 | Berbert et al. |
| 2006/0233985 A1 | 10/2006 | Pockat et al. |
| 2006/0246242 A1 | 11/2006 | Siegel et al. |
| 2006/0286323 A1 | 12/2006 | Siegel et al. |
| 2007/0014947 A1 | 1/2007 | Mengel et al. |
| 2007/0014953 A1 | 1/2007 | Siegel et al. |
| 2007/0104901 A1 | 5/2007 | Siegel et al. |
| 2007/0246867 A1 | 10/2007 | Nelson et al. |

FOREIGN PATENT DOCUMENTS

| | | |
|---|---|---|
| CA | 905744 | 7/1972 |
| CA | 1053497 | 5/1979 |
| CA | 1329890 | 5/1994 |
| CA | 2007522 | 3/2000 |
| CA | 2230614 | 4/2001 |
| CA | 2100074 | 8/2003 |
| CA | 2500860 | 12/2009 |
| DE | 2 363 258 A1 | 7/1974 |
| DE | 2 415 659 A1 | 10/1974 |
| DE | 24 51 337 A1 | 8/1975 |
| EP | 0 013 556 A1 | 7/1980 |
| EP | 28113 B1 | 4/1985 |
| EP | 0 172 432 A2 | 2/1986 |
| EP | 0 202 771 A2 | 11/1986 |
| EP | 0120503 | 4/1987 |
| EP | 0 224 990 A1 | 6/1987 |
| EP | 0 364 624 A1 | 4/1990 |
| EP | 0 491 164 A2 | 6/1992 |
| EP | 0 473 091 B1 | 12/1995 |
| EP | 0 662 527 B1 | 5/1997 |
| EP | 1 138 478 A2 | 4/2001 |
| EP | 0 788 319 B1 | 4/2002 |
| FR | 2 634 976 | 2/1990 |
| GB | 1 048 770 | 11/1966 |
| GB | 1 253 449 A | 11/1971 |
| GB | 1 475 994 A | 6/1977 |

(56) References Cited

FOREIGN PATENT DOCUMENTS

| | | |
|---|---|---|
| GB | 2 187 081 A | 9/1987 |
| JP | 57155975 | 9/1982 |
| JP | 57-170175 A2 | 10/1982 |
| JP | 57-170176 A2 | 10/1982 |
| JP | 58073064 | 5/1983 |
| JP | 58-101670 | 6/1983 |
| JP | 59-085278 A | 5/1984 |
| JP | 59178273 | 10/1984 |
| JP | 64-071437 | 3/1989 |
| JP | 01210340 A | 8/1989 |
| JP | 04-318033 | 11/1992 |
| JP | 05-140344 | 6/1993 |
| JP | 06-049247 A | 2/1994 |
| JP | 06049247 A | 2/1994 |
| JP | 07-258467 | 10/1995 |
| JP | 10313821 | 12/1998 |
| JP | 2000015737 A | 1/2000 |
| JP | 2000141535 A | 5/2000 |
| JP | 2001258468 | 9/2001 |
| JP | 2002125621 | 5/2002 |
| JP | 2003191420 A | 7/2003 |
| JP | 4066071 | 1/2008 |
| JP | 5140344 | 11/2012 |
| WO | WO 92/15454 A1 | 9/1992 |
| WO | WO 96/14760 A1 | 5/1996 |
| WO | WO 99/23143 A1 | 5/1999 |
| WO | WO 00/69775 A1 | 11/2000 |
| WO | WO 02/056904 A1 | 7/2002 |
| WO | WO 03009709 | 2/2003 |
| WO | WO 2004/000541 A1 | 12/2003 |
| WO | 2004039683 A1 | 5/2004 |
| WO | WO 2004039683 | 5/2004 |
| WO | 2005097486 A1 | 10/2005 |
| WO | WO 2005097486 | 10/2005 |

OTHER PUBLICATIONS

McGee, H.; *On Food and Cooking: The Science and Lore of the Kitchen*, Scribner: New York, 1984, Chapter 3, "Meat" pp. 118-178.

Grayson, M.; *Kirk-Othmer Encyclopedia of Chemical Technology*, 3rd ed.; John Wiley & Sons: New York, 1981, vol. 15, "Meat Products", pp. 62-74.

Grayson, M.; *Kirk-Othmer Encyclopedia of Chemical Technology*, 3rd ed.; John Wiley & Sons: New York, 1981, vol. 11, "Food Additives", pp. 146-163.

Grayson, M.; *Kirk-Othmer Encyclopedia of Chemical Technology*, 3rd ed.; John Wiley & Sons: New York, 1981, vol. 11, "Food Processing", pp. 164-183.

Kroschwitz, J. I.; *Encyclopedia of Polymer Science and Technology*, Wiley Interscience: New Jersey, 2003, vol. 3, "Packaging, Flexible," pp. 353-363.

Kroschwitz, J. I.; *Encyclopedia of Polymer Science and Technology*, Wiley Interscience: New Jersey, 2003, vol. 2, Coextrusion pp. 1-25.

Brody, A. L.; Marsh, K. S.; *The Wiley Encyclopedia of Packaging Technology*, 2nd ed.; John Wiley & Sons: 1997, Active Packaging, pp. 2-13.

Brody, A. L.; Marsh, K. S.; *The Wiley Encyclopedia of Packaging Technology*, 2nd ed.; John Wiley & Sons: 1997, Coextrusions for Flexible Packaging, pp. 237-240.

Brody, A. L.; Marsh, K. S.; *The Wiley Encyclopedia of Packaging Technology*, 2nd ed.; John Wiley & Sons: 1997, Form/Fill/Seal, Horizontal & Form/Fill/Seal, Vertical, pp. 465-470.

Brody, A. L.; Marsh, K. S.; *The Wiley Encyclopedia of Packaging Technology*, 2nd ed.; John Wiley & Sons: 1997, Packaging of Food, pp. 699-704.

Brody, A. L.; Marsh, K. S.; *The Wiley Encyclopedia of Packaging Technology*, 2nd ed.; John Wiley & Sons: 1997, Thermoform/Fill/Seal, pp. 910-921.

Brody, A. L.; Marsh, K. S.; *The Wiley Encyclopedia of Packaging Technology*, 2nd ed.; John Wiley & Sons: 1997, Trays, Barrier-Foam, pp. 931-937.

Brody, A. L.; Marsh, K. S.; *The Wiley Encyclopedia of Packaging Technology*, 2nd ed.; John Wiley & Sons: 1997, Vacuum Packaging, pp. 949-955.

Wang, P. G.; Cai, T. B.; Taniguchi, N.; *Nitric Oxide Donors*; Wiley-VCH: 2005, Chapter 1, "NO and NO Donors", pp. 3-31.

Han, J. H.; "Antimicrobial Food Packaging", in *Food Technology*, Mar. 2000, vol. 54, No. 3, pp. 56-65.

Hampe, D.; Piringer, O., "Studies on the permeation of inorganic salts through plastic films", in *Food Additives and Contaminants*, 1998, vol. 15, No. 2, pp. 209-216.

Vartianinen, J., Skytta, Enqvist, J., Ahvenainen, R., "Properties of Antimicrobial Plastics Containing Traditional Food Preservatives", in *Packaging Technology and Science*, 2003, 16, pp. 223-229.

Gasco, A.; Fruttero, R.; Sorba, G.; Di Stilo, A.; and Calvino, R., "NO donors: Focus on Furoxans Derivatives", in *Pure Appl. Chem.*, 2004, vol. 76, No. 5, pp. 973-981.

Wang, P. G.; Xian, M.; Tang, X.; Wu, X.; Wen, Z.; Cai, T.; and Janczuk, A. J., „Nitric Oxide Donors: Chemical Activities and Biological Applications, *Chem. Rev.*, 2002, 102, pp. 1091-1134.

Tovar, L.; Salafranca, J.; Sanchez, C.; and Nerin, C., "Migration Studies to Assess the Safety in Use of a New Antioxidant Active Packaging", *J. Agric. Food Chem.*, 2005, 53, pp. 5270-5275.

"Migration of Toxicants, Flavors, and Odor-Active Substances from Flexible Packaging Materials to Food", *Food Technology*, Jul. 1988, pp. 95-102.

"Nitrate, Nitrite, and Nitroso Compounds in Foods", *Food Technology*, Apr. 1987, pp. 127-136.

Heaton, K.M., Corformth, D.P., Moiseev, I.V., Egbert, W.R., Carpenter, C.E. "Minimum Sodium Nitrite Levels for pinking of various cooked meats as related to use of direct or indirect-dried soy isolates in poultry rolls", *Meat Science*, 2000, 55, pp. 321-329.

Bureau, G.; Multon, J.L.; *Food Packaging Technology*, vol. 2, 1996, "Influence of the Absence of Oxygen on the Color of the Meat", pp. 239-242.

Kramlich, W.E.; Pearson, A.M.; Tauber, F.W., *Processed Meats*, The AVI Publishing Company, Inc., 1973, Chapter 1, "Introduction to Meat Processing", pp. 1-12.

Kramlich, W.E.; Pearson, A.M.; Tauber, F.W., *Processed Meats*, The AVI Publishing Company, Inc., 1973, Chapter 3, "Curing", pp. 40-60.

Meat & Deli Retailer, Mar. 2005, pp. 1-19.

Meat & Deli Retailer, Mar. 2005, pp. 22-46.

Gregerson, J.; *Meat Marketing & Technology*, Dec. 2005, "Seeing Red", p. 4.

Hisey, P.; *Meat Marketing & Technology*, Mar. 2005, "Open and shut case?", pp. 20-30.

Salvage, B.; *The National Provisioner*, Jun. 2005, "Case-ready penetration", pp. 96-105.

Schwarz, S. J.; Claus, J.R.; Wang, H.; Marriott, N.G..; Graham, P.P; Fernandes, C.F., "Inhibition of Pink Color Development in Cooked, Uncured Turkey Breast Through Ingredient Incorporation" in *Poultry Science* 1999, vol. 78, pp. 255-266.

Dymicky, M.; Fox, J.B.; Wasserm, A. E., Color Formation in Cooked Model and Meat Systems With Organic and Inorganic Compounds, in *J. Food Science* 1975, vol. 4, pp. 306-309.

Pegg, R. B.; Nitrite Curing of Meat: The N-Nitrosamine Problem and Nitrite Alternatives; in *Food & Nutrition*, Chapter 9, "Possible Substitutes for Nitrite", pp. 209-223.

USDA, 1995. Processing Inspector's Calculations Handbook (FSIS Directive 7620.3), http://fsis.usda.gov/OPPDE/rdad?FSISDirectives/7620-3.pdf. Accessed Sep. 1, 2009.

Sebranek, J. and J. Bacus, Natural and Organic Meat Products: Regulatory, Manufacturing, Marketing, Quality and Safety Issues. American Meat Science Assoc. White Paper, 2007.

McMillin, K.W, et al.; "Quality and Shelf-Life of Meat in Case-Ready Modidfied Atmosphere Packaging"; Quality Attributes of Muscle Foods; 1999; Plenum Publishers, New York.

Renerre, M. "Review: Factors involved in the discoloration of beef meat"; International Journal of Food Science & Technology; 1990; 25, pp. 613-630.

Summel, Lauren M.; "Chapter II: Review of the Literature—Myoglobin"; Ph.D. Thesis, Kansas State University; 2004.

(56) References Cited

OTHER PUBLICATIONS

Rizvi, Syed S. H.; "Requirements for Foods Packaged in Polymeric Films"; CRC Critical Reviews in Food Science & Nutrition; Feb. 1981; pp. 111-133.

Faustman, C. et al.; "The Biochemical Basis for Discoloration in Fresh Meat: A review"; Journal of Muscle Foods; Food & Nutrition Press, Inc.; 1990; pp. 217-233.

"The Eating Quality of Meat"; Meat Science; Pergamon Press; 5th Ed.; 1991; pp. 184-187.

Govindarajan, S.; "Fresh Meat Color"; CRC Critical Reviews in Food Technology; Sep. 1973; pp. 117-127.

Giddings, G.G.; "Symposium; The Basis of quality in Muscle Foods—The Basis of Color in Muscle Foods": Journal of Food Science; vol. 42, No, 2; 1997; pp. 288-294.

Maddock, R.; "Color Counts"; Operations & Technology; Oct. 2004; pp. 63-65.

Hermansen, P.; "Comparison of Modified Atmosphere Versus Vacuum Packaging to Extend the Shelf Life of Retail Fresh Meat Cuts"; Reciprocal Meat Conference Proceedings; V25.'83.

Holland, G.C.; "Modified Atmospheres for Fresh Meat Distribution"; Meat Science; vol. 13(19); 1985; pp. 21-39.

Sebranek, Dr. J.G.; "'Meat is dynamic'—factors in controlled atmosphere packs"; The National Provisioner; May 10, 1986; pp. 10-16.

Kropf, D.; "Enhancing Meat Color Stability"; 56th Annua Reciprocal Meat Conference; Jun. 15-18, 2003; pp. 73-75.

Thippareddi, H. et al.; "Modified Atmosphere Packaging (MAP): Microbial Control & Quality"; FACTS National Pork Board; #04667; Oct. 2002; pp. 1-8.

Kropf, D.; "Meat Display Lighting"; FACTS National Pork Board; #04623; Feb. 2002; pp. 1-8.

Hunt, M. et al.; "Cooked Color in Pork"; FACTS National Pork Board; #01637; Mar. 2002; pp. 1-4.

Atkinson, J.L. et al.; "Biochemical studies on the discoloration of fresh meat"; Journal of Food Technology; vol. 8, pp. 51-58; 1973.

* cited by examiner

WEBS WITH SYNERGISTS THAT PROMOTE OR PRESERVE THE DESIRABLE COLOR OF MEAT

RELATED APPLICATIONS

This application is a continuation-in-part of International Patent Application No. PCT/US2005/011387, filed Apr. 4, 2005, which claims the benefit of U.S. Provisional Application No. 60/559,350, filed Apr. 2, 2004, both of which are incorporated herein by reference in their entirety. This application is also a continuation-in-part of U.S. patent application Ser. No. 11/413,504, filed Apr. 28, 2006, entitled "Myoglobin Blooming Agent Containing Shrink Films"; Ser. No. 11/436,159, filed May 17, 2006, entitled "Packaging Articles, Films and Methods that Promote or Preserve the Desirable Color of Meat"; Ser. No. 11/451,968, filed Jun. 12, 2006, entitled "Myoglobin Blooming Agent, Films, Packages and Methods for Packaging" each of which is a continuation-in-part of International Patent Application No. PCT/US2005/011387, filed Apr. 4, 2005, which claims the benefit of U.S. Provisional Application No. 60/559,350, filed Apr. 2, 2004. These applications are incorporated herein by reference in their entirety.

TECHNICAL FIELD

Food packaging articles comprising a myoglobin blooming agent and synergist, food packages, and methods of food packing comprising the same, are provided herein.

BACKGROUND

Meat color is an important quality characteristic of packaged meat products that affects their merchantability. Consumers often use color as an indicator of meat quality and freshness. The color of meat is related to the amount and chemical state of myoglobin in the meat. Myoglobin is present in the muscle tissue of all animals and functions to store and deliver oxygen by reversibly binding molecular oxygen, thereby creating an intracellular source of oxygen for the mitochondria. Pork and poultry typically contain lower amounts of myoglobin than beef and thus are lighter in color than beef.

Myoglobin includes an open binding site called heme that can bind certain small molecules, such as molecular oxygen ($O_2$ or "oxygen"), or water. Myoglobin without a molecule bound to the heme site is a purple colored molecule called deoxymyoglobin. The presence and type of ligand bound at the myoglobin binding site can alter the color of the myoglobin. The color of the meat product will change based on the amount of myoglobin present and the amount and type(s) of ligand molecule(s) bound to the heme binding site. Molecular oxygen readily acts as a ligand that binds to the heme group, permitting biological transport of oxygen from the blood stream to the mitochondria within cells. When oxygen binds to the heme pocket, purple deoxymyoglobin becomes oxymyoglobin, characterized by a red color. When a water molecule binds to the heme group, the myoglobin molecule turns brown and is referred to as metmyoglobin. The binding of carbon monoxide (CO) can cause a red color similar to that produced by oxygen binding. Nitric oxide (NO) has been described as forming a stable pink color in cured meat.

Historically, fresh meat products available to consumers have been substantially prepared and packaged for end-use at the site of final sale. Product packaging that preserves a desirable color of fresh meat can promote the merchantability and appeal of the meat product for consumers. Existing meat packaging technology can inadequately preserve favorable meat color for various reasons. The conventional packaging format used by the retail grocer for fresh meat is to stretch a thin plastic film around a foam tray that supports the product. The film is permeable to oxygen so that the color of the meat quickly blooms to a bright red. However, the shelf life for the bright red color is only about three days. Thus, this packaging format is undesirable because the color often becomes unacceptable before it is sold even though the meat remains nutritious and healthy for consumption. As a result, a packaging format that maintains the fresh meat color for a longer period of time has long been sought for centralized packaging operations. Alternatively, meat has been packaged in oxygen barrier, vacuum bags, which are vacuum sealed and prevent oxygen contact with the meat until the package is opened. Vacuum sealed red meat products are nutritious, healthy and have a long shelf life, however they may result in an undesirable purple meat color in the package that does not bloom to a desirable red color until the meat is exposed to air. Consumer acceptance of meat having a purple color is less than that of meat having a red color. To provide meat with the consumer preferred red color, meat has also been packaged in a modified atmosphere package ("MAP"), wherein the meat is maintained in a sealed pocket containing an atmosphere that is different than ambient air. For example, one such commercially acceptable MAP contains an atmosphere enriched with oxygen (up to 80% by volume) to better maintain a preferred red color. One case ready MAP maintains meat in carbon dioxide, with very low oxygen content until just before display when the meat is exposed to oxygen to cause blooming to the desired red color. Alternatively, the meat can be contacted with a MAP having an atmosphere containing a small concentration of carbon monoxide (CO) (e.g., 0.4% by volume) to maintain a preferred red meat color. However, while CO-containing MAP may maintain a shelf life comparable to vacuum packaged meat, the red color induced by the presence of CO can be perceived as "unnaturally" bright red. In addition, the red color developed by CO tends to extend through a significant portion of the meat product, causing a permanent "pinking" of the interior of the meat which may remain even after the meat has been fully cooked. The bright red CO-myoglobin complex is referred to as carboxymyoglobin. The presence of carbon monoxide can also disfavorably impact sales of CO-containing MAP packages among consumers.

MAP also requires a headspace for contact of the modified atmosphere with the meat surface to affect the desired color over time. This requirement for a headspace leads to increased package volume, increased transportation costs and storage requirements and also limits the display appearance by making the product less visible due to the high side walls of the container and the gap between the film and the meat surface.

What is needed are packaging articles that maintain a favorable meat color, while providing an adequate or improved shelf life and meat freshness.

Nitrite or nitrate salts, such as sodium nitrite, are often used in curing meat, and can also affect meat color. Nitrate and nitrite additives are generally recognized as safe for use in foods, and are commonly known preservatives used in the curing process for products such as hams, lunchmeat, bologna and hot dogs. Nitrite and nitrates are used to cure and disinfect meats in the meat industry often producing a stable pink to red color in the process. For example, GB 2187081A discloses immersion of meat in an aqueous solution of sodium chloride, polyphosphate ions and nitrite ions to preserve meat. See also McGee, "Meat", *On Food and Cooking*, Rev. Ed., 2004, Chapter 3, pp. 118-178 (Scribner, New York, N.Y.) which is hereby incorporated by reference. The presence of oxygen can oxidize available nitric oxide to nitrite thus reducing its availability to associate with the myoglobin molecule. Packaging films have been described that comprise nitrite or nitrate compounds as a desiccant, a food preservative or as a volatile corrosion inhibitor for packaging of metal products. Anti-fungal agents including food preservatives such as sodium nitrite may be applied on various types of packaging to preserve biodegradable packaging against premature deleterious attack by fungi, as disclosed in JP7-258467A. Oxygen barrier films for packaging food products can contain a nitrate salt as a moisture-absorbing agent within an EVOH barrier material or other layer of a multilayer film, as disclosed in JP5-140344A, and U.S. Pat. No. 4,407,897 (Farrell et al.); U.S. Pat. No. 4,425,410 (Farrell et al.); U.S. Pat. No. 4,792,484 (Moritani); U.S. Pat. No. 4,929,482 (Moritani et al.); U.S. Pat. No. 4,960,639 (Oda et al.), and U.S. Pat. No. 5,153,038 (Koyama et al.). Nitrate or nitrite products have also been described as being included in packaging films to absorb moisture, e.g., to inhibit corrosion of metal products, as disclosed in U.S. Pat. No. 2,895,270 (Blaess); U.S. Pat. No. 5,715,945 (Chandler); U.S. Pat. No. 5,894,040 (Foley et al.); U.S. Pat. No. 5,937,618 (Chandler); U.S. Pat. No. 6,465,109 (Ohtsuka), and U.S. Pat. No. 6,942,909 (Shirrell et al.), U.S. Published Patent Application No. 2005/0019537 (Nakaishi et al.), GB Patent No. 1,048,770 (Canadian Technical Tape, Ltd.), and EP Patent Nos. EP 0 202 771 B1 (Aicello Chemical Co. Ltd.), and EP 0 662 527 B1 (Cortec Corp.) and EP 1 138 478 A2 (Aicello Chemical Co. Ltd.). None of these barrier films teach a meat-contact portion comprising a nitrite or nitrate material adapted to maintain desirable coloration of a meat product.

In many packaging applications, such as vacuum packaging, heat sealable food packaging films are desirable. The packaging can be made from heat sealable films. A typical food packaging bag, pouch or casing can include one, two, or three sides heat sealed by the bag manufacturer leaving one or two open sides to allow product insertion. A typical food container may include a formed tray with a heat sealable lidding film sealed to the tray. See, e.g., U.S. Pat. No. 5,058,761 (Williams); U.S. Pat. No. 5,558,891 (Lawless et al.); and U.S. Pat. No. 7,017,774 (Haedt).

Shrinkable films, bags, and casings also have been used to package fresh, frozen and processed meats for wholesale or retail sale and as processing films for cook-in applications and post-cooking pasteurization processes. Meats cured with nitrites and/or nitrates have been packaged in shrink films. See, e.g., U.S. Pat. No. 6,815,023 (Tatarka et al.); U.S. Pat. No. 6,777,046 (Tatarka et al.); U.S. Pat. No. 6,749,910 (Georgelos et al.); U.S. Pat. No. 5,759,648 (Idlas); U.S. Pat. No. 5,472,722 (Burger); U.S. Pat. No. 5,047,253 (Juhl et al.); and U.S. Pat. No. 4,391,862 (Bornstein et al.).

What is needed are packaging products, such as food packaging films including a food-contact portion comprising a material adapted to maintain or promote the desirable coloration of a myoglobin containing food product especially fresh meat.

SUMMARY

In a first embodiment, a food packaging article is provided. The food packaging article having an interior surface and an exterior surface, comprises an oxygen barrier layer and a food contact layer comprising a myoglobin blooming agent and synergist. The myoglobin blooming agent is selected from the group consisting of nitric oxide donating compounds, nitrogen heterocycles, and sulfur monoxide donating compounds The synergist is selected from the group consisting of acidulants, basifying agents, reducing agents, and postmortem muscle metabolism modifiers.

In a second embodiment, a food package is provided. The food package has a myoglobin-containing food product with a water content of at least 5 weight % and a container comprising a polymeric web having an oxygen barrier layer and a food contact surface, and a synergist and myoglobin blooming agent. At least a portion the food contact surface is in contact with at least a portion of a surface of the myoglobin-containing food product. The synergist and myoglobin blooming agent are in contact with at least a portion of the surface of the myoglobin-blooming agent. The synergist selected from the group consisting of acidulants, basifying agents, reducing agents, and postmortem muscle metabolism modifiers. The myoglobin blooming agent selected from the group consisting of nitric oxide donating compounds, nitrogen heterocycles, and sulfur monoxide donating compounds.

In a third embodiment, a method of promoting a desirable color on the surface of a myoglobin-containing fresh meat product is provided. The method comprises supplying a container comprising a polymeric web having an oxygen barrier layer and a food contact layer, providing a myoglobin-containing fresh meat product having a water content of at least 5 weight %, and contacting the myoglobin-containing fresh meat product with a myoglobin blooming agent and a synergist to produce a myoglobin-containing fresh meat product having less than 1 weight % sodium chloride. The synergist is selected from the group consisting of acidulants, basifying agents, reducing agents, and postmortem muscle metabolism modifiers. The myoglobin blooming agent is selected from the group consisting of nitric oxide donating compounds, nitrogen heterocycles, and sulfur monoxide donating compounds. In some aspects, the method further comprises removing oxygen from an environment surrounding the fresh meat product, and storing the fresh meat product in a substantially oxygen free environment for a time sufficient to allow the desirable color to appear. In other aspects, the polymeric web comprises the myoglobin blooming agent and or synergist, and the method further comprises packaging the fresh meat product in contact with the food contact layer.

In a fourth embodiment, a method of promoting a desirable color on the surface of a myoglobin-containing fresh meat product is provided. The method comprises supplying a container comprising a polymeric web having an oxygen barrier layer and a food contact layer; providing a myoglobin-containing fresh meat product having a water content of at least 5 weight %; and contacting the myoglobin-containing fresh meat product with a myoglobin blooming agent; and exposing the myoglobin-containing fresh meat product to radiant energy selected from the group consisting of heat, infared light, visible light, ultraviolet light, ionizing radiation and combinations thereof, subsequent to the contacting step to produce the myoglobin-containing fresh meat product comprising less than 1 weight % sodium chloride. The myoglobin blooming agent is selected from the group consisting of nitric oxide donating compounds, nitrogen heterocycles, and sulfur monoxide donating compounds.

The articles, compositions, films, packages and methods provided herein are useful to provide packaged fresh, frozen, thawed, processed and/or cured meat products having a desirable surface color, such as red for fresh ground beef.

DETAILED DESCRIPTION OF PREFERRED EMBODIMENTS

Definitions

Figure 1:
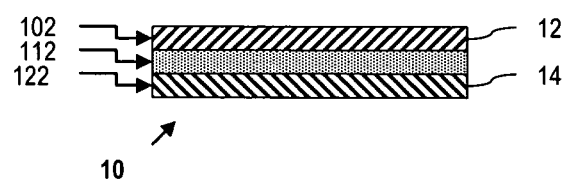
FIG. 1 shows a cross sectional schematic of a first exemplary multilayer film.

In accordance with the present invention, a "packaging article" refers to an object of manufacture which can be in the form of a web, e.g., monolayer or multilayer films, monolayer or multilayer sheets, containers, e.g., bags, shrink bags, pouches, casings, trays, lidded trays, overwrapped trays, form shrink packages, vacuum skin packages, flow wrap packages, thermoformed packages, packaging inserts or combinations thereof. It will be appreciated by those skilled in the art that, in accordance with the present invention, packaging articles may include flexible, rigid, or semirigid materials and may be heat shrinkable or not, or oriented or non-oriented.

In discussing plastic web packaging, various polymer acronyms are used herein and they are listed below. Also, in referring to blends of polymers a colon (:) will be used to indicate that the components to the left and right of the colon are blended. In referring to film structure, a slash "/" will be used to indicate that components to the left and right of the slash are in different layers and the relative position of components in layers may be so indicated by use of the slash to indicate film layer boundaries. Acronyms commonly employed herein include:

EAA—Copolymer of ethylene with acrylic acid
EAO—Copolymers of ethylene with at least one α-olefin
EBA—Copolymer of ethylene with butyl acrylate
EEA—Copolymer of ethylene with ethyl acrylate
EMA—Copolymer of ethylene with methyl acrylate
EMAA—Copolymer of ethylene with methacrylic acid
EVA—Copolymer of ethylene with vinyl acetate
EVOH—A saponified or hydrolyzed copolymer of ethylene and vinyl acetate
PB—Polybutylene-1 (a butylene homopolymer and/or copolymer of a major portion of butylene-1 with one or more α-olefins; also known as butene-1)
PE—Polyethylene (an ethylene homopolymer and/or copolymer of a major portion of ethylene with one or more α-olefins)
PP—Polypropylene homopolymer or copolymer
PET—Polyethylene terephthalate
PETG—glycol-modified polyethylene terephthalate
PLA—Polylactic acid; also known as polylactide
PVDC—Polyvinylidene chloride (also includes copolymers of vinylidene chloride, especially with vinyl chloride and/or methyl acrylate (MA)), also referred to as saran.

A "core layer," as used herein, refers to a layer positioned between and in contact with at least two other layers.

An "outer layer," as used herein is a relative term and needs not be a surface layer.

The term "exterior layer" refers to a layer comprising the outermost surface of a film or product. For example, an exterior layer can form the exterior surface of a package that contacts the exterior layer of another package during overlapping heat sealing of two packages.

The term "interior layer" refers to a layer comprising the innermost surface of a film or product. For example, an interior layer forms the interior surface of an enclosed package. The interior layer can be the food-contact layer and/or the sealant layer.

As used herein, the term "barrier" and the phrase "barrier layer," as applied to films and/or film layers, are used with reference to the ability of a film or film layer to serve as a barrier to one or more gases or moisture.

As used herein, the term "cellulose" is used to include any natural or synthetic material comprising paper fibers, wood fibers, wood pulp or powder and the like, preferably cellulosic fibers such as rayon, lyocell, cellulose acetate, cellulose carbamate, and deacetylated cellulose acetate, and regenerated cellulose, e.g., cellophane.

The term "nonwoven" as used herein refers to nonwoven papers, fabrics, or textiles and includes spunbonded webs, dry lay webs, and wet lay webs. Nonwovens are made from natural or synthetic fibers bound together in a web.

The term "nanocomposite" shall mean a mixture that includes a polymer, or copolymer having dispersed therein a plurality of individual platelets which may be obtained from exfoliated modified clay and having oxygen barrier properties.

The term "adhesive layer," or "tie layer," refers to a layer or material placed on one or more layers to promote the adhesion of that layer to another surface. Preferably, adhesive layers are positioned between two layers of a multilayer film to maintain the two layers in position relative to each other and prevent undesirable delamination. Unless otherwise indicated, an adhesive layer can have any suitable composition that provides a desired level of adhesion with the one or more surfaces in contact with the adhesive layer material. Optionally, an adhesive layer placed between a first layer and a second layer in a multilayer film may comprise components of both the first layer and the second layer to promote simultaneous adhesion of the adhesive layer to both the first layer and the second layer to opposite sides of the adhesive layer. Tie or adhesive layers may be incorporated into the article by any of the well known processes for making multilayer structures such as coextrusion, adhesive lamination and the like.

As used herein, the phrases "seal layer," "sealing layer," "heat seal layer," and "sealant layer," refer to an outer film layer, or layers, involved in the sealing of the film: to itself; to another film layer of the same film or another film; and/or to another article which is not a film, e.g., a tray. In general, the sealant layer is an interior layer of any suitable thickness, that provides for the sealing of the film to itself or another layer. With respect to packages having only fin-type seals, as opposed to lap-type seals, the phrase "sealant layer" generally refers to the interior surface film layer of a package. The inside layer frequently can also serve as a food contact layer in the packaging of foods.

"Food contact layer," "food contact portion" or "food contact surface" refers to the portion of a packaging material that contacts a packaged meat product. Preferably, the food packaging film includes a food contact layer comprising a myoglobin blooming agent in an amount effective to promote or preserve the desirable appearance or color of the meat product.

"Polyolefin" is used herein broadly to include polymers such as polyethylene, ethylene-alpha olefin copolymers (EAO), polypropylene, polybutene, and ethylene copolymers having a majority amount by weight of ethylene polymerized with a lesser amount of a comonomer such as vinyl acetate, and other polymeric resins falling in the "olefin" family classification. Polyolefins may be made by a variety of processes well known in the art including batch and continuous processes using single, staged or sequential reactors, slurry, solution and fluidized bed processes and one or more catalysts including for example, heterogeneous and homogeneous systems and Ziegler, Phillips, metallocene, single site and constrained geometry catalysts to produce polymers having different combinations of properties. Such polymers may be highly branched or substantially linear and the branching, dispersity and average molecular weight may vary depending upon the parameters and processes chosen for their manufacture in accordance with the teachings of the polymer arts.

"Polyethylene" is the name for a polymer whose basic structure is characterized by the chain —$(CH_2—CH_2—)_n$. Polyethylene homopolymer is generally described as being a solid which has a partially amorphous phase and partially crystalline phase with a density of between 0.860 to 0.970 g/cm$^3$. The relative crystallinity of polyethylene is known to affect its physical properties. The amorphous phase imparts flexibility and high impact strength while the crystalline phase imparts a high softening temperature and rigidity.

Unsubstituted polyethylene is generally referred to as high density homopolymer and has a crystallinity of 70 to 90 percent with a density between about 0.96 to 0.97 g/cm$^3$. Most commercially utilized polyethylenes are not unsubstituted homopolymer but instead have $C_2$-$C_8$ alkyl groups attached to the basic chain. These substituted polyethylenes are also known as branched chain polyethylenes. Also, commercially available polyethylenes frequently include other substituent groups produced by copolymerization. Branching with alkyl groups generally reduces crystallinity, density and melting point. The density of polyethylene is recognized as being closely connected to the crystallinity. The physical properties of commercially available polyethylenes are also affected by average molecular weight and molecular weight distribution, branching length and type of substituents.

People skilled in the art generally refer to several broad categories of polymers and copolymers as "polyethylene." Placement of a particular polymer into one of these categories of "polyethylene" is frequently based upon the density of the "polyethylene" and often by additional reference to the process by which it was made since the process often determines the degree of branching, crystallinity and density. In general, the nomenclature used is nonspecific to a compound but refers instead to a range of compositions. This range often includes both homopolymers and copolymers.

For example, "high density" polyethylene (HDPE) is ordinarily used in the art to refer to both (a) homopolymers of densities between about 0.960 to 0.970 g/cm$^3$ and (b) copolymers of ethylene and an alpha-olefin (usually 1-butene or 1-hexene) which have densities between 0.940 and 0.958 g/cm$^3$. HDPE includes polymers made with Ziegler or Phillips type catalysts and is also said to include high molecular weight "polyethylenes." In contrast to HDPE, whose polymer chain has some branching, are "ultra high molecular weight polyethylenes" which are essentially unbranched specialty polymers having a much higher molecular weight than the high molecular weight HDPE.

Hereinafter, the term "polyethylene" will be used (unless indicated otherwise) to refer to ethylene homopolymers as well as copolymers of ethylene with alpha-olefins and the term will be used without regard to the presence or absence of substituent branch groups.

Another broad grouping of polyethylene is "high pressure, low density polyethylene" (LDPE). LDPE is used to denominate branched homopolymers having densities between 0.915 and 0.930 g/cm$^3$. LDPEs typically contain long branches off the main chain (often termed "backbone") with alkyl substituents of 2 to 8 carbon atoms or more.

Linear Low Density Polyethylenes (LLDPES) are copolymers of ethylene with alpha-olefins having densities from 0.915 to 0.940 g/cm$^3$. The alpha-olefin utilized is usually 1-butene, 1-hexene, or 1-octene and Ziegler-type catalysts are usually employed (although Phillips catalysts are also used to produce LLDPE having densities at the higher end of the range, and metallocene and other types of catalysts are also employed to produce other well known variations of LLDPEs).

Ethylene α-olefin copolymers (EAOs) are copolymers having an ethylene as a major component copolymerized with one or more alpha olefins such as octene-1, hexene-1, or butene-1 as a minor component. EAOs include polymers known as LLDPE, VLDPE, ULDPE, and plastomers and may be made using a variety of processes and catalysts including metallocene, single-site and constrained geometry catalysts as well as Ziegler-Natta and Phillips catalysts.

Very Low Density Polyethylenes (VLDPEs) which are also called "Ultra Low Density Polyethylenes" (ULDPEs) comprise copolymers of ethylene with alpha-olefins, usually 1-butene, 1-hexene or 1-octene and are recognized by those skilled in the art as having a high degree of linearity of structure with short branching rather than the long side branches characteristic of LDPE. However, VLDPEs have lower densities than LLDPEs. The densities of VLDPEs are recognized by those skilled in the art to range between 0.860 and 0.915 g/cm$^3$. A process for making VLDPEs is described in European Patent Document publication number 120,503 whose text and drawing are hereby incorporated by reference into the present document. Sometimes VLDPEs having a density less than 0.900 g/cm$^3$ are referred to as "plastomers".

Polyethylenes may be used alone, in blends and/or with copolymers in both monolayer and multilayer films for packaging applications for such food products as poultry, fresh red meat and processed meat.

As used herein, the term "modified" refers to a chemical derivative, e.g., one having any form of anhydride functionality, such as anhydride of maleic acid, crotonic acid, citraconic acid, itaconic acid, fumaric acid, etc., whether grafted onto a polymer, copolymerized with a polymer, or otherwise functionally associated with one or more polymers, and is also inclusive of derivatives of such functionalities, such as acids, esters, and metal salts derived therefrom. Another example of a common modification is acrylate modified polyolefin.

As used herein, terms identifying polymers, such as, e.g., "polyamide" or "polypropylene," are inclusive of not only polymers comprising repeating units derived from monomers known to polymerize to form a polymer of the named type, but are also inclusive of comonomers, as well as both unmodified and modified polymers made by, e.g., derivitization of a polymer after its polymerization to add functional groups or moieties along the polymeric chain. Furthermore, terms identifying polymers are also inclusive of "blends" of such polymers. Thus, the terms "polyamide polymer" and "nylon polymer" may refer to a polyamide-containing homopolymer, a polyamide-containing copolymer or mixtures thereof.

The term "polyamide" means a high molecular weight polymer having amide linkages $(—CONH—)_n$ which occur along the molecular chain, and includes "nylon" resins which are well known polymers having a multitude of uses including utility as packaging films, bags, and casings. See, e.g., *Modern Plastics Encyclopedia*, 88 Vol. 64, No. 10A, pp 34-37 and 554-555 (McGraw-Hill, Inc., 1987) which is hereby incorporated by reference. Polyamides are preferably selected from nylon compounds approved for use in producing articles intended for use in processing, handling, and packaging food.

The term "nylon" as used herein refers more specifically to synthetic polyamides, either aliphatic or aromatic, either in crystalline, semi-crystalline, or amorphous form characterized by the presence of the amide group —CONH. It is intended to refer to both polyamides and co-polyamides.

Thus the terms "polyamide" or "nylon" encompass both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Preferably, polymers are selected from compositions approved as safe for producing articles intended for use in processing, handling and packaging of food, such as nylon resins approved by the U.S. Food and Drug Administration provided at 21 CFR §177.1500 ("Nylon resins"), which is incorporated herein by reference. Examples of these nylon polymeric resins for use in food packaging and processing include: nylon 6,6, nylon 6,10, nylon 6,6/6,10, nylon 6/6,6, nylon 11, nylon 6, nylon 6,6T, nylon 6,12, nylon 12, nylon 6/12, nylon 6/6,9, nylon 4,6, nylon 6-3-T, nylon MXD-6, nylon MXDI, nylon 12T and nylon 6I/6T disclosed at 21 CFR §177.1500. Examples of such polyamides include nylon homopolymers and copolymers such as those selected form the group consisting of nylon 4,6 (poly(tetramethylene adipamide)), nylon 6 (polycaprolactam), nylon 6,6 (poly(hexamethylene adipamide)), nylon 6,9 (poly(hexamethylene nonanediamide)), nylon 6,10 (poly(hexamethylene sebacamide)), nylon 6,12 (poly(hexamethylene dodecanediamide)), nylon 6/12 (poly(caprolactam-co-dodecanediamide)), nylon 6,6/6 (poly(hexamethylene adipamide-co-caprolactam)), nylon 6,6/6,10 (e.g., manufactured by the condensation of mixtures of nylon 6,6 salts and nylon 6,10 salts), nylon 6/6,9 resins (e.g., manufactured by the condensation of epsilon-caprolactam, hexamethylenediamine and azelaic acid), nylon 11 (polyundecanolactam), nylon 12 (polylauryllactam) and copolymers or mixtures thereof.

In use of the term "amorphous nylon copolymer," the term "amorphous" as used herein denotes an absence of a regular three-dimensional arrangement of molecules or subunits of molecules extending over distances which are large relative to atomic dimensions. However, regularity of structure may exist on a local scale. See, "Amorphous Polymers," Encyclopedia of Polymer Science and Engineering, 2nd Ed., pp. 789-842 (J. Wiley & Sons, Inc. 1985). In particular, the term "amorphous nylon copolymer" refers to a material recognized by one skilled in the art of differential scanning calorimetry (DSC) as having no measurable melting point or no heat of fusion (less than 0.5 cal/g) as measured by DSC using ASTM 3417-83. The amorphous nylon copolymer may be manufactured by the condensation of hexamethylenediamine, terephthalic acid, and isophthalic acid according to known processes. Amorphous nylons also include those amorphous nylons prepared from condensation polymerization reactions of diamines with dicarboxylic acids. For example, an aliphatic diamine is combined with an aromatic dicarboxylic acid, or an aromatic diamine is combined with an aliphatic dicarboxylic acid to give suitable amorphous nylons.

As used herein, "EVOH" refers to ethylene vinyl alcohol copolymer. EVOH is otherwise known as saponified or hydrolyzed ethylene vinyl acetate copolymer, and refers to a vinyl alcohol copolymer having an ethylene comonomer. EVOH is prepared by the hydrolysis (or saponification) of an ethylene-vinyl acetate copolymer. The degree of hydrolysis is preferably from about 50 to 100 mole percent, more preferably, from about 85 to 100 mole percent, and most preferably at least 97%. It is well known that to be a highly effective oxygen barrier, the hydrolysis-saponification must be nearly complete, i.e., to the extent of at least 97%. EVOH is commercially available in resin form with various percentages of ethylene and there is a direct relationship between ethylene content and melting point. For example, EVOH having a melting point of about 175° C. or lower is characteristic of EVOH materials having an ethylene content of about 38 mole % or higher. EVOH having an ethylene content of 38 mole % has a melting point of about 175° C. With increasing ethylene content, the melting point is lowered. A melting point of about 158° C. corresponds to an ethylene content of 48 mole %. EVOH copolymers having lower or higher ethylene contents may also be employed. It is expected that processability and orientation would be facilitated at higher contents; however, gas permeabilities, particularly with respect to oxygen, may become undesirably high for certain packaging applications which are sensitive to microbial growth in the presence of oxygen. Conversely, lower contents may have lower gas permeabilities, but processability and orientation may be more difficult.

As used herein, the term "polyester" refers to synthetic homopolymers and copolymers having ester linkages between monomer units which may be formed by condensation polymerization methods. Polymers of this type are preferably aromatic polyesters and more preferably, homopolymers and copolymers of polyethylene terephthalate, polyethylene isophthalate, polybutylene terephthalate, polyethylene naphthalate and blends thereof. Suitable aromatic polyesters may have an intrinsic viscosity between 0.60 to 1.0, preferably between 0.60 to 0.80.

As used herein, the term "ionomer" refers to an ionic copolymer formed from an olefin and an ethylenically unsaturated monocarboxylic acid having the carboxylic acid moieties partially neutralized by a metal ion. Suitable metal ions may include, but are not limited to, sodium, potassium, lithium, cesium, nickel and zinc. Suitable carboxylic acid comonomers may include, but are not limited to, ethylene/methacrylic acid, succinic acid, itaconic acid, vinyl acetate/methacrylic acid, methyl/methacrylate/methacrylic acid, styrene/methacrylic acid and combinations thereof. Useful ionomer resins may include an olefinic content of at least 50% (mol) based upon the copolymer and a carboxylic acid content of between 5-25% (mol) based upon the copolymer. Useful ionomers are also described in U.S. Pat. No. 3,355,319 to Rees, which is incorporated herein by reference in its entirety.

"Reduced oxygen atmosphere" when referring to a packaged meat product refers to a reduction in the partial pressure of oxygen in contact with the packaged meat product, in comparison with the partial pressure of oxygen in the Earth's atmosphere at standard temperature and pressure at sea level. Reduced oxygen atmosphere packages may include modified atmosphere packages where the oxygen partial pressure is less than that of the Earth's atmosphere at standard temperature and pressure at sea level, or vacuum packages, containing minimal gas pressure in contact with the packaged meat.

"Vacuum packaging" refers to actively eliminating atmospheric gases, most specifically oxygen, from inside the package and sealing the package so that virtually no gas is able to permeate into the package from outside the package. The result is a package with a minimum amount of oxygen gas remaining in contact with the meat inside the package. The removal of oxygen from the immediate environment of the product slows down bacterial and oxidative deterioration processes thereby keeping the quality of the meat fresher for a longer period of time.

"MAP" is an abbreviation for a "modified atmosphere package". This is a packaging format where a gas is actively flushed into the headspace of a package prior to sealing. In general, the gas is modified to be different from that normally found in the atmosphere outside the MAP. The result is a package with a considerable volume of gas surrounding the viewing surface of the product within the package. A fresh meat MAP can use either an enriched-oxygen or an oxygen-free atmosphere to effectively extend shelf life.

"RAP" is an abbreviation for a "reduced atmosphere package." It can be a form of MAP wherein the atmospheric gases are minimal so that the packaging material makes physical contact with the internal contents. RAP can also be a form of vacuum packaging where the atmosphere is not completely evacuated from inside the package. Examples include the conventional fresh meat package such as a "PVC stretch wrapped tray" and the conventional case ready poultry package where a shrink film or bag is hermetically sealed around a tray of meat. In general, the fresh meat in a RAP has a higher profile than the tray used to hold the meat so that the packaging film surrounding the product makes considerable physical contact with the meat surface.

"Consumer Package" refers to any container in which a meat product is enclosed for the purpose of display and sale to household consumers.

"Case ready" meat refers to a consumer package of fresh meat that is prepackaged and/or labeled at a centralized location and delivered to the retail market in a format whereby it is ready for immediate display and sale. The case ready package actively extends the quality life of a fresh meat product so as to allow for the extra time that it takes to be packaged at a centrally located facility, distributed to the retail grocer and then displayed under lights for consumer selection and purchase.

A "myoglobin blooming agent" refers to any agent (or precursor thereof) that binds to or interacts with any undenatured myoglobin-containing structure (including but not limited to deoxymyoglobin, oxymyoglobin, metmyoglobin, carboxymyoglobin, and nitroxymyoglobin) present in a fresh meat product to produce or preserve a desired color, such as a red color indicative of fresh meat. The myoglobin blooming agent may also interact or cause an interaction with hemoglobin present in a meat product so as to produce, maintain or enhance, i.e., "fix" a desired color. Thus, the myoglobin blooming agent is not a color additive, but it acts as a color fixative. Examples of myoglobin blooming agents include gases such as oxygen and carbon monoxide.

"Deoxymyoglobin" refers to myoglobin in which no oxygen is present in the heme pocket. The heme iron atom is in the reduced ferrous state. It is theorized that a liquid water molecule is the ligand in the heme pocket. Deoxymyoglobin is associated with the unbloomed purple pigment of fresh meat.

"Oxymyoglobin" refers to the oxygenated form of deoxymyoglobin where the heme ligand is an oxygen gas molecule. Oxymyoglobin is associated with the bloomed red pigment of fresh meat "Metmyoglobin" refers to an oxidized form of myoglobin in which the heme iron is in the oxidized ferric state. Metmyoglobin can be formed when oxygen leaves the heme pocket of oxymyoglobin and takes an electron with it leaving the heme iron atom in the oxidized ferric state. Metmyoglobin causes the characteristic oxidized brown pigment of fresh meat.

"Carboxymyoglobin" refers to the undenatured reduced form of the carboxylated deoxymyoglobin pigment where the heme ligand is carbon monoxide. The color of carboxymyoglin is red.

"Nitroxymyoglobin" is the undenatured reduced form of the nitrosylated deoxymyoglobin pigment. The heme ligand is a nitrogen monoxide (NO) molecule. Nitrogen monoxide is also referred to as nitric oxide. Nitroxymyoglobin is also referred to as nitric oxide myoglobin, nitrosohaemachromagen, or nitrosomyoglobin among others. Nitroxymyoglobin has the same red color as oxymyoglobin and carboxymyoglobin.

"Nitric oxide metmyoglobin" is the undenatured oxidized form of deoxymyoglobin when nitrite is present. It is used to describe the brown color of meat that typically occurs after nitrite is added during the curing process.

"Nitrosohemochrome" refers to the nitrosylated protoporphyrin (heme complex) that is detached from the globin protein moiety of the myoglobin molecule. Nitrosohemochrome affords the stable pink to maroon color of cooked cured processed meat, wherein the heme iron is in the reduced state.

"Meat" or "meat product" refers to any myoglobin or hemoglobin containing tissue from livestock such as beef, pork, veal, lamb, mutton, chicken or turkey; game such as venison, quail, and duck; and fish, fishery or seafood products. The meat can be in a variety of forms including primal cuts, subprimal cuts, and retail cuts as well as ground, comminuted or mixed. The meat or meat product is preferably fresh, raw, uncooked meat, but may also be frozen, hard chilled or thawed. It is further believed that meat may be subjected to other irradiative, biological, chemical or physical treatments. The suitability of any particular such treatment may be determined without undue experimentation in view of the present disclosure. As long as the myoglobin blooming agent is effective to promote, develop, enhance or maintain a desirable color, it may be advantageously employed to such end. Preferably the meat is less than 20 days post mortem. More preferably, the meat is less than 12 days or even 6 days or less post mortem.

Primal cuts of meat are also termed wholesale cuts and both terms refer to large sections of a carcass that are usually sold and/or shipped to butchers who further subdivide the primal into subprimals and individual retail cuts for sale to consumers. Examples of primal cuts of beef are: round; rump; loin end; flank; short loin; plate; rib; brisket; shank; and chuck. Examples of pork primals include: loin; leg; shoulder; and belly.

Subprimals are intermediate in size and may be divided further into retail cuts or are sometimes sold as retail cuts. Beef subprimals include: arm; blade; ribs; beef plate; top round; bottom round; ribs; top butt; bottom butt; tenderloin; and top loin. Pork subprimals include: butt shoulder; picnic shoulder; center cut; sirloin; butt end; shank end; side pork and side rib.

Retail cuts of meat are consumer cuts made by dividing wholesale cuts into smaller pieces. Examples of retail cuts of beef include: steaks such as round, top round, cubed, sirloin, t-bone, porterhouse, filet mignon, rib eye, rib, skirt, flank, and tip; roasts such as blade, pot, and chuck; corned brisket; fresh brisket; stew beef; short ribs; kabobs; eye of round; rolled rump; shank cross cuts; steak rolls; ground beef; and beef patties. Examples of retail cuts of pork include: arm roasts and steaks; spareribs; bacon; salt pork; ham; ham steaks; ham slices; pork tenderloin; chops; cutlets; fat back; sausage; links; and ground pork.

"Fresh meat" means meat that is uncooked, uncured, unsmoked and unmarinated. "Fresh meat" includes post mortem meat that has been physically divided, for example, by cutting, grinding or mixing. There is no added salt, i.e., sodium or potassium chloride, in fresh meat that has not been enhanced. Naturally occurring sodium typically is less than 50 mg/100 g of meat and accounts for a salt content of less than about 0.15 weight %, preferably less than 0.128 weight %. Values of sodium are in a database for nutritional composition of meat called the "National Nutrient Data Bank", and the data are published in Agriculture Handbook No. 8, "Composition of Foods—Raw, Processed, Prepared" referred to in the industry as "Handbook 8," both of which are hereby incorporated by reference.

"Enhanced meat" means meat that has added water mixed with other ingredients such as sodium chloride, phosphates, antioxidants, and flavoring, e.g., to make meat moist, more tender and to help enhance shelf-life. Fresh beef, pork or poultry after being "enhanced" would typically contain 0.3-0.6 weight % salt (sodium chloride).

"Processed meat" means meat that has been changed by heat and chemical processes, e.g., by cooking or curing. Cooked ham, hot dogs, and lunch meat are examples of cured processed meat.

"Uncured processed meats" are processed meats that do not contain nitrites or nitrates. Uncured processed meats would typically contain greater than 1.0% by weight, typically 1.2-2.0 weight %, sodium chloride (salt). Cooked roast beef and bratwurst are examples of uncured processed meat.

"Cured meat" means meat that is preserved through direct addition of nitrite (or nitrate which is converted to nitrite), e.g., having at least 50 ppm sodium nitrite and at least 1% by weight added salt, i.e., sodium chloride, for the purpose of preservation by retarding bacterial growth. Nitrites, nitrates or blends thereof are commonly present with sodium chloride in curing compositions. "Uncured meat" does not contain added nitrite or nitrate. Wet cured meats are soaked in salt brine. Dry cured meats have salt applied to the surface. Injection cured meats have the curing salts (cure) applied by needle injection into the meat.

Cured processed meats often have 2-3.5 weight % salt. A brine content of 3.5-4.0 weight % (2.6-3.0% on a weight basis in treated meat) as the level of sodium chloride salt (potassium chloride may be substituted for some or all of the NaCl) is needed in processed meat to adequately slow down bacterial growth to permit 60-90 day shelf life, although other means of preservation may also be employed to maintain shelf life at reduced salt levels. According to Pegg, R. B. and F. Shahidi, 2000, Nitrite Curing of Meat. Food & Nutrition Press, Inc., Trumbull, Conn., cured meats may have typical salt levels of 1.2-1.8 weight % in bacon, 2-3 weight % in hams, 1-2 weight % in sausages and 2-4 weight % in jerkies. It is believed that fresh meat such as beef, pork and poultry has substantially no nitrite (i.e., less than 1 ppm $NO_2$) or nitrate (i.e., 4 ppm $NO_3$ or less) naturally occurring or added. The United States Department of Agriculture (USDA) permits ingoing nitrite and nitrate for cured and processed meat at a level up to a maximum of 625 ppm sodium nitrite or 2,187 ppm sodium nitrate in dry cured products. In other applications levels have different limits, e.g., in typical cooked whole muscle meat products the limit as sodium nitrite is 156 ppm and in comminuted meats, 200 ppm. The maximum nitrite usage level in hot dogs or bologna is typically 156 ppm, while that for bacon is 120 ppm. Sodium ascorbate (or similar compounds) may be present in these cures.

In Europe, it is believed that the minimum level of salt and nitrite required by law for curing is 1.0 weight % and 50 ppm respectively. The USDA has stated: "As a matter of policy, the Agency requires a minimum of 120 ppm of ingoing nitrite in all cured "Keep Refrigerated" products, unless the establishment can demonstrate that safety is assured by some other preservation process such as thermal processing, pH or moisture control. This 120 ppm policy for ingoing nitrite is based on safety data reviewed when the bacon standard was developed." (See, "Processing Inspectors' Calculations Handbook", Chapter 3, p. 12, revised 1995). The Handbook also states: "There is no regulatory minimum ingoing nitrite level however 40 ppm nitrite is useful in that it has some preservative effect. This amount has also been shown to be sufficient for color-fixing purposes and to achieve the expected cured meat or poultry appearance."

The meat product can be any meat suitable for human consumption that contains a myoglobin like molecule. References to total myoglobin in a meat product refer to the amount of the myoglobin like molecules that are physiologically present in the meat tissue prior to harvesting for human consumption. Specific meat products contain a level of myoglobin sufficient to provide its characteristic color. Examples of suitable fresh meat cuts include beef, veal, pork, poultry, mutton, and lamb. The concentration of myoglobin varies in these different types of meat products. For example, beef typically contains about 3-20 mg of myoglobin per gram of meat, pork contains about 1-5 mg myoglobin per gram of meat, chicken contains less than about 1 mg myoglobin per gram of meat. Thus, the concentration of total myoglobin compounds in the above described meat products is typically between about 0.5 mg and 25 mg of myoglobin compounds per gram of the meat product.

In fresh meat (postmortem muscle tissue), oxygen can continually associate and disassociate from the heme complex of the undenatured myoglobin molecule. It is the relative abundance of three forms of the undenatured muscle pigment that determines the visual color of fresh meat. They include purple deoxymyoglobin (reduced myoglobin), red oxymyoglobin (oxygenated myoglobin); and brown metmyoglobin (oxidized myoglobin). The deoxymyoglobin form typically predominates immediately after the animal is slaughtered. Thus, freshly cut meat can have a purple color. This purple color can persist for a long time if the pigment is not exposed to oxygen. Cutting or grinding exposes the pigment to oxygen in the atmosphere, and the purple color can quickly convert to either bright red (oxymyoglobin) or brown (metmyoglobin). Thus, although deoxymyoglobin is technically indicative of fresher meat, it is the red or "bloomed" meat color that consumers use as their primary criterion for perceiving freshness. It is believed without wishing to be bound by the belief, that the preferred red color of fresh meat occurs when at least 50% of the deoxymyoglobin molecules are oxygenated to the oxymyoglobin state. Changes in the relative percentage of each of these forms can continue to occur as fresh meat is exposed to oxygen for longer periods of time. The immediate conversion of the purple color to the desirable bright red or undesirable brown can depend on the partial pressure of oxygen at the surface. The purple color is favored at the very low oxygen level, and can dominate at oxygen levels of 0-0.2% by volume. The brown color is favored when the oxygen level is only slightly higher (0.2% to 5.0% by volume). Consumer discrimination typically begins when the relative amount of metmyoglobin is 20%. A distinctly brown color is evident at 40% metmyoglobin, which typically renders the meat unsaleable even though it remains nutritious and healthy for consumption.

Certain biochemical reactions that occur in muscle tissue after death can also affect fresh meat color, such as the presence of active glycolytic enzymes that convert oxygen to carbon dioxide. Reducing coenzymes called metmyoglobin reductases present in meat convert metmyoglobin back to deoxymyoglobin, and their activity is called "MRA" which is an abbreviation for metmyoglobin reducing activity. MRA can be described as the ability of muscle to reduce metmyoglobin back to its natural deoxymyoglobin state. MRA is lost when the oxidizable substrates are depleted or when heat or acid denatures the enzymes. When the enzymes lose their activity or are denatured, the iron of the heme pigment automatically oxidizes to the metmyoglobin form, and the brown color stabilizes and dominates. MRA persists for a period of time after death depending on the amount of exposure of the meat tissue to oxygen. During this time, oxygen is continually consumed by the meat tissue. The oxygen consumption rate is referred to as "OCR". When meat that has a high OCR is exposed to oxygen, the oxygen tension is reduced so rapidly that the metmyoglobin is favored below the viewing surface. If it is close to the viewing surface, the perceived color of the meat is affected. The MRA is important to minimize this layer of metmyoglobin that forms between the bloomed surface and purple interior. As the MRA wears out, the brown metmyoglobin layer thickens and migrates toward the surface, thus terminating display life. When the MRA is high, the metmyoglobin layer is thin and sometimes not visible to the naked eye.

MRA and OCR relate to determining the types of packaging best suited for retail sale in order to prolong the desirable appearance of meat as long as possible. Hermetically sealed packages with films that are a barrier to oxygen will cause a low oxygen tension on the meat surface. Thus, metmyoglobin formation occurs and the viewing surface changes to an undesirable brown color. However, if the OCR is high enough to keep ahead of the oxygen that migrates across the packaging film, and the MRA is good enough to reduce metmyoglobin that forms on the surface, then native deoxymyoglobin replaces metmyoglobin. After a period of time, the perceived color changes from brown to purple. Both of these colors are unacceptable to the consumer. For this reason, vacuum packaging by itself has historically been an unacceptable format for case ready fresh meat although it is used to ship subprimal and other large cuts of meat from the slaughterhouse to retail butchers for further processing and re-packaging. On the other hand, vacuum packaging is the format of choice for cooked and cured processed meats where the myoglobin pigment is denatured by heat. Heat from cooking causes the globin portion of the nitrosylated myoglobin molecule to denature and separate from the heme portion. It is the dissociated nitrosylated heme complex that gives cured and processed meats their characteristic color. When oxygen is eliminated from a cured processed meat package, the product's color and flavor can deteriorate slower than when oxygen is present. In the present invention, it is advantageous to reduce or eliminate oxygen from the environment of the raw fresh meat in order to maximize the development of the preferred red color. A certain amount of oxygen may penetrate the meat after slaughter and fabrication. This oxygen is eliminated by the OCR/MRA activities. Similarly, those activities facilitate the dominance of the deoxymyoglobin form of the myoglobin molecule. It is believed, but not wishing to be bound by the belief, that the OCR/MRA activities also facilitate the reduction of nitrite to nitric oxide when sodium nitrite is used as the myoglobin blooming agent. In this case, the formation of deoxymyoglobin and nitric oxide allows for the development of nitroxymyoglobin. Oxygen itself is a myoglobin blooming agent because it causes the formation of oxymyoglobin as described earlier herein. However, oxygen interferes with the reactions that form deoxymyoglobin and nitric oxide. Therefore, it may interfere with the bloomed color development in the presence of nitrite. Thus, it is a preferred aspect of the present invention that an oxygen barrier layer is selected and configured to protect the meat surface from the ingress of atmospheric oxygen during the formation of the desired bloomed meat color.

Synergists

In a first embodiment, a synergist is provided. A synergist is a compound which improves the performance characteristics of a myoglobin blooming agent. For example, when the synergist is used in combination with a myoglobin blooming agent, the formation of the desirable appearance or bloom of a food product, in particular a meat product, may be accelerated. In other words, the time necessary for the desirable appearance or bloom to take effect when the myoglobin blooming agent is used with the synergist is less than the time required for the desirable appearance or bloom to take effect when the myoglobin blooming agent is used without the synergist. In other aspects, the synergist may enhance the desirable appearance or bloom of a food product. In still other aspects, the synergist may prolong the amount of time that desirable color or bloom lasts. Preferably, the synergist is a food grade additive.

A variety of synergists may be used in the present invention including acidulants, basifying agents, reducing agents, antioxidants, oxygen scavengers, and postmortem muscle metabolism modifiers. Another synergist includes physical treatment by radiant energy. Synergists of the present invention may act by one or more mechanism and or may be classified according to one or more of the groups listed above.

One group of synergists is acidulants. An acidulant refers to any compound which lowers the pH of a food product. Preferably, the acidulant is a food grade acidulant. Without wishing to be bound by theory, acidulants are believed to accelerate conversion of nitrate and nitrite to nitric oxide, and thereby, facilitate the formation of nitroxymyoglobin. As such, any compound which accelerates the conversion of nitrite or nitrate to nitric oxide is considered an acidulant within the scope of the present invention.

Examples of acidulants include organic acids such as ascorbic acid, erythorbic acid, citric acid, lactic acid, benzoic acid; glucono delta lactone; and acidic phosphates such as monobasic monophosphates ($H_2PO_4^-$), monobasic diphosphates ($H_3P_2O_7^-$), dibasic diphosphates ($H_2P_2O_7^{2-}$), monobasic triphosphates ($H_4P_3O_{10}^-$), and dibasic triphosphates ($H_3P_3O_{10}^{2-}$) where suitable phosphate counterions include alkali metals (e.g., sodium, potassium), alkaline earth metals (e.g., calcium), protonated primary, secondary, or tertiary amines, quaternary amines, and ammonium.

A basifying agent refers to any compound which increases the pH of a meat product. Without wishing to be bound by theory, the decrease in pH which occurs post-mortem in meat, reduces mitochondrial activity, OCR and MRA. The result of the decrease in pH may have a positive effect on myoglobin blooming by oxygen, a negative effect with myoglobin blooming by nitric oxide, and no effect with myoglobin blooming by carbon monooxide. The natural pH of meat is between about 5.8 to about 6.2. Maintaining the pH of meat above about 5.5 is believed to restore mitochondrial activities, thereby accelerating reduction of metmyoglobin to facilitate binding of a ligand, e.g., nitric oxide. As such, any compound which restores or enhances mitochondrial activities is within the scope of the present invention. Examples of basifying agents include bicarbonates ($HCO_3^-$), carbonates ($CO_3^{2-}$), basic phosphates such as dibasic phosphate ($HPO_4^{2-}$), tribasic phosphates ($PO_4^{3-}$), tetrabasic diphosphates ($P_2O_7^{4-}$), pentabasic triphospates ($P_3O_{10}^{5-}$) wherein suitable counterions include alkali metals (such as sodium, potassium), alkaline earth metals (such as calcium), protonated primary, secondary, or tertiary amines, quaternary amines, and ammonium. Preferably the basifying agent is sodium tripolyphosphate ($Na_5P_3O_{10}$), also referred to as sodium triphosphate pentabasic.

In some aspects, the basifying agent acts as a buffering agent, buffering the pH of the meat at or greater than pH 5.5, preferably between about 5.5 and about 8.0, more preferably between about 5.8 and about 6.2. Examples of buffering agents include phosphates as discussed above and bicarbonates, including sodium bicarbonate and potassium bicarbonate, where suitable counterions for either phosphates or bicarbonates are as discussed above for basifying agents. A method of using a sodium bicarbonate solution to improve meat color is disclosed in U.S. Pat. No. 6,020,012 to Kauffman et al., the disclosure of which is hereby incorporated by reference. In some aspects, it may be desirable to apply or inject the basifying or buffering agent to the meat immediately after slaughter.

Other synergists include reducing agents. A reducing agent refers to any compound which prevents or mitigates oxidation or otherwise reduces the oxidation state of a compound or atom, or which reduces the initial browning of a meat product. Reducing agents can act in a variety of ways to improve the performance characteristics of a myoglobin blooming agent. For example, oxymyoglobin is known to oxidize to metmyoglobin which has an undesirable brown color. A reducing agent could prevent or mitigate the oxidation of oxymyoglobin to metmyoglobin or decrease the rate of oxidation. In other aspects, the reducing agent may mitigate the agent which is oxidizing oxymyoglobin to metmyoglobin. Reducing agents can also be used to reduce nitrites, nitrates or other nitric oxide donating compounds to nitric oxide. Examples of reducing agents include antioxidants, peroxide reducing agents, peroxynitrite reducing agents, nitrite reducing agents, nitrate reducing agents and oxygen scavengers.

Antioxidants refer to any compound which prevents, mitigates, or otherwise interferes with oxidation of myoglobin. Without wishing to be bound by theory, antioxidants are believed to reduce oxidation of myoglobin to metmyoglobin thereby reducing initial browning and bloom time. As such, any compound which reduces initial browning is also intended to be within the scope of the present invention. Examples of antioxidants include salts of ascorbic acid, salts of erythorbic acid, sodium sulfite, sodium benzoate, alpha tocopherol (vitamin E), butylated hydroxyanisole (BHA), butylated hydroxytoluene (BHT), Rosemary extract, and cure accelerators. Salts of ascorbic acid or erythorbic acid may comprise any suitable counterion for the carboxylate functionality including alkali metals (such as sodium, potassium), alkaline earth metals (such as calcium), protonated primary, secondary, or tertiary amines, quaternary amines, and ammonium. Other examples of antioxidants include reducing sugars such as described in U.S. Pat. No. 2,147,261, the entire disclose of which is hereby incorporated by reference. A reducing sugar is a carbohydrate which can reduce metallic salts, such as copper or silver, in the presence of certain organic salts. Reducing sugars include, for example, starch conversion syrups, dextrose, maltose, levulose, lactose and invert sugar. Preferably the antioxidant is sodium erythorbate.

Other reducing agents include nitrite and/or nitrate reducing agents refer to compounds which reduce or catalyze the reduction of nitrite or nitrate to nitric oxide. Examples of nitrite reducing agents include proteins or enzymes including nitrate reductases, nitrite reductases, and xanthine oxidase; and metal ion ligand complexes of Cu(II), Fe(III), V(III), Cr(III) and Ti(III) where suitable ligands, include dibenzo[e,k]-2,3,8,9-tetraphenyl-1,4,7,10-tetraaza-cyclododeca-1,3,7,9-tetraene, dibenzo[e,k]-2,3,8,9-tetramethyl-1,4,7,10-tetraaza-cyclododeca-1,3,7,9-tetraene, and dibenzo[e,k]-2,3,8,9-tetraethyl-1,4,7,10-tetraaza-cyclododeca-1,3,7,9-tetraene. The reducing agent may also be a peroxynitrite reducing agent. A peroxynitrite reducing agent is any compound that reduces, catalyzes the reduction or otherwise aids in the reduction of peroxynitrite to nitric oxide. An example of a peroxynitrite reducing agents includes glutamic acid.

Other synergists include oxygen scavengers. An oxygen scavenger is any compound that reduces or eliminates residual oxygen in the atmosphere around the meat product, in the meat, or in particular, on the meat surface. An oxygen scavenger may eliminate oxygen by physical means such as absorbing and retaining oxygen, or by converting or assisting in the conversion of oxygen to another species. Examples of oxygen scavengers include iron sulfate and glucose oxidase/catalase.

Other synergists include postmortem muscle metabolism modifying agents. A postmortem muscle metabolism modifying agent is any compound that increases metmyoglobin reducing activity (MRA) or acts as a substrate leading to increased metmyoglobin reducing activity. Reducing coenzymes called metmyoglobin reductases present in meat convert metmyoglobin back to deoxymyoglobin, and their activity is called "MRA." As discussed previously, metmyoglobin has an undesirable brown color, whereas oxymyoglobin as a desirable red color. In addition, improved MRA activity facilitates the consumption of residual oxygen and reduction of $NO_2$ to nitric oxide. As such, any compound which restores, enhances, or improves MRA activity, accelerates the consumption of oxygen, or the reduction of $NO_2$ to nitric oxide is within the scope of the present invention. Examples of metmyoglobin reducing activity enhancing agents include 1,6-diphosphate which is used by mitochondria in postmortem metabolism and inorganic lactates where suitable counterions are selected from the group consisting of alkali metals (such as sodium, potassium), alkaline earth metals (such as calcium), protonated primary, secondary, or tertiary amines, quaternary amines, and ammonium.

Other synergists include physical treatments to the meat product. Physical treatments by radiant energy may include, but are not limited to, for example, exposing meat to heat, infared light, visible light, ultraviolet light, ionizing radiation and combinations thereof. For example, the meat product can be exposed to heat such as a specific temperature range and for a specific time after the myoglobin blooming agent has come in contact with the meat surface. For example, the meat may be exposed to infrared light, visible light or ultraviolet light for a suitable amount of time. Alternatively, the meat may be exposed to a temperature range for a suitable amount of time. Fresh meat is often maintained below about 35° F., more specifically between about 28-32° F. Below about 28° F., meat often begins to freeze. For a synergistic effect with heat as a synergist, meat is preferably exposed to greater than about 35° F., as measured at the surface of the meat, preferably between about 35° F. and about 50° F., more preferably between about 35° F. and about 40° F.

Various combinations of myoglobin blooming agents and synergists are possible. For example, one or more myoglobin blooming agents may be used in combination with one or more synergists. In some instances, there may be some combinations of one or more myoglobin blooming agents with one or more synergists which are more preferable than others. In other instances, depending on the mechanism of action of the synergists, it may be desirable to premix the myoglobin blooming agent and synergist. In other aspects, it may be preferable to segregate the myoglobin blooming agent and synergist until a desired time.

There are a number of ways to minimize premature reactivity between the myoglobin blooming agent and the synergist. For example, one of the compounds can be coated on or contained in the meat product, while the other compound is coated on or contained on the packaging web. Preferably, the packing film food contact layer comprises the myoglobin blooming agent, and the meat product is sprayed, dusted or coated with the synergist. Alternatively, the myoglobin blooming agent and synergist can be incorporated in separate layers of the packaging web. Another way to minimize premature reaction between the myoglobin blooming agent and synergist is to encapsulate at least one of the myoglobin blooming agent or synergists. Encapsulating agents are preferably food grade materials including oils, including lecithin, annatto oil (soluble), and vegetable oils such as soy oil, peanut oil, corn oil, canola, cottonseed oil, and sunflower seed oil; fats; emulsifiers; sugar alcohols; proteins; polyols; carbohydrates such as starch; hydrocolloids; and mixtures thereof.

When the synergist is an acidulant, it is preferable to minimize reaction between the acidulant and myoglobin blooming agent until just prior to contact with the food product. The synergist can be encapsulated and then incorporated into the packaging web food contact layer along with the myoglobin blooming agent. Preferably, the myoglobin blooming agent is incorporated in the food contact layer of the packaging web and the synergist is coated, sprayed or dusted on the packaging web contact surface or the meat product surface.

When the synergist is an antioxidant, the antioxidant can be incorporated into the sealant layer of the packaging web and the myoglobin blooming agent incorporated into the food contact layer of the packaging web. Preferably, the antioxidant is added to or coated, sprayed or dusted on the meat product and the myoglobin blooming agent is incorporated into the food contact layer of the packaging web.

When the synergist is a basifying agent, the synergist can be combined with other synergists such as acidulants or antioxidants. Preferably, the basifying agent is added to or coated, sprayed or dusted on the meat product and the myoglobin blooming agent is incorporated into the food contact layer of the packaging web.

Myoglobin Blooming Agents

In a first embodiment, myoglobin blooming agents are also provided. A "myoglobin blooming agent" refers to any agent (or precursor thereof) that binds to or interacts with any undenatured myoglobin-containing structure (including but not limited to deoxymyoglobin, oxymyoglobin, metmyoglobin, carboxymyoglobin, and nitric oxide myoglobin) present in a fresh meat product to produce or preserve a desired color, such as a red color indicative of fresh meat. The myoglobin blooming agent may also interact or cause an interaction with hemoglobin present in a meat product so as to produce, maintain or enhance, i.e., "fix" a desired color. Thus, the myoglobin blooming agent is not a color additive, but it acts as a color fixative.

In one preferred embodiment, the myoglobin blooming agent is a "nitric oxide donating compound" ("NO donor") that provides a nitric oxide (NO) molecule that binds to the myoglobin present in a meat product so as to maintain or promote a reddening or blooming or other favorable coloration of the meat product. A nitric oxide donating compound releases nitric oxide or is a precursor, e.g., nitrate which acts as an intermediate leading to the formation of nitric oxide which binds to a myoglobin molecule in a meat product. Examples of nitric oxide donating compounds include nitrosodisulfonates including for example, Fremy's salt [NO($SO_3Na$)$_2$ or NO($SO_3K$)$_2$]; inorganic nitrates ($MNO_3$) where a suitable counter ion ($M^+$) include alkali metals (e.g., sodium, potassium), alkaline earth metals (e.g., calcium), transition metals, protonated primary, secondary, or tertiary amines, or quaternary amines, or ammonium, and including for example, saltpeter; and inorganic nitrites ($MNO_2$) where suitable counter ions ($M^+$) include alkali metals (e.g., sodium, potassium), alkaline earth metals (e.g., calcium), transition metals, protonated primary, secondary, or tertiary amines, or quaternary amines, or ammonium.

Other suitable nitric oxide donating compounds that may act as myoglobin blooming agents are disclosed in U.S. Pat. No. 6,706,274 to Herrmann et al. (filed Jan. 18, 2001); U.S. Pat. No. 5,994,444 to Trescony et al. (filed Oct. 16, 1997), and U.S. Pat. No. 6,939,569 to Green et al. (filed Jun. 18, 1999), as well as published U.S. patent application No. US2005/0106380 by Gray et al. (filed Nov. 13, 2003), all of which are hereby incorporated by reference herein. Optionally, the myoglobin blooming agents can contain materials that promote the conversion of other materials to NO, such as nitrate reductase or nitrosothiol reductase catalytic agents, including the materials described in WIPO Publication No. WO 02/056904 by Meyerhoff et al. (filed Jan. 16, 2002), which is incorporated herein by reference.

Other examples of nitric oxide donating compounds include organic nitroso compounds (containing a —NO functional group attached to carbon) including 3-ethyl-3-nitroso-2,4-pentanedione; organic nitro compounds (containing a —$NO_2$ functional group attached to carbon) including nitroglycerine and 6-nitrobenzo[α]pyrene; organic nitrates (—O—$NO_2$) including ethyl nitrate, glyceryl mono, di or trinitrate, pentaerythritol tetranitrate, erythrityle tetranitrate, isosorbide mono or dinitrate, and trolnitrate.

Other examples of nitric oxide donating compounds include O-nitrosylated compounds (—O—NO) including alkyl nitrites such as butyl nitrite, amyl nitrite, dodecyl nitrite and dicyclohexylamine nitrite; S-nitrosylated compounds (—S—NO) also known as nitrosothiols including S-nitrosothioglycerol, S-nitroso-penicillamine, S-nitrosoglutathione, glutathione, S-nitroylated derivatives of captopril, S-nitrosylated-proteins, S-nitrosylated-peptides, S-nitrosylated-oligosaccharides and S-nitrosylated-polysaccharides; and N-nitrosylated compounds (—N—NO) including N-nitrosamines; N-hydroxy-N-nitrosoamines; and N-nitrosimines.

Additional examples of nitric oxide donating compounds include nonoate compounds which include the functional group —N(O)—NO (also referred to in the art as N-oxo-N-nitroso compounds, N-hydroxy-N'-diazenium oxides, diazeniumdiolates and NONOates) including 3,3,4,4-tetramethyl-1,2-diazetine 1,2-dioxide.

Further examples of nitric oxide donating compounds include transition metal/nitroso complexes including sodium nitroprusside, dinitrosyl iron thiol complexes, iron-sulfur cluster nitrosyls, ruthenium nitrosyls, nitroso/heme/transition metal complexes, and nitroso ferrous protoporphyrin complexes; furoxans including 1,2,5-oxadiazole N-oxide; benzofuroxans, oxatriazole-5-imines including 3-aryl-1,2,3,4-oxatriazole-5-imine; sydnonimines including molsidomine; oximes including cyclohexanone oxime; hydroxylamines, N-hydroxyguanidines, and hydroxyureas.

Nitric oxide donating compounds may donate one molecule of nitric oxide or multiple nitric oxide molecules. In some aspects the nitric oxide donating compound may be a polymeric material which contains several nitric oxide donating sites, and can thereby release multiple molecules of nitric oxide. Preferably, the nitric oxide is released from the polymeric chain. For example, U.S. Pat. No. 5,525,357, which is hereby incorporated by reference herein, describes a polymer with a nitric oxide-releasing functional group bound to the polymer. U.S. Pat. No. 5,770,645, which is hereby incorporated by reference herein, describes a polymer in which $NO_x$ is covalently bound to a polymer by a linking group. U.S. Pat. No. 6,087,479, which is hereby incorporated by reference herein, describes synthetically derived polymeric materials which are derivatized to include nitric oxide adducts. It is to be understood that polymeric materials which contain a nitric oxide donating compound or nitric oxide donating functional group chemically bound to the polymer chain are within the scope of the present invention.

In one embodiment, the nitric oxide donating compound is other than sodium nitrate or sodium nitrite.

In one embodiment, the nitric oxide donating compound is other than an inorganic nitrate or inorganic nitrite.

In another embodiment, the nitric oxide donating compound is an inorganic nitrate or inorganic nitrite other than sodium nitrate, potassium nitrate, sodium nitrite and potassium nitrate.

In one embodiment, the nitric oxide donating compound is other than a nitrosodisulfonate.

Other myoglobin blooming agents within the scope of the present invention include inorganic cyanides (MCN) where suitable counter ions ($M^+$) include alkali metals (e.g., sodium, potassium), alkaline earth metals (e.g., calcium), transition metals, protonated primary, secondary, or tertiary amines, or quaternary amines, or ammonium; inorganic fluorides (MF) where suitable counter ion ($M^+$) include alkali metals (e.g., sodium, potassium), alkaline earth metals (e.g., calcium), transition metals, protonated primary, secondary, or tertiary amines, or quaternary amines, or ammonium; isothiocyanates including mustard oil; bacterial cultures that fix nitrogen to provide a source of nitrogen oxide including xanthine oxidase, nitrate reductases, nitrite reductases; betanine; erythrocine; and cochineal extracts.

Other myoglobin blooming agents include nitrogen heterocycles and derivatives. Examples of suitable nitrogen heterocycles include pyridines, pyrimidines (for example dipyridamole), pyrazines, triazines, purines (for example nicotinamide), nicotinates, niacin (also known as nicotinic acid), isoquinolines, imidazoles and derivatives and salts thereof. It is to be understood that these nitrogen heterocycles may be substituted or unsubstituted. For pyridines and isoquinolines, 3-carbonyl substituted compounds are preferred. Preferably, the nitrogen heterocycle is a pyridine, pyrimidine or imidazole. More preferably, the nitrogen heterocycle is an alkali or alkaline earth metal salt or ester of nicotinic acid which may include such esters as methyl nicotinate, ethyl nicotinate, propyl nicotinate, butyl nicotinate, pentyl nicotinate, hexyl nicotinate, methyl isonicotinate, isopropyl isonicotinate, and isopentyl isonicotinate. More preferably the nitrogen heterocycle is an alkali or alkaline earth metal salt or ester of nicotinamide. In another aspect, the nitrogen heterocycle is pyridine, pyrimidine, histidine, N-acetyl histidine, 3-butyroylpyridine, 3-valeroylpyridine, 3-caproylpyridine, 3-heptoylpyridine, 3-capryloylpyridine, 3-formylpyridine, nicotinamide, N-ethylnicotinamide, N,N-diethyinicotinamide, isonicotinic acid hydrazide, 3-hydroxypyridine, 3-ethyl pyridine, 4-vinyl pyridine, 4-bromo-isoquinoline, 5-hydroxyisoquinoline, or 3-cyanopyridine.

Myoglobin blooming agents also include any compound which acts as a ligand for myoglobin and leads to the formation of the desirable color, or any compound which acts as a substrate leading to the formation of such a ligand. For example, the myoglobin blooming agent can be a carbon monoxide donating compound. Carbon monoxide is known to complex with the heme pocket of myoglobin to form a desirable appearance in meat. A carbon monoxide donating compound is any compound that releases carbon monoxide or acts as a substrate leading to the formation of carbon monoxide. Alternatively, the blooming agent can be a sulfur monoxide (SO) donating compound, a nitrous oxide ($N_2O$) donating compound, an ammonia ($NH_3$) donating compound or a hydrogen sulfide donating compound. Such compounds donate the specified ligand or act as a substrate leading to the formation of the specified ligand. Compounds include ligand/heme/transition metal complexes, and ligand ferrous protoporphyrin complexes, including for example, carbon monoxide/heme/transition metal complexes, and carbon monoxide ferrous protoporphyrin complexes. Carbon monoxide donating compounds, sulfur monoxide donating compounds, nitrous oxide donating compounds and hydrogen sulfide donating compounds include polymeric materials with the appropriate donating functional group chemically bound to the polymer chain.

The myoglobin blooming agent is preferably present in a desired concentration in contact with a meat product. The food contact layer of a packaging film preferably contains a blooming agent in a concentration high enough to produce or preserve a desirable appearance in a meat product. Preferably, the blooming agent is present in a food contact layer in a concentration sufficient to convert at least 50% of the myoglobin molecules on a contacting meat surface to a desired ligand binding state. The concentration of blooming agent is preferably selected to bind ligands producing desirable appearance or color of the meat to the myoglobin molecules in the outermost ¼-inch or less of the meat product. For example, a nitric oxide donating myoglobin blooming agent is desirably present in a concentration sufficient to convert at least 50% of the myoglobin molecules on the contacting meat surface to nitric oxide myoglobin.

When the blooming agent is niacin, the concentration of niacin chosen is greater than the concentration of niacin naturally found in meat. According to Richardson et al., (1980, Composition of foods. Sausage and luncheon meats (Raw, Processed, Prepared) Handbook No. 8-7, USDA, Science and Education Administration, Washington, D.C.), niacin naturally occurs in poultry and red meat at about 0.05-0.09 mg/g. In the present invention, when niacin is employed as the blooming agent and incorporated in the meat product, it is typically used in amounts greater than 0.1 mg/g of meat.

The myoglobin blooming agent may be coated on the interior layer of a polymeric web by spraying or dusting or other application means or the blooming agent may be incorporated within the interior layer.

In other aspects, the myoglobin blooming agent is incorporated within the myoglobin-containing fresh meat product or coated on the surface of the myoglobin-containing fresh meat product. The myoglobin blooming agent may be coated on myoglobin-containing fresh meat product prior to packaging by spraying, dusting, dipping or other application means. The myoglobin blooming agent may be incorporated within the myoglobin-containing fresh meat product by mixing the blooming agent directly with the meat, such as with ground meat, for example. Alternatively, an aqueous composition of the blooming agent may be prepared and mixed with the meat. The aqueous composition may be a slurry of the myoglobin blooming agent with water or a solution of the myoglobin blooming agent in water.

Other additives known to one skilled in the art can be added in addition to the blooming agent. These additives can be added directly to the food product or to the packaging web, either incorporated within or coated or dusted on the surface. Examples of other additives include monosodium glutamate, salt, cereal, soybean flour, soy protein concentrate, lactose, corn syrup solids, antimycotics (which suppress the growth of yeasts and molds), antibiotics, sugar, glycerol, lactic acid, ascorbic acid, erythorbic acid, α-tocopherol, phosphates, rosemary extract and sodium benzoate.

Myoglobin blooming agents and solutions or dispersions thereof may be colorless, or, such as sodium nitrate, may have an intrinsic pale yellow color (i.e., may not be totally colorless), but this color does not typically have sufficient intensity itself to act as a significant colorant or color additive. However, this does not preclude either the use of colored myoglobin blooming agents which impart an intrinsic color or the combination of a myoglobin blooming agent in combination with one or more natural and/or artificial colorants, pigments, dyes and/or flavorants such as annatto, bixin, norbixin, beet powder, caramel, carmine, cochineal, turmeric, paprika, liquid smoke, erythrosine, betanine, one or more FD&C colorants, etc.

The myoglobin blooming agent is believed to cause an interaction with myoglobin in meat products, thereby maintaining, promoting or enhancing a desirable meat color. Myoglobin includes a non-protein portion called heme and a protein portion called globin. The heme portion includes an iron atom in a planar ring. The globin portion can provide a three-dimensional structure that surrounds the heme group and stabilizes the molecule. The heme group provides an open binding site that can bind certain ligands having the proper shape and electron configuration to the iron atom. When a ligand enters and binds to the heme pocket, the electron configuration of the ligand affects light absorption characteristics of the heme group. Therefore, the presence or absence of a ligand such as oxygen in the heme pocket, and the ligand itself can result in visible color changes of myoglobin.

When there is no ligand in the heme pocket, myoglobin is called deoxymyoglobin, which has a purple color (which is sometimes characterized as purple, deep red, dark red, reddish blue or bluish red). Molecular oxygen, $O_2$ ("oxygen"), readily acts as a ligand that binds to the heme group, permitting biological transport of oxygen from the blood stream to the mitochondria within cells. When oxygen binds to the heme pocket, purple deoxymyoglobin becomes oxymyoglobin, characterized by a red color. Upon dissociation of the oxygen ligand from oxymyoglobin, the iron atom is oxidized leaving the iron in the ferric state. The oxidation of the iron atom renders the molecule incapable of normal oxygen binding. As the chemical state of iron can change from ferrous ($Fe^{2+}$) to ferric ($Fe^{3+}$), the three-dimensional structure of the globin part can change in a manner that allows water molecules to bind to the heme pocket. Binding of a water molecule in the ferric iron containing heme pocket affects light absorption of the heme pocket. The oxidized form of myoglobin with a water molecule in the heme group is referred to as metmyoglobin and its color is brown. The oxidation of the iron atom is believed to result in a brown color. Heme ligands other than oxygen or water may also affect meat color. For example, the presence of carbon monoxide (CO) may cause fresh meat to have a desirable bright red color similar to oxygen. Although it has been suggested that nitric oxide (NO) can cause a dull red color (or stable pink color in the case of cured meat which also contains sodium chloride), it has been discovered that in the absence of oxygen, NO may produce a desired bright red color similar to that caused by oxygen in uncooked meat, especially in fresh, raw, unprocessed or uncured meat. It has been discovered that the development of this desired bright red color may take many hours and typically may take from 1 to 5 days and that initially, the meat color in a vacuum package having an oxygen barrier may turn to an undesirable brown until the unexpected transformation to the desired red takes place.

Other variables that affect the stability of the globin portion also affect the affinity of the heme group for oxygen and the tendency of the chemical state of the iron atom to become oxidized. Acidity and high temperature, such as that associated with cooking, can denature the globin part thus leading to instability of the heme group. In the absence of stabilizing ligands, the oxidation of the heme iron is automatic when the globin is denatured.

Myoglobin Blooming Agent Levels

In the present invention, oxygen barrier, food packaging articles may include food contact surfaces comprising a myoglobin blooming agent are provided. A "food contact surface" refers to the portion of a packaging material that is designed to contact a packaged meat product surface. Preferably, the food packaging article includes a food contact surface comprising a myoglobin blooming agent in an amount effective to promote or maintain a desirable color after contact with a meat product. The myoglobin blooming agent (MBA) preferably will contact the meat surface in an amount sufficient to produce a desired red color which preferably does not penetrate to an undesirable depth of the food thickness under reduced oxygen conditions (this color may take awhile to develop, e.g., 1 to 5 days). Beneficially, the MBA may be present on the food contact surface (or on the myoglobin-containing food product surface) in an amount of from about 0.01 to 3 to 5 to 10 µmoles/in² and in increments of 0.1 µmole thereof. Greater or lesser amounts of MBA may be used, and the color intensity may thereby be varied depending upon the relative amount of intrinsic myoglobin present in the meat.

Thus, the food contact surface of the food packaging article preferably contains a myoglobin blooming agent in a concentration high enough to produce and/or maintain a desired surface coloration of a fresh meat product, but low enough to prevent undesirable extension of the color into the body of the meat product. Preferably, the myoglobin blooming agent is present on a food contact surface in a concentration that is sufficient upon contact with a meat surface to convert at least 50% of the targeted myoglobin molecules to a desired ligand binding state. The available amount or concentration of myoglobin blooming agent is preferably selected to bind ligands producing desirable coloration of the meat in the outermost ¼-inch, or ⅙, ⅛, 1/10, 1/12, 1/16 or 1/20-inch or less of the meat product, although deeper penetrations may be accomplished if desired. For example, a nitric oxide donating myoglobin blooming agent is desirably present in a concentration sufficient to convert at least 50% of the myoglobin molecules on the contacting meat surface to nitric oxide myoglobin. The myoglobin blooming agent may be coated on the packaging article, e.g., a monolayer film or sheet, or on the interior layer of a multilayer film or sheet, tray, or it may be incorporated therein.

The myoglobin blooming agent is preferably evenly or uniformly distributed on the surface of the food contact surface. The minimum amount required to cause the desired coloration depends on the concentration of myoglobin present in the food product. For example, beef products containing 10 mg/g of myoglobin may require 10 times more myoglobin blooming agent than poultry products containing 1 mg/g of myoglobin. Also, if the desired depth of penetration is 0.25 inch, then, in order to affect all of the myoglobin molecules (molecular weight of myoglobin is about 17,000 g/mole) in 1 square inch of beef to a depth of 0.25 inch, there would have to be at least 2.4 µmole (micromoles) of the myoglobin blooming agent available for transfer via the surface of 1 square inch of film (one square inch of beef to a depth of about 0.25 inch equals about 4.1 grams of meat (specific gravity of 1 g/cc)). Sodium nitrite as a preferred myoglobin blooming agent has a molecular weight of 69 g/mole. Thus 2.4 µmole of $NaNO_2$ weighs 0.166 mg and the total amount of myoglobin in 4.1 grams of meat containing 10 mg/g is 41 mg. Beef meat typically contains myoglobin at a level of 3-20 mg/g. The preferred amount of myoglobin blooming agent that is present in the article for beef provides 0.36-4.8 µmoles/$in^2$. Similarly, pork contains myoglobin at a level of 1-5 mg/g. A packaging article for this application would preferably provide 0.12-1.20 µmoles/$in^2$ MBA. For poultry having less than 1 mg/g of myoglobin, the packaging article preferably would provide less than 0.12 µmoles/$in^2$, e.g., 0.06 µmoles/$in^2$ of MBA. An article using sodium nitrite (MW=69 g/mole) as a myoglobin blooming agent would preferably provide 0.025-0.166 mg/$in^2$ for beef meat products; 0.008-0.050 mg/$in^2$ for pork meat products; and less than 0.008 mg/$in^2$ for poultry meat products. An article providing 0.17 mg/$in^2$ would be suitable for a variety of types of fresh meat.

A higher amount of myoglobin blooming agent may be preferred for darker colored muscles that may contain higher levels of myoglobin. When the myoglobin blooming agent is incorporated into the polymer matrix that comprises the food contact layer of a monolayer or multilayer packaging film or sheet, only a portion of it is able to effectively migrate from the film surface into the product's surface to interact with the myoglobin. Web inclusion levels of up to 20 times or higher of the amount required for effective color fixing are anticipated.

Thus, the amount of myoglobin blooming agent per unit area of the food contact surface can be selected to provide a desired food coloration of a packaged fresh meat product surface. For example, the food contact layer may include about 0.005 to about 0.900 mg/$in^2$ of a myoglobin blooming agent such as sodium nitrite, preferably about 0.010 to about 0.400 mg/$in^2$ and most preferably about 0.100 to about 0.300 mg/$in^2$. For beef products, a food contact layer may include, e.g., about 0.200 to about 0.250 mg/$in^2$, e.g., of a sodium nitrite myoglobin blooming agent, while lower concentrations, e.g., of about 0.100 to about 0.150 mg/$in^2$ may be used for pork products.

A uniform dispersion or coating having particle size of 35 micrometers (µm) or less, preferably 10 µm or less is desirable. Although larger particle sizes may also be used, the packaging web prior to use is less aesthetically pleasing. If particle size is too large, the myoglobin containing product may exhibit an initial spotty appearance, although results tend to even out and become more uniform over time and a desirable color uniformity (i.e., lack of spottiness or blotches) is often present upon color transformation from brown to red. Advantageously, the myoglobin blooming agent may be applied in a manner to wet out the surface of the food contact layer of the web using film forming agents, surfactants, binding agents and other compounds for the purpose. For example, the myoglobin blooming agent according to the present invention may be sprayed on a food contact surface of a film or sheet. Tubular films and casings also may be coated by other means (including the well known methods of dipping and slugging). Typical myoglobin blooming agents do not easily pass through the film or sheet wall and therefore it is preferable to slug the myoglobin blooming agent inside the tube and/or apply the myoglobin blooming agent to the inner surface of the tube (e.g., during a shirring operation) via a spray. The application of myoglobin blooming agent to the inside the tube is preferred because external application (e.g., by dipping) would require a complex and more costly operation of turning the tube inside out to provide contact between the myoglobin blooming agent and the meat contact surface. Application of other additives and coating compositions via solution spraying during or just prior to shirring is convenient, economical and facilitates placement of a regular measured distribution of a coating on the interior tube surface. For example, lubricants and other compositions have been applied by various means such as slugging, spraying, or contact coating the inner surface of a tubular polymeric casing via a shirring mandrel and such means are well known (See, e.g., U.S. Pat. No. 3,378,379 (Shiner); U.S. Pat. No. 3,451,827 (Bridgeford); U.S. Pat. No. 4,397,891 (Kaelberer et al.); U.S. Pat. No. 5,256,458 (Oxley et al.); U.S. Pat. No. 5,573,800 (Wilhoit); and U.S. Pat. No. 6,143,344 (Jon et al.), which are all incorporated by reference in their entireties.) Packages made according to the present invention may be coated with the inventive myoglobin blooming agent by slugging to provide a uniformly thick coating.

Tubular forms or nontubular (e.g., sheets) forms of the food packaging web may be coated by dry or wet spraying or dusting or by roll coating or coating using a Mayer bar or doctor blade, or by printing means (e.g., using gravure or flexography printing) or by using electrostatic transfer. Also, application may occur at various points in the manufacturing process including for example, by blending, incorporation in a masterbatch or addition to the polymeric layer prior to extrusion, or by dusting, spraying or coating during or after extrusion or during bubble or tube formation or during winding, or bag making e.g. in a dusting or powdering step.

In one embodiment of the invention, it is contemplated that a food contact layer may comprise between about 1,000 ppm (0.1%) and about 50,000 ppm (5.0%) of a myoglobin blooming agent, more preferably about 5,000 ppm to about 25,000 ppm, and most preferably about 7,500 ppm to about 20,000 ppm. Typically, a food contact layer comprises about 1.5 weight % to about 2.0 weight % or less (15,000 ppm-20,000 ppm) of a nitrite salt for packaging a fresh ground beef product, or about 0.75 weight % to about 1.5 weight % of a nitrite salt for packaging a fresh pork meat product. Amounts in a range of 0.75 to 2.25 weight % may be advantageously employed for a variety of meats.

According to the invention, single-layer food packaging webs may be provided that comprise a myoglobin blooming agent. In another embodiment, the food packaging web may also be a multilayer web. The inventive food packaging webs can have any suitable composition or configuration. Preferably, the food packaging web fulfills multiple functional requirements which may be present in one or more or a combination of layers. For example, a single layer web may combine the functions of oxygen barrier and myoglobin blooming agent contact with one or more additional functions such as puncture resistance, abuse resistance, printability, moisture barrier, heat sealability, transparency, high gloss, low toxicity, high temperature resistance, low temperature flexibility, etc. Alternatively, multiple layers may be employed to add functionality. The present invention is adapted for use in a wide variety of commercially available packaging films such as those sold by: Curwood, Inc. under the trademarks ABP, Clear-Tite, Cook-Tite, Perflex, Pro- Guard, Pro-Tite, Curlam®, Curlon® and Surround; and by others, e.g., marketed by Alcan, Asahi, Cryovac, Kureha, Vector, Pactiv, Printpack, Viskase and Wipak, under the trademarks or brand names Cryovac® T-Series, Cryovac® E-Seal Materials, Alcan Q® Series, Alcan Peel Rite™ Peel Systems, Alcan $Q^4$ Forming Films, Krehalon®, Alcan Mara Flex® Non-Forming Films, Wipak Combitherm, Wipak Bialon, Wipak Biaxer, and Wipak Biaxop. A typical beneficial food packaging web according to embodiments of the present invention may have an interior surface food contact layer which also serves as a sealant layer, and a heat resistant and abuse resistant exterior surface layer with a core layer there between which comprises an oxygen barrier material. Another common suitable web has adhesive layers on either side of the core oxygen barrier layer to connect with the surface layers.

In another embodiment of the invention, a food package may comprise a myoglobin-containing food product such as fresh meat having a water content of at least 5 wt. %, and less than 1.0 wt. % sodium chloride; and a container comprising an oxygen barrier thermoplastic film having a polymeric food contact layer and a tray; wherein the container encloses the food product in a reduced oxygen environment; and the food product is maintained in a modified atmosphere comprising a nitrogen or sulfur containing gaseous myoglobin blooming agent, or mixtures thereof. The MBAs described throughout this specification may also be used in this embodiment. It is further contemplated that either gaseous or non-gaseous MBAs may be used as well as combinations thereof in various embodiments of the invention.

The multilayer food packaging web embodiments of the present invention may have an exterior surface and an interior surface, and include 2, 3, 4, 5, 6, 7, 8, 9, or more polymeric web layers.

Web Thickness

The food packaging article may be in the form of a monolayer or multilayer web having a total thickness of less than about 10 mils, more preferably the web has a total thickness of from about 0.5 to 10 mils (12.7-254 microns (μ)). Advantageously, many embodiments may have a thickness from about 1 to 5 mil, with certain typical embodiments being from about 1.5 to 3 mil. For example, entire single or multilayer films or any single layer of a multilayer film can have any suitable thicknesses, including 1, 2, 3, 4, 5, 6, 7, 8, 9, or 10 mils, or any increment of 0.1 or 0.01 mil therebetween. Thicker and thinner films are also provided. Although suitable webs for packaging foodstuffs as thick as 4 mil (101.6 microns) or higher, or as thin as 1 mil (25.4 microns) or less may be made, it is expected that the most common webs will be between about 1.5-3 mil (38-76 microns). Especially preferred for use as films for food packaging are films where the multilayer films have thicknesses of between about 2 to 3 mil (50.8-76.2 microns). Such films may have good abuse resistance and machinability.

The food packaging article may be in the form of a monolayer or multilayer sheet having a total thickness of at least 10 mil, more preferably the sheet has a total thickness of from about 10 to 50 mil, most preferably the sheet has a total thickness of from about 10 to 30 mil.

Food Contact/Heat Sealing Layers

It is essential that the food packaging web of the present invention have a food contact layer. This food contact layer may also function as a heat sealing or heat sealable layer to facilitate formation of hermetically sealed packages, although tubular plastic casings may also be used and sealed, e.g., by clips as known in the art. Preferred webs of the present invention utilize a food contact layer which has heat sealing properties.

The terms "heat sealing layer" or "sealant layer" are used interchangeably to refer to a layer which is heat sealable, i.e., capable of fusion bonding by conventional indirect heating means which generate sufficient heat on at least one film contact surface for conduction to the contiguous film contact surface and formation of a bond interface therebetween without loss of the web integrity. The bond interface between contiguous inner layers preferably has sufficient physical strength to withstand the packaging process and subsequent handling including, e.g., tensions resulting from stretching or shrinking attendant with the presence of a food body sealed within a package utilizing a film having a heat sealable layer. Advantageously, the bond interface is preferably sufficiently thermally stable to prevent gas or liquid leakage therethrough when exposed to above or below ambient temperatures, e.g., during one or more of the following: packaging operations, storage, handling, transport, display, or processing of food. Heat seals may be designed to meet different conditions of expected use and various heat seal formulations are known in the art and may be employed with the present invention. In certain optional embodiments, heat seals may be subjected to pasteurization or cook-in temperatures and conditions, e.g., in a sealed bag, vacuum skin package (vsp) or sealed tray form. For use in cook-in applications, heat seals should withstand elevated temperatures up to about 160-180° F. (71-82° C.) or higher, e.g., 212° F. (100° C.) for extended periods of time, e.g., up to 4 to 12 hours in environments which may range from heated humidified air or steam to submersion in heated water. Preferably, the food contact or heat seal layer is heat sealable to itself, but may be sealable to other objects, films or layers, e.g., to a tray when used as a lidding film, or to an outer layer in a lap seal or in certain tray overwrap embodiments. Also, in certain embodiments, the myoglobin blooming agent containing food contact layer need not be heat sealable.

A sealing layer is preferably positioned at or near the interior surface of the packaging web, and can be an interior surface layer which allows a monolayer or multilayer web to be formed into a resulting package, e.g., when used as a clamshell container, sealed to a tray, e.g., when used as a lidding film or sheet, or sealed to a lidding film or sheet, e.g., when used as a tray. The sealant layer may comprise a myoglobin blooming agent and a suitable heat-sealable polymer, such as a polyethylene, ethylene-α-olefin copolymer, nylon blend, ionomer or polyester. The exterior layer may also be a heat sealable layer and used in place of or in addition to the interior layer for this purpose.

The food contact layer may comprise a sealant layer and may comprise a heat sealable polymeric material such as a polyolefin or blend thereof, e.g., polyethylenes such as low density polyethylene (LDPE), high density polyethylene (HDPE), ethylene α-olefin copolymers (EAO), including, e.g., plastomers, very low density polyethylene (VLDPE), and linear low density polyethylene (LLDPE) or polypropylene homopolymers, polypropylene copolymers, polybutylene homopolymers, polybutylene copolymers, or homogeneous polyolefin resins, such as those made with constrained geometry catalysts or metallocene single-site catalysts, including, e.g., copolymers of ethylene or propylene with at least one $C_{4-8 \; or \; higher}$ α-olefins (e.g., butene-1, hexene-1 or octene-1 or combinations thereof) with a majority of polymeric units derived from ethylene or propylene. Ethylene vinyl acetate (EVA) copolymers, ethylene butyl acrylate copolymers (EBA), ethylene methyl acrylate copolymers (EMA), ethylene methacrylic acid copolymers (EMAA), ethylene ethyl acrylate copolymers (EEA), polyesters or ionomers are also suitable materials for forming the inner surface heat sealable layer. A food contact and/or sealant layer may also comprise an ionomer which is essentially a metal salt neutralized copolymer of ethylene and acrylic or methacrylic acid. Suitable sealant/food contact layer materials often include ionomers, polyolefins or blends thereof, such as those disclosed in U.S. Pat. Nos. 6,964,816; 6,861,127; 6,815,023; 6,773,820; 6,682,825; 6,316,067; and 5,759,648; 5,663,002; and U.S. Patent Application Publication Nos.: 2005/0129969 (Schell et al.); and 2004/0166262 (Busche et al.) which are hereby incorporated by reference herein. Food contact or sealant layers may also comprise nylon, polyesters such as polyethylene terephthalate (PET), polycarbonates, cyclic olefin copolymers, polyacrylonitrile or copolymers or blends thereof. The food contact layer may be 100% of the thickness of the total structure. The food contact or sealant layers in multilayer structures may be of any thickness with thicknesses in multilayer structures of up to 1% to 5% to 15% to 50% or more of the total thickness contemplated. Preferred examples of such sealable resins comprising a food contact and/or sealant layer include ethylene α-olefin copolymers commercially available from: Dow Chemical Company under trade names of "AFFINITY", "ATTANE" or "ELITE" (including octene-1 as α-olefin); and ExxonMobil Co. under a trade name of "EXACT" (including hexene-1, butene-1 and octene-1 as comonomer); ionomers commercially available from DuPont Company under the trade name Surlyn®.

Barrier Layers

Barrier layers can be made comprising a myoglobin blooming agent. The barrier layer preferably functions as a gas barrier layer, although other types of barriers such as moisture barrier layers can also include the myoglobin blooming agent. The gas barrier layer is preferably an oxygen barrier layer, and is preferably a core layer positioned between the first and second layers. For example, the oxygen barrier layer can be in contact with a first surface layer and an adhesive layer or may be sandwiched between two tie layers and/or two surface layers.

To achieve all the benefits of the present invention, it is essential that the myoglobin blooming agent web be used in a package in combination with a reduced oxygen atmosphere. The barrier layer can provide a suitable barrier to oxygen for the desired preservation of the article to be packaged under the anticipated storage conditions. In one aspect, an oxygen barrier is used in the meat package or packaging web that is maintained at a reduced oxygen atmosphere. The oxygen barrier is preferably selected to provide oxygen permeability sufficiently diminished to permit a desirable color to be induced or maintained within the packaged meat. For example, a film or sheet may comprise an oxygen barrier having an oxygen permeability that is low enough to reduce the activity of metmyoglobin reducing enzymes that reduce myoglobin in the meat, and/or maintain a reduced oxygen atmosphere in contact with the meat to reduce oxygen binding to myoglobin on the surface of the packaged fresh meat.

The oxygen barrier layer can comprise any suitable material, such as nylon, EVOH, PVOH, polyvinylidene chloride, polyamide, polyester, polyalkylene carbonate, polyacrylonitrile, nanocomposite, a foil, e.g., aluminum foil, a metallized film such as aluminum vapor deposited on a polyolefin or polyester, etc., as known to those of skill in the art. The oxygen barrier layer of a film or sheet may preferably comprise polyvinyl alcohol copolymer or EVOH, although oxygen barrier layers comprising polyvinylidene chloride-vinyl chloride copolymer (PVDC or VDC-VC) or vinylidene chloride-methyl acrylate copolymer (VDC-MA) as well as blends thereof may also be preferable. The barrier layer may also provide desirable optical properties when stretch oriented, including transparency and low haze and a stretching behavior compatible with the layers around it. It is desirable that the thickness of the barrier layer be selected to provide the desired combination of the performance properties sought, e.g., with respect to oxygen permeability, shrinkage values especially at low temperatures, ease of orientation, delamination resistance, and optical properties. Suitable thicknesses in multilayer films are less than 15%, e.g., from 3 to 13% of the total film thickness and preferably less than about 10% of the total thickness of the multilayer film. Greater thicknesses may be employed however oxygen barrier polymers tend to be relatively expensive and therefore it is expected that less costly resins will be used in other layers to impart desirable properties once a suitable thickness is used to achieve the desired gas barrier property for the film layer combination. For example, the thickness of a core oxygen barrier layer may advantageously be less than about 0.45 mil (10.16 microns) and greater than about 0.05 mil (1.27 microns), including 0.10, 0.20, 0.25, 0.30, 0.40, or 0.45 mil thick.

Preferably, multilayer webs include a core oxygen barrier layer. Any suitable material can be used to form an oxygen barrier layer. The oxygen barrier layer of a web may preferably comprise EVOH, although oxygen barrier layers comprising polyvinylidene chloride-vinyl chloride copolymer (PVDC or VDC-VC) or vinylidene chloride-methyl acrylate copolymer (VDC-MA) as well as blends thereof, may also be preferable. One preferred EVOH barrier material is a 44 mol % EVOH resin E151 B sold by Eval Company of America, under the trade name Eval® LC-E151B. Another example of an EVOH that may be acceptable can be purchased from Nippon Gohsei (or Soarus, LLC in the USA) under the trade name Soarnol® AT (44 mol % ethylene EVOH) or Soarnol® ET (38 mol % ethylene EVOH). Oxygen barrier films comprising EVOH for packaging food products containing a myoglobin blooming agent can be formed by methods disclosed in U.S. Pat. Nos. 7,018,719; 6,815,023; 6,777,046; 6,511,688; 5,759,648; 5,382,470; and 4,064,296 all of which are incorporated by reference in their entireties.

Suitable nylons or nylon blends may also be used to impart oxygen barrier properties. Combinations of barrier materials may also be used. For example, multiple barrier layers of nylon and EVOH are often used to impart suitable barrier properties in food and meat packaging as are blends of EVOH and nylon. These and other known materials can also be used to form an oxygen barrier layer. The barrier layer also provides desirable optical properties including transparency and low haze.

For perishable food packaging, the oxygen ($O_2$) permeability desirably should be minimized. Typical oxygen barrier webs will have an $O_2$ permeability of less than about 310 $cm^3/m^2$ for a 24 hour period at 1 atmosphere, 0% relative humidity and 23° C., and preferably less than 75 $cm^3/m^2$/day, more preferably less than 20 $cm^3/m^2$/day. Barrier resins such as PVDC or EVOH in the core layer may be adjusted by blending in compatible polymers to vary orientation parameters or the gas permeability, e.g. $O_2$, of the films (or sheets). The thickness of the core layer may also be varied and beneficially may be from about 0.05 to about 0.30 mil (1.3-7.62 microns).

Abuse-Resistant Outer Layer

Since it is seen by the user/consumer, in both the monolayer and multilayer packaging webs embodiments of the invention, the exterior surface of the web should enhance optical properties of the film or sheet and may preferably have high gloss. Also, it should withstand contact with sharp objects and provide abrasion resistance, and for these reasons, it is often termed the abuse-resistant layer. This exterior abuse-resistant layer may or may not also be used as a heat sealable layer. As the exterior surface layer of the web, this layer most often is also the exterior layer of any package, bag, pouch, tray or other container made from the inventive web, and is therefore subject to handling and abuse, e.g., from equipment during packaging, and from rubbing against other packages and shipping containers and storage shelves during transport and storage. This contact causes abrasive forces, stresses and pressures which may abrade away the film causing defects to printing, diminished optical characteristics or even punctures or breaches in the integrity of the package. Therefore, the exterior surface layer is typically made from materials chosen to be resistant to abrasive and puncture forces and other stresses and abuse which the packaging may encounter during use. The exterior surface layer should be easy to machine (i.e., be easy to feed through and be manipulated by machines, e.g., for conveying, packaging, printing or as part of the web or bag manufacturing process). It should also facilitate stretch orientation where a high shrinkage film is desired, particularly at low temperatures such as 90° C. and lower. Suitable stiffness, flexibility, flex crack resistance, modulus, tensile strength, coefficient of friction, printability, and optical properties are also frequently designed into exterior layers by suitable choice of materials. This layer may also be chosen to have characteristics suitable for creating desired heat seals which may be resistant to burn through, e.g., by impulse sealers, or may be used as a heat sealing surface in certain package embodiments, e.g., using overlap seals.

The exterior layer may be formed of a similar blend to that of the interior layer. In one embodiment, at least one and preferably both interior and exterior layers utilize polyolefin resins, preferably a blend of (i) EVA, (ii) EAO (such as VLDPE), and (iii) an ethylene-hexene-1 copolymer having a mp of 80 to 98° C., preferably 80 to 92° C. Each of the three polymers typically comprises 20 to 40 weight % of the layer. EVA, when used in the outer layer preferably has 3% to 18% vinyl acetate content to provide good shrinkability, if shrinkability is desired. Blends of EAOs are also usefully employed in the outer layer.

The exterior layer thickness for multilayer webs is typically 0.5 to 2.0 mil. Thinner layers may be less effective for abuse resistance, however thicker layers, though more expensive, may advantageously be used to produce webs having unique highly desirable puncture resistance and/or abuse resistance properties. Heavy gauge films, typically 5 to 7 mil or more, are needed in demanding applications, which are usually satisfied by very expensive and complex laminated film structures and/or secondary packaging materials such as bone guards, pads, and overwrap.

In one barrier layer embodiment of this invention, an exterior thermoplastic layer of the enclosing multilayer web is on the opposite side of a core layer from the interior layer, and in direct contact with the environment. In a suitable three layer embodiment, this exterior layer is directly adhered to the core layer which is preferably an oxygen barrier layer.

Intermediate Layers

An intermediate layer is any layer between the exterior layer and the interior layer and may include oxygen barrier layers, tie layers or layers having functional attributes useful for the film structure or its intended uses. Intermediate layers may be used to improve, impart or otherwise modify a multitude of characteristics, e.g., printability for trap printed structures, shrinkability, orientability, processability, machinability, tensile properties, drape, flexibility, stiffness, modulus, designed delamination, easy opening features, tear properties, strength, elongation, optical, moisture barrier, oxygen or other gas barrier, radiation selection or barrier, e.g., to ultraviolet wavelengths, etc.

Tie Layers

In addition to the exterior layer, the interior layer, and intermediate layer such as a barrier layer, a multilayer packaging web can further comprise one or more adhesive layers, also known in the art as "tie layers," which can be selected to promote the adherence of adjacent layers to one another in a multilayer web and prevent undesirable delamination. A multifunctional layer is preferably formulated to aid in the adherence of one layer to another layer without the need of using separate adhesives by virtue of the compatibility of the materials in that layer to the first and second layers. In some embodiments, adhesive layers comprise materials found in both the first and second layers. The adhesive layer may suitably be less than 10% and preferably between 2% and 10% of the overall thickness of the multilayer film. Adhesive resins are often more expensive than other polymers so the tie layer thickness is usually kept to a minimum consistent with the desired effect. In one embodiment, a multilayer web comprises a three layer structure with an adhesive layer positioned between and in contact with the first layer and the second layer. In another embodiment, a multilayer web comprises a multilayer structure comprising a first adhesive layer positioned between and in direct contact with the exterior layer and a core oxygen barrier layer; and preferably and optionally, has a second tie layer between and in direct contact with the same core oxygen barrier layer and the interior layer to produce a five layer film.

Multilayer films and sheets can comprise any suitable number of tie or adhesive layers of any suitable composition. Various adhesive layers are formulated and positioned to provide a desired level of adhesion between specific layers of the film according to the composition of the layers contacted by the tie layers.

For example, adhesive layers in contact with a layer comprising polyester, such as PET, preferably comprise a suitable blend of polyolefins with other adhesive polymers. One preferred component of an adhesive layer in contact with a PET polyester layer is EMAC SP 1330 (which reportedly has: a density of 0.948 g/cm$^3$; melt index of 2.0 g/10 min.; a melting point of 93° C.; a softening point of 49° C.; and a methyl acrylate (MA) content of 22%).

The interior, exterior, intermediate or tie layers may be formed of any suitable thermoplastic materials, for example, polyamides, polystyrenes, styrenic copolymers, e.g., styrene-butadiene copolymer, polyolefins, and in particular members of the polyethylene family such as LLDPE, VLDPE, HDPE, LDPE, ethylene vinyl ester copolymer or ethylene alkyl acrylate copolymer, polypropylenes, ethylene-propylene copolymers, ionomers, polybutylenes, alpha-olefin polymers, polyesters, polycarbonates, cyclic olefin copolymers, polyurethanes, polyacrylamides, anhydride-modified polymers, acrylate-modified polymers, polylactic acid polymers, or various blends of two or more of these materials.

In another embodiment, the exterior, interior and/or one or more intermediate layers can comprise or consist essentially of a nylon blend composition. Preferably, the nylon blend composition comprises at least an amorphous nylon such as nylon 6I/6T copolymer, in combination with at least one semi-crystalline nylon homopolymer or copolymer such as nylon 6/12, nylon 6/6,9, nylon 6/6,6, MXD6 nylon, nylon 6, nylon 11, or nylon 12.

In another embodiment of the invention, one or more of the exterior, interior and/or one or more intermediate layers comprises at least one polyester polymer. Preferred polyester polymers comprise aromatic polyesters and more preferably, are homopolymers or copolymers of polyethylene terephthalate (PET), polyethylene naphthalate and blends thereof. Suitable polyesters may have an intrinsic viscosity of about 0.60 to about 1.2, preferably between 0.60 to 0.80. The polyester may be an aliphatic polyester resin, but is preferably an aromatic polyester resin. For example, polyester materials can be derived from dicarboxylic acid components, including terephthalic acid and isophthalic acid as preferred examples, and also dimers of unsaturated aliphatic acids. More specifically, examples of dicarboxylic acids constituting the polyester resin may include: terephthalic acid, isophthalic acid, phthalic acid, 5-t-butylisophthalic acid, naphthalenedicarboxylic acid, diphenyl ether dicarboxylic acid, cyclohexanedicarboxylic acid, adipic acid, oxalic acid, malonic acid, succinic acid, azelaic acid, sebacic acid, and dimer acids comprising dimers of unsaturated fatty acids. These acids may be used singly or in combination of two or more species. Examples of a diol component as another component for synthesizing the polyester may include: polyalkylene glycols, such as ethylene glycol, propylene glycol, tetramethylene glycol, 1,4-butanediol, 1,3-propanediol, neopentyl glycol, hexamethylene glycol, diethylene glycol, polyethylene glycol and polytetramethylene oxide glycol; 1,4-cyclohexane-dimethanol, and 2-alkyl-1,3-propanediol. The diols may be used singly or in combination of two or more species.

Polyester compositions that comprise an aromatic polyester resin comprising an aromatic dicarboxylic acid component can be preferred in some aspects, including, e.g., polyesters between terephthalic acid (as a dicarboxylic acid) and diols having at most 10 carbon atoms, such as polyethylene terephthalate and polybutylene terephthalate. Particularly preferred examples thereof may include: copolyesters obtained by replacing a portion, preferably at most 30 mol %, more preferably at most 15 mol %, of the terephthalic acid with another dicarboxylic acid, such as isophthalic acid; copolyesters obtained by replacing a portion of the diol component such as ethylene glycol with another diol, such as 1,4-cyclohexane-dimethanol (e.g., "Voridian 9921", made by Voridian division of Eastman Chemical Co.); and polyester-polyether copolymers comprising the polyester as a predominant component (e.g., polyester-ether between a dicarboxylic acid component principally comprising terephthalic acid or/and its ester derivative and a diol component principally comprising tetramethylene glycol and tetramethylene oxide glycol, preferably containing the polytetramethylene oxide glycol residue in a proportion of 10-15 weight %). It is also possible to use two or more different polyester resins in mixture. Examples of preferred polyesters are available under the trademarks Voridian 9663, Voridian 9921 and EASTAR® Copolyester 6763, all from Eastman Chemical Company, Kingsport, Tenn., U.S.A. U.S. Pat. No. 6,964,816 to Schell et al., U.S. Pat. No. 6,861,125 to Carlson et al., and U.S. Pat. No. 6,699,549 to Ueyama et al., and co-pending U.S. patent application Ser. No. 10/795,567 to Lischefski which are incorporated herein by reference in their entireties, disclose multilayer structures comprising a polyester layer, and a polyamide layer.

Optional Additives to Layers

Various additives may be included in the polymers utilized in one or more of the exterior, interior and intermediate or tie layers of food packaging webs. For example, a layer may be coated with an antiblock powder. Also, conventional antioxidants, antiblock additives, polymeric plasticizers, acid, moisture or gas (such as oxygen) scavengers, slip agents, colorants, dyes, pigments, organoleptic agents may be added to one or more web layers of the web or it may be free from such added ingredients. If the exterior layer is corona treated, slip agent may be used or not, but it will contain or be coated with an antiblock powder or agent such as silica or starch. Processing aides are typically used in amounts less than 10%, less than 7% and preferably less than 5% of the layer weight. Preferred processing aids for use in the outer layer of the web may include one or more of fluoroelastomers, stearamides, erucamides, and silicates.

Preferred webs may also provide a beneficial combination of one or more or all of the properties including low haze, high gloss, high or low shrinkage values at 90° C. or less, good machinability, good mechanical strength and good barrier properties including high barriers to oxygen and water. In one aspect, the web has a gloss value of at least 70 at 45° C.

Methods of Manufacture

The inventive monolayer or multilayer packaging webs may be made by conventional processes which are modified to provide for inclusion of a myoglobin blooming agent. These processes to produce flexible webs may include, e.g., cast or blown film processes. The monolayer and multilayer webs may be manufactured by known methods in the art as modified as described herein for inclusion of a myoglobin blooming agent. Descriptions of suitable web manufacturing and orientation processes are disclosed in, e.g., U.S. Pat. Nos. 5,759,648; 6,316,067 and 6,773,820, and U.S. Patent Application Publication No. 2004/0166262 (Busche et al.), entitled, "Easy Open Heat-Shrinkable Packaging," all of which are incorporated herein by reference in their entireties.

Various manufacturing methods may be used as will be apparent to those skilled in the art in view of the present teaching. For example, U.S. Pat. No. 4,448,792 (Schirmer) discloses a method comprising the steps of coextrusion, biaxial orientation and irradiation, and U.S. Pat. No. 3,741,253 (Brax et al.) discloses a method of extrusion, irradiation, extrusion lamination/coating and biaxial orientation, and both patents are hereby incorporated by reference in their entireties. The processes may be modified to eliminate uniaxial or biaxial orientation or to add a subsequent annealing step to form a non-shrink film.

In a preferred process for making webs, the resins and any additives are introduced to an extruder (generally one extruder per layer) where the resins are melt plastified by heating and then are transferred to an extrusion (or coextrusion) die for formation into a tube and/or flat web. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other process parameters chosen. However, variations are expected which may depend upon such factors as variation of polymer resin selection, use of other resins, e.g., by blending or in separate layers in the multilayer web, the manufacturing process used and particular equipment and other process parameters utilized. Actual process parameters including process temperatures are expected to be set by one skilled in the art without undue experimentation in view of the present disclosure.

As generally recognized in the art, resin properties may be further modified by blending two or more resins together and it is contemplated that various resins including, e.g., homopolymers and copolymers may comprise or be blended into individual layers of the multilayer web or added as additional layers, such resins include polyolefins such as ethylene-unsaturated ester copolymer resins, especially vinyl ester copolymers such as EVAs, or other ester polymers, very low density polyethylene (VLDPE), linear low density polyethylene (LLDPE), low density polyethylene (LDPE), high density polyethylene (HDPE), ionomers, or polypropylenes. Other polymers that may be included as separate layers or in combination include polyamides such as nylon, PVDC, EVOH, and PET. These resins and others may be mixed by well known methods using commercially available tumblers, mixers or blenders.

Also, if desired, well known additives such as antioxidant, processing aids, slip agents, antiblocking and antifogging agents, pigments, spoilage indicators, etc., and mixtures thereof may be incorporated into the web. For example, the myoglobin blooming agent containing layer and/or other layers may further comprise an antioxidant, a slip agent, an antiblock agent, a colorant, a color enhancer, a flavorant, an odorant, an organoleptic agent, a meat spoilage indicator, a coefficient of friction modifying agent, a lubricant, a surfactant, an encapsulating agent, an oxygen scavenger, a pH modifying agent, a film forming agent, an emulsifier, a polyphosphate, a humectant, a drying agent, an antimicrobial agent, a chelating agent, a binder, a starch, a stabilizer, a buffer, a phospholipid, an oil, a fat, a protein, a polysaccharide, a transfer agent, or a combination thereof. Examples of particular compositions that may be added include: α-tocopherol; alcohol; annatto; ascorbic acid; beet powder; BHA; BHT; bixin; caramel; carmine; carotenoid pigment; casein; cochineal; cyclodextrin; dextrin; erucamide; ethoxylated mondiglycerides; fluoroelastomer; food grade oil; glycerin; lecithin; liquid smoke; nisin; norbixin; pediocin; polysorbate; potassium chloride; rosemary extract; shellac; sodium chloride; sodium erythorbate; starch; trisodium polyphosphate; turmeric; water; water soluble cellulose ether; and zein. Examples of coloring agents include methionine, cysteine and cooked cured meat pigments. Cooked cured meat pigments comprise a mononitric oxide complex of protoporphyrin Fe (II). Cooked cured meat pigments can be formed by reacting red blood cells with a nitrosating agent and a reductant and elevated temperatures as described in U.S. Pat. Nos. 5,230,915; 5,443,852, and 5,425,956, which are hereby incorporated by reference herein.

Various polymer modifiers may be incorporated for the purpose of improving toughness, orientability, extensibility and/or other properties of the web. Other modifiers which may be added include modifiers which improve low temperature toughness or impact strength and modifiers which reduce modulus or stiffness. Exemplary modifiers include styrene-butadiene, styrene-isoprene, and ethylene-propylene copolymers.

As used herein, the phrase "machine direction", herein abbreviated "MD", refers to a direction "along the length" of the film, i.e., in the direction of the film as the film is formed during extrusion and/or coating. As used herein, the phrase "transverse direction", herein abbreviated "TD", refers to a direction across the film, perpendicular to the machine or longitudinal direction.

Typically, films may be made heat shrinkable by stretch orientation. Stretch orientation may be accomplished by various known methods, e.g. machine direction (MD) orientation is preferably accomplished with the use of sets of nip rolls rotating at different speeds to stretch or draw the film, sheet or tube in the machine direction thereby causing machine direction elongation which is set by cooling. Other methods include tentering which is commonly employed to orient sheets, or the well-known trapped bubble or double bubble technique for orienting tubes as for examples described in U.S. Pat. No. 3,311,679 (E. J. Moore) and U.S. Pat. No. 3,456,044 (Pahlke) which are hereby incorporated by reference in their entireties. In the double bubble technique, an extruded primary tube leaving a tubular extrusion die is cooled, collapsed or not collapsed, and then preferably oriented by reheating and inflating to form an expanded secondary bubble, which is again cooled and collapsed. This collapsed stretched film may be wound on a reel as a tube or slit into sheets or webs and wound, or it may be further processed, e.g., by annealing or crosslinking irradiation as described below.

Heat shrinkable films are typically biaxially stretched. Transverse direction (TD) orientation is accomplished by the above noted inflation to radially expand the heated film which is cooled to set the film in an expanded form or by pulling the film in the transverse direction during tentering. Orientation may be in either or both directions. Preferably, a primary tube is simultaneously biaxially stretched radially (transversely) and longitudinally (machine direction) to produce a multilayer film which is heat shrinkable at temperatures below the melting points of the major polymeric components, e.g., at 90° C. or lower. The stretch ratio during orientation should be sufficient to provide a film with a total thickness of 10 mil or less and preferred films will be under 5 mil and typically between about 1.0 and 4.0 mils. The MD stretch ratio is typically 2½-6 and the TD stretch ratio is also typically 2½-6. An overall or total stretch ratio (MD stretch multiplied by TD stretch) of about 6¼x-36x is suitable.

The general annealing process by which biaxially stretched heat shrinkable films are heated under controlled tension to reduce or eliminate shrinkage values is well known in the art. If desired, films may be annealed to produce lower shrinkage values as desired for the particular temperature. Accordingly, using an annealing process, heat shrinkable films may be made into non-shrink films suitable for use in certain embodiments as described herein.

Optionally, films and sheets of the present invention may be subject to a variety of irradiative treatments. In the irradiation process, the film is subjected to an energetic radiation treatment, such as corona discharge, plasma, flame, ultraviolet, X-ray, gamma ray, beta ray, and high energy electron treatment. These irradiative treatments may be performed for a variety of reasons including e.g. modifying surface characteristics to improve surface adhesion to a variety of substances such as meat or printing ink, or to improve internal layer adhesion to ameliorate intralayer adhesion and avoid undesirable delamination. An important known use of irradiation is to induce crosslinking between molecules of the irradiated material. The irradiation of polymeric webs to induce favorable properties such as crosslinking is well known in the art and is disclosed in U.S. Pat. No. 4,737,391 (Lustig et al.) and U.S. Pat. No. 4,064,296 (Bornstein et al.), which are hereby incorporated by reference in their entireties. Bornstein et. al. disclose the use of ionizing irradiation for crosslinking one or more polymers present in the web. In some preferred embodiments, it is preferred to crosslink the entire web to broaden the heat sealing range. This is preferably done by irradiation with an electron beam at dosage levels of at least about 2 megarads (MR) and preferably in the range of 3 to 8 MR, although higher dosages may be employed. Radiation may be done on the primary tube, with or without additional layers being coated thereon, or after biaxial orientation. The latter, called post-irradiation, is described in U.S. Pat. No. 4,737,391 (Lustig et al.). An advantage of post-irradiation is that a relatively thin film is treated instead of the relatively thick primary tube, thereby reducing the power requirement for a given treatment level.

Alternatively, crosslinking may be achieved by addition of a chemical crosslinking agent or by use of irradiation in combination with a crosslinking modifier added to one or more of the layers, as for example described in U.S. Pat. No. 5,055,328 (Evert et al.).

Myoglobin Blooming Agent on Food Contact Surface

Fundamental to the present invention is inclusion of a myoglobin blooming agent with an oxygen barrier web. The packaging webs can have any suitable structure, but it is essential that the myoglobin blooming agent be on, or in, or able to migrate to, a food contact surface of the web.

Whether the myoglobin blooming agent is coated on or incorporated within an interior food contact layer, it may be applied by any suitable method, e.g., as described above, including dry or wet spraying, dusting, blending, coating, e.g., with transfer rollers, slugging, inclusion in a masterbatch, printing, etc. The myoglobin blooming agent is preferably evenly dispersed over the contact surface of the layer and/or throughout the entire layer to enable any length of web incorporating the layer to include approximately similar amounts of the compound within the sealing layer for a uniform transfer to meat via surface contact.

Where the myoglobin blooming agent is coated on the web food contact layer surface it may be conveniently applied at various times. For example, the agent may be applied to the meat surface, e.g., by dipping or spraying just before packaging, or during a package making operation with or without admixture with starch used as a means to modify package surface friction property or openability. It may be applied during winding operations attendant to slitting operations or during pouch making or tube making. It may be applied before or after irradiative treatments. It may be applied with or in place of starch utilizing electron beam crosslinking irradiation and/or corona treatment as further described in U.S. Pat. No. 5,407,611 (Wilhoit et al.) which is hereby incorporated by reference. Many myoglobin blooming agents are soluble in water, alcohol or an appropriate solvent mixture, and solutions of a myoglobin blooming agent may be coated on webs either alone or incorporated with other agents such as film forming and/or wetting agents or other materials such as zein, casein, dextrin, starch, or shellac, etc. used, e.g., with respect to transferring bixin as described in U.S. Pat. No. 6,143,344 (Jon et al.), which is hereby incorporated by reference. The agent may also be applied in an aqueous solution to a web whose food contact surface has been modified to be hydrophilic or adapted or otherwise modified to adsorb or absorb water or oil based liquids containing a myoglobin blooming agent. According to the present invention in one aspect, transferable modifier-containing webs may be utilized to transfer myoglobin blooming agents using, e.g., webs having a food contact layer formulation suitable for effecting transfer as described in U.S. Pat. No. 5,288,532 (Juhl et al.); U.S. Pat. No. 5,374,457 (Juhl et al.); U.S. Pat. No. 5,382,391 (Juhl et al.); and U.S. Pat. No. 6,667,082 (Bamore et al.) which are all hereby incorporated by reference.

Where the myoglobin blooming agent is incorporated within the interior layer, it may be added to a base polymer before or during extrusion of the web. The base polymer may be any suitable polymer e.g. a polyolefin such as a polyethylene, and may be very low density polyethylene (VLDPE or ULDPE), linear low density polyethylene (LLDPE), low density polyethylene (LDPE), EVA, polypropylene, ionomer, nylon, PVDC, PET, etc. Melt blending is a suitable method of mixing the base polymer and the myoglobin blooming agent. The individual component materials may be combined in a high intensity mixing device such as an extruder. The base polymer is melted to form a viscous liquid or "melt." The myoglobin blooming agent may be combined with the polymer before, during, or after melting. The high intensity mixing device is used to attempt to uniformly disperse the myoglobin blooming compound within the base polymer. The quality and functionality of the dispersed agent can depend upon the choice of myoglobin blooming agent, the composition of the base polymer and the mixing device. It is desirable to achieve good mixing for uniform dispersion of the myoglobin blooming agent within the melt; the presence of poorly wetted particle agglomerations is undesirable. It may be desirable to include additives in the blend such as, e.g., antioxidant, antiblock, dispersing aids or slip agents.

The myoglobin blooming agent may be either directly added to the base polymer or provided in a solution such as an aqueous or solvent based solution that is added to the polymer either before or during the melt state of the polymer. For direct addition of a solid, granular or particulate agent, grinding the solid agent to produce smaller particles is expected to provide a more uniform dispersion. It is expected that for a water soluble material, providing the myoglobin blooming agent as an aqueous solution may provide better dispersion of the compound within the polymer relative to addition of undissolved agent. An aqueous solution may be prepared from a water soluble myoglobin blooming agent, preferably close to the saturation concentration of the aqueous solution and may, e.g., include between about 20% by weight and about 42% by weight of a compound which acts as a myoglobin blooming agent. This aqueous solution may be directly introduced into a polymer melt, e.g., in an extruder heated to a temperature above 300° F. to facilitate mixing to form a blend. If added as an aqueous solution, provision should be made for venting water vapor from the extruder. The polymer blend containing a myoglobin blooming agent may be either extruded into pellets, or directly as a film or sheet.

The myoglobin blooming agent may be mixed with a carrier resin or base polymer to form a masterbatch. Pellets from the masterbatch may be convenient for subsequent use in fabricating articles. Pellets from the masterbatch may then be mixed with the base polymer or another polymer during a web forming process.

When used to create a masterbatch, a sufficient amount of the solution may be introduced into the polymer melt to obtain a blend having a high concentration of myoglobin blooming agent, e.g., between about 2% by weight and about 10% by weight myoglobin blooming agent, and preferably between about 4% by weight and about 6% by weight.

Monolayer Barrier Webs

In one embodiment of the invention, monolayer oxygen barrier packaging webs are provided which comprise a food contact layer including a myoglobin blooming agent. The agent may either be coated onto the surface of the monolayer web or it may be incorporated therein, e.g., during the extrusion process. Such film provides an oxygen barrier and may have a myoglobin blooming agent coated on or incorporated therein.

Multilayer Barrier Webs

Multilayer oxygen barrier webs having a myoglobin blooming agent that contacts a packaged meat product surface can desirably promote, preserve or enhance a desirable myoglobin-mitigated red color.

In one aspect of the embodiment, a myoglobin blooming agent is included in the food contact layer, which is preferably a sealant layer. Multilayer webs advantageously may utilize one or more additional layers to provide beneficial web properties. Multilayer webs may have increased flexibility of application over monolayer webs in that specific layers may be provided to incorporate specific features. Sometimes materials which may be unsuitable alone may be advantageously employed in a multilayer construction. For example, EVOH has oxygen barrier properties which are very sensitive to moisture and detrimentally impacted thereby, but when protected from contact with moisture by adjacent moisture barrier layers, EVOH may provide a film or sheet having an excellent oxygen barrier. Oxygen barrier layers may be positioned between an abrasion or abuse resistant layer and a food contact layer containing myoglobin blooming agent to protect the oxygen barrier and permit thinner oxygen barrier layers to be used. Where EVOH barrier materials are used, it is contemplated that a polyamide-containing layer may optionally be in contact with the EVOH material. Non-limiting examples of various preferred multilayer web configurations include the following:

Abuse Resistant (Exterior)/$O_2$ Barrier/Food Contact & Sealant (Interior);

Abuse Resistant (Exterior)/Core/$O_2$ Barrier/Core/Sealant (Interior);

Abuse Resistant (Exterior)/Tie/Core/$O_2$ Barrier/Core/Sealant (Interior);

Abuse Resistant (Exterior)/Tie/Core/$O_2$ Barrier/Core/Tie/ Sealant (Interior);

Abuse Resistant (Exterior)/Core/Tie/$O_2$ Barrier/Tie/Core/ Sealant (Interior);

Abuse Resistant (Exterior)/Tie/$O_2$ Barrier/Tie/Sealant (Interior);

Abuse Resistant (Exterior)/Nylon Core/$O_2$ Barrier/Core/ Sealant (Interior);

Abuse Resistant (Exterior)/Nylon Core/$O_2$ Barrier/Nylon Core/Sealant (Interior);

Abuse Resistant (Exterior)/Tie/Core/$O_2$ Barrier/Nylon Core/ Sealant (Interior); and Abuse Resistant (Exterior)/Tie/Core/$O_2$ Barrier/Nylon Core/ Tie/Sealant (Interior)

Some embodiments provide a 3, 4, 5, 6, 7, 8, 9, or more layer coextruded web with desirable levels of abuse resistance and oxygen barrier in a multilayer web structure.

Referring now to the drawings, FIG. 1 discloses an example of a three-layer web structure embodiment of the present invention generally designated at reference numeral 10. This embodiment is directed to a multilayer composite comprising an outer layer 12 that is an exterior layer 102 comprising a material such as a polyolefin, PET or a nylon composition, and an outer layer 14 that is a sealant layer 122, each joined to opposite sides of a core tie oxygen barrier layer 112 comprising, e.g., EVOH. The sealant layer 122 comprises a myoglobin blooming agent. The multilayer web 10 which may be heat shrinkable or not is designed to be used in the packaging of food products and can be used, e.g., to overwrap a tray or in a vacuum skin package.

Figure 2:
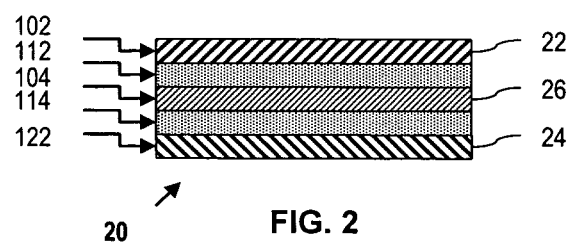
FIG. 2 shows a cross sectional schematic of a second exemplary multilayer film.

Referring now to FIG. 2, a cross section of an example of a five layer oxygen barrier web is depicted with web 20 having an exterior surface layer 22 that is an abuse resistant layer 102 joined by a first tie layer 112 to a core and barrier polyamide layer 26 comprising one or more nylon polymers 104, the other side of core layer 26 is joined by a second tie layer 114 to an interior surface layer 24 which is a sealant layer 122 comprising a myoglobin blooming agent.

Placement of one or more core nylon layers in contact with an EVOH oxygen barrier layer can provide multilayer webs with improved processability. In certain embodiments, nylon may be blended with EVOH or may be included as adjacent layers, e.g., when EVOH oxygen barrier materials have an ethylene content of about 44 mol % or less, at least one and preferably two polyamide core layers may be included in contact with the EVOH layer to facilitate processing.

Figure 3:
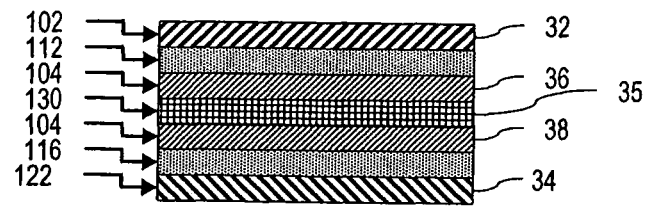
FIG. 3 shows a cross sectional schematic of a third exemplary multilayer film.

Referring now to FIG. 3, a cross-section of an example of a seven layer film 30 is depicted. Web 30 may comprise an exterior layer 32 that is an abuse resistant layer 102 having high gloss and good printability which is in direct contact with a first tie layer 112 and connected thereby to a first core polyamide layer 36 comprising one or more nylon polymers 104. Nylon layer 36 is in direct contact with an oxygen barrier layer 35 comprising EVOH 130. Similarly, the other side of the oxygen barrier layer 35 is joined to a second core polyamide layer 38 comprising one or more nylon polymers 104, the other side of which is joined to a second tie layer 116. The interior layer 34 is a food contact layer 122 which may also be heat sealable and which comprises a polyethylene, such as a ULDPE, and a myoglobin blooming agent. The food contact sealant layer is joined to the second tie layer 116. Preferably all seven layers are coextruded, but they may also be formed by dispersion coating, emulsion coating, solution coating, or lamination, e.g., extrusion lamination, thermal lamination, adhesive lamination, dry bond lamination, solventless lamination, coating lamination, or extrusion coating, or a combination thereof.

First tie layer 112 promotes or provides adhesion between an abuse resistant layer 102 that is an exterior layer 32, and a core polyamide layer 104. Similarly, tie layer 116 promotes or provides adhesion between a second polyamide layer 38 and a food contact layer 122 that is an interior layer 34. Tie layers 112 and 116 may be identical or different from each other, and may include a wide range of anhydride/grafted polyolefins including those based on ethylene vinyl acetate copolymer, polypropylene, low density polyethylene, linear low density polyethylene, and very low density polyethylene. Preferably, the compositions of tie layers are based on linear low density polyethylene, or plastomers such as metallocene catalyzed polyethylene. Exemplary tie layer resins are manufactured by Equistar Chemical Company under the trade name Plexar®.

Some embodiments provide multilayer, easy opening, oxygen barrier casings or food package lidding substrates formed from multilayer webs that preferably are at least partially coextruded and more preferably fully coextruded. Optionally, though not shown, the web of FIG. 3 may be thermally or adhesively laminated to a polypropylene semi-rigid or rigid web monolayer to be used to form a semi-rigid or rigid tray. The multilayer web provides appropriate oxygen barrier and heat sealable characteristic to the monolayer. Other examples of such semi-rigid and rigid trays are disclosed by Lischefski et al., in co-pending disclosure entitled "Rigid and Semirigid Packaging Articles," which is incorporated herein by reference.

Figure 4:
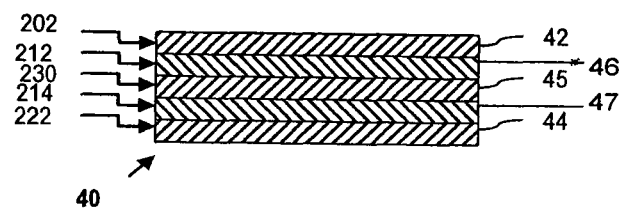
FIG. 4 shows a cross sectional schematic of a fourth exemplary multilayer film.

Referring now to FIG. 4, a cross-sectional view is depicted of an example of a five layer laminated rigid or semi-rigid web 40 for use in an oxygen barrier package comprising an exterior surface layer 42 that is preferably a polyester layer 202 that is press laminated to an adhesive primed barrier layer 46, which is preferably a PVDC layer 212. The PVDC layer 212 is rotogravure coated onto a three-layer blown web. The coextruded blown web includes an outer layer 45 preferably comprising a polyolefin 230 such as a blend of polyethylenes ULDPE and LLDPE, a core layer 47, preferably comprising a blend of EVA and PB, and a sealant surface layer 44, preferably comprising a blend of EVA, LLDPE and a myoglobin blooming agent or synergist or both. The interior myoglobin blooming agent containing surface layer 44 is a heat sealable layer 222.

In yet another embodiment of the invention, the PVDC coated three-layer blown web of the embodiment of FIG. 4 is replaced with a six-layer structure having an EVOH oxygen barrier layer, sequenced as follows: outer layer/tie/EVOH/tie/core/sealant layer structure, as described with the laminated films illustrated above.

Examples of food packaging web products that can be combined with a myoglobin blooming agent in accordance with the teachings include U.S. Pat. Nos. 6,514,583; 4,801,486; Re35,285; 4,755,403; 6,299,984; 6,221,470; 6,858,275; 4,755,419; 5,834,077; 6,610,392; 6,287,613; 6,074,715; 6,511,568; 6,753,054; 4,610,914; 4,457,960; 6,749,910; 6,815,023; 5,593,747; 5,382,470; and 6,565,985, as well as published U.S. Patent Application No. US 2005/0129969, which are incorporated herein by reference. Preferably, the myoglobin blooming agent is included in the food contact layer of the packaging web, which is preferably a heat sealable layer.

Forming Films

Thermoformable multilayer webs are useful for forming dimensionally stable structures for packaging food and other products. The structures or containers are made by softening a portion of the web through application of heat, distorting the softened web to a desired shape, and cooling the web to set the shape. Commonly, hot dogs are packaged in containers made from thermoformable webs. The thermoformable webs as described herein may be used in accordance with the present invention by including a myoglobin blooming agent in the inner layer in contact with the food product. In some aspects, the thermoformable films may include a synergist in the inner layer in contact with the food product.

Thermoformable webs may be made by flat die mono or coextrusion, slot cast mono or coextrusion or single-bubble blown coextrusion. Webs made by these processes may be non-oriented or oriented by tentering or expanded bubble to an extent that allows for further orientation/stretching. Suitable formable webs characterized as being nonoriented may have a heat shrinkage value less than about 5% at 90° C. in either or both the machine direction (MD) and the transverse direction (TD) as measured before thermoforming.

A typical thermoformable web may include an outer layer comprising a blend of a very low density polyolefin, ethylene vinyl acetate, and a compatibilizer; an intermediate layer comprising a mixture of nylon copolymer and an amorphous nylon; an inner layer comprising a polyolefin or ionomeric polymer; and at least one adhesive that bonds said outer, intermediate, and inner layers together. Examples of such webs are disclosed in U.S. Pat. No. 6,861,127 to Glawe et al., which is hereby incorporated by reference herein.

Another thermoformable web may include a first layer of polyester, the polyester being selected from the group consisting of a homopolymer or copolymer of ethylene terephthalate, ethylene naphthalate and blends thereof; a second layer of an adhesive; and a third layer comprising a nylon blend, the third layer preferably being a blend between about 100% (weight) to about 71% (weight) of a nylon selected from the group consisting of nylon 4,6 (poly(tetramethylene adipamide)), nylon 6. (polycaprolactam), nylon 6,6 (poly(hexamethylene adipamide)), nylon 6,9 (poly(hexamethylene nonanediamide)), nylon 6,10 (poly(hexamethylene sebacamide)), nylon 6,12 (poly(hexamethylene dodecanediamide)), nylon 6/12 (poly(caprolactam-co-dodecanediamide)), nylon 6,6/6 (poly(hexamethylene adipamide-co-caprolactam)), nylon 11 (polyundecanolactam), nylon 12 (polylauryllactam) and alloys or mixtures thereof; and between about 0% (weight) to about 29% (weight) of an amorphous nylon; wherein the first layer, the second layer and the third layer are formed into a flexible film by a coextrusion process to form a web that has a heat shrinkage value measured before thermoforming of less than about 5% in the machine direction at 90° C., less than about 5% in the transverse direction at 90° C., and a percent elongation at break at room temperature greater than about 250 in the machine direction and greater than about 250 in the transverse direction. Optionally, the second layer and third layer have a combined thickness of 10 mils or less. Examples of such webs are disclosed in U.S. Pat. No. 6,964,816 to Schell et al., which is hereby incorporated by reference herein.

Still other thermoformable webs include a seven layer structure with layers in sequence comprising nylon, adhesive, nylon, adhesive, nylon adhesive, and a polymer sealant material. Preferably, the polymer sealant material is selected from the group consisting of low density polyethylene, linear low density polyethylene, very low density polyethylene, ethylene vinyl acetate copolymer, ethylene methacrylic acid copolymer, ethylene methyl acrylate copolymer, ethylene acrylic acid copolymer, an ionomer, and combinations thereof. Preferably, the web does not include an EVOH core layer. The web may have a thickness between 5 mils and about 10 mils. Examples of such webs are disclosed in U.S. Pat. Nos. 6,068,933 and 6,562,476 to Shepard et al., which are hereby incorporated by reference herein. If such webs do include an EVOH core layer, it is preferable that the multilayer structure includes in sequence layers comprising nylon, adhesive, nylon, EVOH, nylon, adhesive and a heat sealable polymer. The nylon layers may include two or more layers of nylon coextruded to form a single layer of nylon. The web may include a layer of ionomer between the heat sealable polymer and the adhesive layer. The web may include an outer layer comprising an anhydride modified polyolefin. Examples of such films are disclosed in U.S. Pat. No. 6,942,927 to Shepard et al., which is hereby incorporated by reference herein.

While thermoformable webs may retain flexibility after being shaped, certain webs may also have sufficient rigidity after being formed to serve as packing trays. Such rigid trays often have flexible webs peelably sealed to flanges extending from the top of the trays. For making deep trays, thermoforming techniques such as vacuum forming, pressure forming, plug assist or mechanical forming processes are useful. To effectively soften the multilayer sheet so it can be easily thermoformed into containers having uniform sidewall thicknesses, the films are often preheated to a temperature between about 375° F. to about 425° F. Examples of such trays and peelable film lids are disclosed in U.S. Pat. No. 4,810,541 to Newman et al., which is hereby incorporated by reference herein.

Packing trays may also be made from composites of cardboards and extruded thermoformable laminate webs, with lids sealed to the flanges around the top of the tray. Examples of such trays are disclosed in U.S. Pat. No. 6,651,874 to Pedersen et al., which is hereby incorporated by reference herein. Such packages may be useful for modified atmosphere packaging (MAP) where the air in the sealed package is replace by or supplemented with gas such as carbon monoxide. In accordance with the present invention, it will be understood that the above forming webs may be used by themselves or in combination with other film substrates, e.g., oriented polyethylene terephthalate, as non-forming webs. Non-limiting examples of various non-forming film configurations which may be used as film lids include the following:

OPET (Exterior)/Tie/FOIL/Tie/PE (Interior)
OPET (Exterior)/PVDC/Tie/PE or Ionomer (Interior)
OPET (Exterior)/Tie/PE/Tie/EVOH/Tie/Sealant (Interior)
Metallized OPET (Exterior)/Tie/PE (Interior)
Oriented PP (Exterior)/Tie/PE/Tie/EVOH/Tie/Sealant (Interior)
Biaxially Oriented Nylon (Exterior)/Tie/PE/Tie/EVOH/Tie/Sealant (Interior)
Biaxially Oriented Nylon (Exterior)/PVDC/Tie/PE or Ionomer (Interior)

Food Packaging

In another embodiment, food packages are provided that comprise a myoglobin-containing fresh meat product. The food packages preferably include a myoglobin blooming agent, a synergist, and a polymeric film comprising an oxygen barrier. In some aspects, the food contact layer comprises at least one of the synergist and myoglobin blooming agent.

The fresh meat product can be any meat suitable for human consumption that contains a myoglobin-containing molecule. References to total myoglobin in a meat are intended to include any myoglobin-containing structure, including any ligand present in the myoglobin structure (e.g., deoxymyoglobin, oxymyoglobin, metmyoglobin, carboxymyoglobin, and nitric oxide myoglobin). Preferably, the meat product contains a level of myoglobin sufficient to provide or maintain a desirable appearance or color. Examples of suitable meat cuts include beef, veal, pork, mutton, lamb, poultry, chicken, turkey, duck, goose, game, fish and seafood. The concentration of myoglobin varies in different types of meat products, but preferably the myoglobin content of the meat product is high enough to provide a desired color when about 50% of the myoglobin structures in the meat are converted to a ligand binding state that produces the desired color. Typically, beef contains about 3-10 mg of myoglobin per gram of meat, pork contains about 1-3 mg myoglobin per gram of meat, and chicken contains less than about 1 mg myoglobin per gram of meat. For example, the concentration of total myoglobin compounds in the meat product may be between about 0.1 mg and 25 mg of myoglobin compounds per gram of the meat product. Preferably, the concentration of total myoglobin compounds may be between about 3 and about 20 mg per gram of fresh meat product. In other embodiments, the concentration of total myoglobin compounds may between about 1 and about 5 mg per gram of fresh meat product. In yet other embodiments, the concentration of total myoglobin compounds is at least 1 mg per gram of fresh meat product. In still other embodiments, the concentration of total myoglobin compounds is less than 1 mg per gram of fresh meat product.

The uncooked meat product is desirably a fresh meat product provided within a period of time postmortem to provide a desired level of freshness and safety. Preferably, a food product comprising myoglobin is packaged less than 20 days post-mortem, more preferably less than 14, 12, 10, 6, 5, 4, 3, 2, or 1 day. Typically, the food product is a fresh meat packaged between about 2 days and 14 days post-mortem, and more preferably between about 2 days and about 12 days.

Fresh meat is typically packaged in a moist state. Typically, meat comprises moisture (water), protein and fat. Fresh meat can include about 60% to about 80% moisture content, with lean meats typically having higher moisture content. Fresh meat products such as ground beef, chicken and pork often have a moisture content of about 68% to about 75%, depending on the fat content of the meat (meats with higher fat contents tend to have lower moisture content and vice versa). Cured meats often have higher moisture content due to injection with water-based preserving compounds. Sausage products may have lower moisture content. For example, pork sausage may have a moisture content of about 40% or higher. Preferably, the packaged meat product can have a moisture content of at least about 5%, 10%, 15%, 20%, 30%, 40%, 50%, 60%, 70%, 80% or more.

Preferably, the fresh meat has a sodium chloride content of less than 1% by weight, and more preferably less than 0.5% by weight.

The food package preferably includes a polymeric oxygen barrier web comprising at least one of a synergist and a myoglobin blooming agent, but may also include a web in combination with a food product which has been surface coated with at least one of a synergist and a myoglobin blooming agent prior to packaging. The food package may further comprise an oxygen barrier layer as part of the web forming the food package. The oxygen barrier layer may comprise any suitable material and in a multilayer embodiment is preferably positioned between the abuse resistant exterior layer and an interior food contact layer. An oxygen barrier layer may be an ethylene vinyl alcohol copolymer (EVOH) or PVDC. The gas barrier layer of the food package is described above with reference to the multilayer packaging webs. One or more tie layers may also be included. The tie layers of the food package are described above with reference to the multilayer packaging webs.

Preferably, the food package contains a case-ready meat product comprising a fresh meat product that includes myogobin. Case-ready meat products can be generally defined as fresh meat that is prepackaged and optionally prelabeled at a centralized location and delivered to the retail market prepared for final sale. Increasingly, meat products such as ground beef, turkey and chicken products delivered to U.S. domestic supermarkets for retail sale are delivered in case-ready packaging. For many supermarkets, especially so-called "mega-grocery stores," case-ready meat products provide not only cost savings in terms of minimizing or eliminating on-site butchering and packaging, but also increased sanitation and decreased incidence of product spoilage.

Product packaging that preserves the desirable color of meat, especially fresh meat, can promote the merchantability and appeal of the meat product for consumers. To meet the increasing demand for case-ready meat products, the case-ready meat product preferably provides a predetermined weight and/or volume of a common meat product, such as chicken breast and ground beef. The case-ready meat package can include a polymeric web to maintain freshness, such as a film as described herein. The meat product may be provided fresh, frozen, hard chilled, thawed, enhanced, processed or cooked, and the films advantageously provide protection at various temperatures. Selection of films and sheets for packaging food products can include consideration of such criteria as barrier properties, cost, durability, puncture resistance, flex-crack resistance, food packaging law compliance, e.g., United States Food & Drug Administration (FDA) approval, machinability, optical properties such as gloss and haze, printability, sealability, shrinkability, shrink force, stiffness, and strength. Packaging that preserves desirable meat coloration can promote the merchantability of meat products.

In another aspect, the packaged food product includes a fresh meat contacting a thin plastic web comprising at least one of a synergist and a myoglobin blooming agent on a food contact surface, stretched around a foam tray that supports the product. The web is preferably a multilayer web that is sufficiently non-permeable to oxygen so that the color of the meat can be preserved in a desirable color (e.g., red) for more than about three days, preferably for 5, 7, 10, 15, 20, 25, 30 or more days. Preferably, the meat product is packaged in vacuum containers such as heat shrinkable or non-heat shrinkable pouches or bags, formed pockets, trays or clam shells, which are vacuum sealed and prevent oxygen contact with the meat until the package is opened. The vacuum container includes a food contact surface including at least one of the synergist and the myoglobin blooming agent.

In prior art case ready applications, the meat product is sometimes packaged in a modified atmosphere package ("MAP"), wherein the meat is maintained in a sealed pocket containing a headspace with an atmosphere that is different than ambient air. For example, a MAP can maintain red meat in carbon dioxide, with very low oxygen content, e.g., in a multipack where the master package is subsequently opened and the contained individual packages in oxygen permeable films are exposed to the atmosphere thereby causing the meat to bloom red. Also, the preferred color of fresh meat can be promoted and maintained using a MAP with enriched oxygen content. Similarly, a MAP with small concentrations of carbon monoxide (CO) can be used to cause and maintain a preferred red color of fresh meat. Methods of treating fresh meat with carbon monoxide prior to packaging have also been developed for case ready packaging applications. The bright red CO-myoglobin complex is referred to as carboxymyoglobin. The presence of carbon monoxide can also disfavorably impact sales of CO-containing meat products among consumers.

It is contemplated that the present invention may be used in combination with MAP. For example, in a tray package where the web contacts a significant portion, but not all, of the food product's viewable surface, a CO containing atmosphere can be used to cause a desirable color on the food surface areas that do not make direct contact with the packaging web. This embodiment may beneficially be used, e.g., in certain types of tray overwrap and tray packaging where the web may typically be in contact with the top surface of the food but not in all places along the side or in tray or non-tray packages of irregularly shaped items having gaps between adjacent meat surfaces, e.g., such as may be found in products such as whole birds or shaped products such as crown ribs for roasting.

The food packages typically comprise a multilayer polymeric web. The food packages preferably include one or more polyamide core layers in contact with the EVOH-polyamide multilayer oxygen barrier layer of the first embodiment. The food packages can include a three-layer oxygen barrier formed from an EVOH layer in contact with a first polyamide layer on one side and a second polyamide layer on the opposite side. The food package can also include a heat resistant layer, a sealant layer and one or more adhesive layers having any suitable composition, as described with respect to the second embodiment.

The polyamide layers in contact with the EVOH barrier layer can comprise or consist essentially of a polyamide or polyamide blend composition described with respect to the first embodiment. Preferably, the polyamide layers have the same composition as an exterior heat resistant layer comprising a nylon blend composition.

Preferably, the heat resistant layer can comprise or consist essentially of a blend of an amorphous nylon copolymer, a low temperature polyamide and a high temperature polyamide. The heat resistant layer is preferably positioned at or near the exterior surface of the packaging web, and can be an exterior layer, but can also form a polyamide layer. In some embodiments, the food package can further comprise a sealant layer positioned at or near the interior surface of the package, for example as an interior layer. The sealant layers of the food package are described above with reference to the multilayer packaging webs.

The sealant layer is preferably positioned at or near the interior surface of the package, for example as an interior layer. Adhesive layers may also be included between a heat resistant exterior layer and the first polyamide layer or between the sealant layer and the second polyamide layer. In some embodiments, the food package can be a cook-in package, preferably when the food package comprises a sealant layer formed from a material that is compatible with cooking conditions.

If desired, the food packages may be heat-shrinkable. The food packages preferably include a multilayer oxygen barrier component, and if heat shrinkable, preferably have a total free shrink measured at 90° C. of at least 30%, 40% or 50% in at least one of the machine direction or transverse direction. The food packages preferably have a free shrink of at least 30% at 90° C. in one direction, more preferably at least 30% in two directions, where each direction is either a machine direction or a transverse direction. Even more preferably, the food packages have a free shrink of at least 40% in a first direction and at least 50% in a second direction. The food packages are preferably biaxially oriented, heat-shrinkable, or both. Preferably, the packages have a total free shrink at 90° C. of at least about 80%. For example, the food packages can have a free shrink value at 90° C. between about 80% and about 120% at 90° C. In some embodiments, the food packages can have a total free shrink at 90° C. of at least about 90%, more preferably at least about 95%, still more preferably at least about 100% and even more preferably at least about 105%.

Food packages preferably comprise at least one heat resistant layer can comprise or consist essentially of a blend of an amorphous nylon copolymer, a low temperature polyamide and a high temperature polyamide. The heat resistant layer can be positioned at or near the exterior surface of the packaging film, and can be an exterior layer. The heat resistant layer can be biaxially oriented. Some embodiments may provide a five layer heat-shrinkable and heat resistant food package or pouch formed from multilayer coextruded webs. Food packages can also be formed from seven layer webs which may be heat shrinkable or non-heat shrinkable and heat resistant coextruded webs. In some embodiments, the heat-shrinkable food package can be a cook-in package, preferably when the food package does not comprise a sealant layer. "Cook-in" is the term used to indicate a web or bag in which a foodstuff is pasteurized or cooked. This web or bag is used to hold together, protect and/or form the shape of the foodstuff by a food processor (manufacturer) during the cooking or pasteurization process after which the web may be removed (sometimes termed "stripped"), or may be left on as a protective barrier during shipping, and optionally even left on during retail sale. In this embodiment, the cook-in package includes a food contact surface including the myoglobin blooming agent and synergist.

Food packages formed from multilayer films having two to fourteen layers are contemplated herein, where each layer is selected from the group consisting of: layers comprising a heat resistant and nylon blend composition, adhesion layers, oxygen barrier layers, moisture barrier layers, bulk layers and sealant layers. Preferably, the exterior surface layer comprises a nylon blend composition having an amorphous nylon copolymer and a low temperature polyamide. Also preferably, the interior surface layer is a sealant layer.

Figure 5:
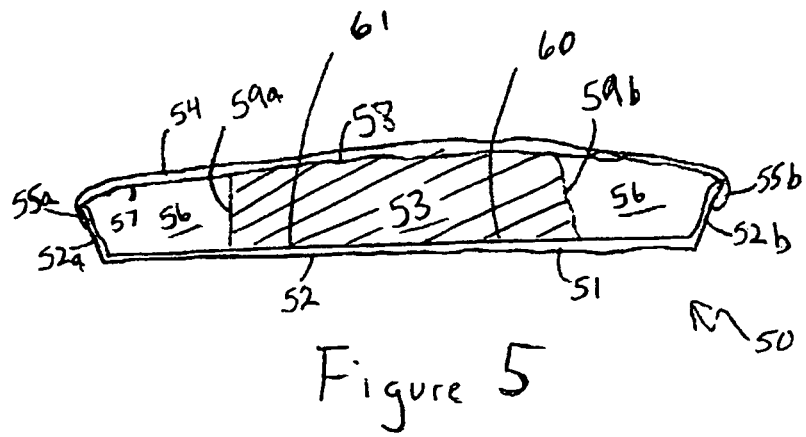
FIG. 5 shows a cross sectional schematic of a meat-containing tray with a barrier film overwrap.

Referring now to FIG. 5, a cross sectional schematic of a meat containing tray 50 is depicted. Tray 51 has a bottom 52 with integral side walls 52a and 52b supporting a retail cut of meat 53 such as pork. Web 54 seals the top of the tray 51 and provides a hermetic seal 55a and 55b all along the continuous flanges of the sidewall 52a, 52b. The web 54 is either vacuum sealed or sealed in a modified atmosphere with the synergist and myoglobin blooming agent containing food contact surface 57 in intimate contact with meat surface 58. Meat side surfaces 59a, 59b are not in contact with the food contact layer 57 but instead are exposed to an atmosphere 56 modified with a gas such as carbon monoxide. The tray has an inside surface 60 which may also be coated with a synergist and myoglobin blooming agent to fix color on the meat bottom surface 61.

Figure 6:
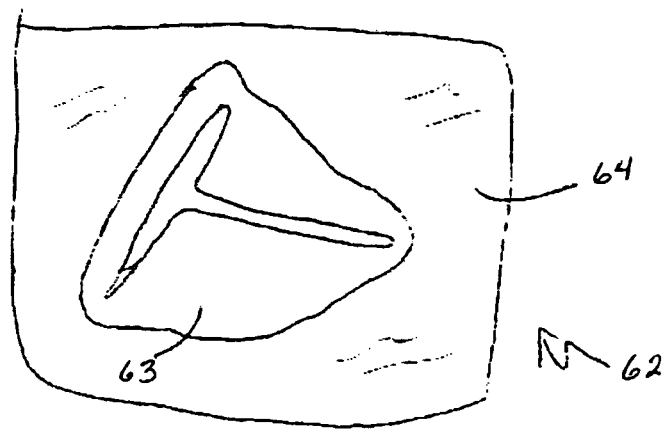
FIG. 6 shows a top view of a vacuum skin packaging film enclosed meat cut.

Referring now to FIG. 6, a top view of a package 62 depicts a myoglobin containing food 63 such as a bone-in cut of meat on a substrate and covered under a vacuum skin packaging web 64 having a synergist and myoglobin blooming agent coated food contact surface in contact with the meat. The web is transparent to allow perception of the color and meat surface characteristics.

Figure 7:
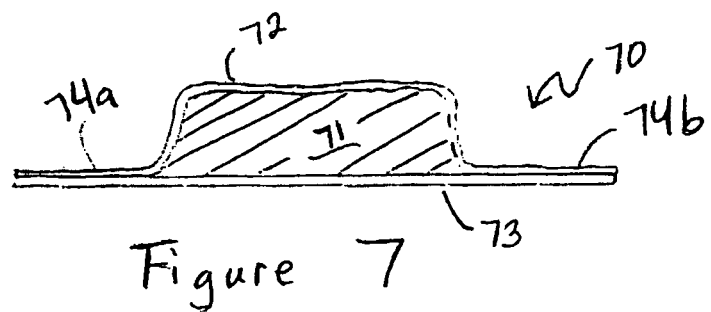
FIG. 7 shows a cross sectional schematic of a meat in a pre-formed container.

Referring now to FIG. 7, a cross sectional schematic of a meat containing formed container 70 is depicted having a myoglobin containing cut of fresh meat 71 disposed in a thermoformed pocket 72 which is heat sealed to a non-oriented web 73 around the meat cut at heat seal 74a which is continuous and joins heat seal 74b to form a hermetic vacuum package having a reduced oxygen atmosphere with intimate contact between the synergist and myoglobin blooming agent containing surfaces of web 72 and 73.

Vacuum Skin Packaging

Vacuum skin packaging (VSP) is another process well known in the art that uses a thermoplastic packaging material to enclose a product. Various apparatus and processes are described in U.S. Pat. Nos. 3,835,618; 3,950,919 and Reissue 30,009, all issued to Perdue. The vacuum skin packaging process is in one sense a type of thermoforming process in which an article to be packaged serves as the mold for the thermoform. An article may be placed on a support member, a card, either rigid or semi-rigid, or other bottom, and the supported article is then passed to a chamber where a top web is drawn upward against a heated dome and then draped over the article. The movement of the plastic top web is controlled by vacuum and or air pressure, and in a vacuum skin packaging arrangement, the interior of the container is evacuated before final sealing of the top web to the support. Thermoformable material may be used as both the top web and bottom support in conjunction with an intermediate support for products held on either side of the support as shown, for example, in U.S. Pat. No. 3,966,045.

In vacuum skin packaging, a product to be packaged is placed on a product supporting member. The product serves as the mold for a thermoformable polymeric web. The thermoformable web is formed about the product by means of differential air pressure. However, the term "vacuum skin packaging" (hereinafter, "VSP") refers to not only the fact that the thermoformable web is formed around the product by vacuum or differential air pressure, but also to the fact that the product is packaged under vacuum, with the volume containing the product being evacuated during the packaging.

Vacuum skin packaging processes generally use a vacuum chamber with an open top. The product (on an impermeable backing board through which vacuum is not drawn), is placed on a platform within the vacuum chamber. The top of the chamber is covered by a sheet which is clamped tightly against the chamber to form an air-tight closure. The chamber is evacuated while the web is heated to its forming and softening temperature. The platform is then raised to drive the product into the softened sheet, and air reintroduced into the chamber can be used about the film to force it tightly around the product.

In vacuum skin packaging, it is also known to release the vacuum and allow ambient air into the chamber, after the chamber has been evacuated and the product driven into the heat-softened sheet, or vice versa. In this manner, the thermoplastic sheet molds more or less over and against the product, since there is a vacuum inside the package, and ambient air pressure, or more than ambient air pressure, immediately outside of the package.

Vacuum skin packaging generally uses a rigid tray, such as made from a thermoformable sheet, to support a product. The clear top web, such as made from a thermoformable web, which may or may not be a biaxially oriented web, is formed or draped around the product during the vacuum packaging procedures. The web forms a skin around the entire viewing surface of the product. Preferably, the food contact layer of the clear top web includes a synergist and myoglobin blooming agent. Optionally, the tray may also include a synergist and myoglobin blooming agent in the food contact layer. Examples of vacuum skin packaging trays, webs and processes are disclosed in U.S. Pat. No. 4,611,456 to Gillio-tos et al.; U.S. Pat. No. 5,846,582 to Mayfield et al.; and in U.S. Pat. No. 5,916,613 to Stockley III, which are hereby incorporated by reference herein.

Method of Promoting a Desirable Color

In another aspect of the invention, methods of promoting a desirable color on the surface of a myoglobin-containing fresh meat product are provided. In an embodiment of the invention, a method of promoting a desirable color on the surface of a myoglobin-containing fresh meat product may be provided which comprises: supplying a container comprising a web having a food contact layer and wherein the web is substantially impermeable to oxygen; providing a myoglobin-containing fresh meat product having a water content of at least 5 weight %; contacting the myoglobin-containing fresh meat product with a myoglobin blooming agent and a synergist; placing a retail cut of fresh meat within the container; removing the atmosphere within the container; causing a transparent portion of the web to make direct contact with at least a portion of the meat surface; hermetically sealing the container to enclose the fresh meat and prevent contact of oxygen from outside the container therewith; providing a compact package having a sufficiently reduced internal oxygen level to promote a meat surface favoring deoxymyoglobin or metmyoglobin and the corresponding purple and brown colorations associated therewith over formation of oxymyoglobin; and storing the package under refrigeration conditions for a sufficient time to permit the reducing activity of the enclosed meat to favor nitroxymyoglobin formation on the meat surface to an extent whereby a corresponding red color associated therewith is formed to produce a visibly red meat surface.

Variations of the above embodiment may utilize the wide selection of MBAs, synergists, polymers, films, sheets, attributes and parameters disclosed herein as will be recognized by one skilled in the art in view of the present teaching.

The meat product may be packaged in a suitable food package fabricated from packaging webs, such as the packages, films, sheets, or combination thereof as described herein. The myoglobin blooming agent and synergist contact the myoglobin-containing fresh meat product. Preferably, the meat product is contacted by food contact surface of the packaging which comprises at least one myoglobin blooming agent and at least one synergist. The myoglobin blooming agent (MBA) and synergist preferably will contact the meat surface in an amount sufficient to produce a desired red color which preferably does not penetrate to an undesirable depth of the food thickness under reduced oxygen conditions (this color may take awhile to develop, e.g., 1 to 5 days). Beneficially, one or both of the MBA or synergist may be present on the web food contact surface (or on the myoglobin food surface) in an amount of from about 0.05 to 3 to 5 to 10 $\mu$moles/in$^2$ and in increments of 0.1 $\mu$mole thereof. Greater or lesser amounts of MBA or synergist may be used and the color intensity may thereby be varied depending upon the relative presence or absence of myoglobin. The food contact layer preferably has between about 0.001 mg/in$^2$ and about 0.900 mg/in$^2$ of a myoglobin blooming agent such as NaNO$_2$.

Also, the packaging should maintain the food product in a reduced oxygen package environment having a reduced gaseous oxygen partial pressure. The reduced oxygen package may comprise an oxygen barrier layer having an oxygen transmission rate of less than about 310, 200, 100, 75, 50, 40, 30, 20, 10, 5 or 3 $cm^3/m^2/24$ hours measured at 0% relative humidity and 23° C. Preferably, the oxygen barrier layer has an oxygen transmission rate of less than about 310 $cm^3/m^2/24$ hours measured at 0% relative humidity and 23° C., more preferably less than about 75 $cm^3/m^2/24$ hours, and most preferably less than about 20 $cm^3/m^2/24$ hours. It may be further desirable to bring the packaging with the food product enclosed therein to a temperature of about 4° C. (40° F.) or higher to facilitate bloom, after which the temperature may be adjusted to the desired optimum temperature for storage, transit or display.

In many packaging applications, such as vacuum packaging, heat sealable food packaging webs are desirable. Food packaging pouches can be made with heat sealable layers. A typical food packaging pouch can include three sides heat sealed by the pouch manufacturer leaving one open side to allow product insertion. Flexible food package containers such as bags or pouches may be made by transversely sealing tubular stock of monolayer or multilayer web and cutting off the tube portion containing the sealed end; by making multiple spaced apart transverse seals on tubular stock and cutting open the side of the tube; by superimposing flat sheets of film and sealing on three sides; or by folding a flat sheet and sealing on two sides. A processor may then insert, e.g., fresh, frozen, hard chilled, thawed, raw, enhanced, cured or processed meat, ham, poultry, primal or subprimal meat cuts, ground beef, or other myoglobin containing products, making a final seal to hermetically enclose the product in the bag. This final seal preferably follows gas evacuation (e.g., by vacuum removal). Flexible food packaging containers such as bags or pouches can be made by transversely sealing tubular stock of monolayer or multilayer web and cutting off the tube portion containing the sealed end; by making two spaced apart transverse seals on tubular stock and cutting open the side of the tube; by superimposing flat substrates of web and sealing on three sides; or by folding a flat substrate and sealing two sides. The final seal after insertion of a food product may be a clip, but is usually a heat seal similar to the initial seals produced by the bag manufacturer although the actual heat sealing equipment may vary. Hot bar and impulse sealers are commonly used to make heat seals.

The food packaging film web also be used in embodiments employing trays, e.g., as a lidding sheet or tray overwrap. Equipment such as tray sealers that are made by Ossid Corporation of Rocky Mount, N.C., U.S.A. or ULMA Packaging, Inc. of Woodstock, Ga., U.S.A., may be used to package meat, such as beef, poultry or other meats. Tray packaging may optionally involve replacement of the gaseous environment within the package by one or more gases to provide some advantage such as to assist product preservation, but to enjoy preferred benefits of the present invention, at least a portion of the oxygen barrier web should be in contact with a food surface under reduced oxygen conditions to fix color in that contact area in a manner where a consumer or potential purchaser may view the color fixed meat surface through a transparent portion of the web.

Suitably, at least 10%, preferably at least 20% and more preferably at least 30% or 50% or more of the surface of the oxygen barrier web is transparent to allow visual perception of food color therethrough after packaging. Meats having a bright red color are believed to be more visible, and have greater definition to distinguish the meat's physical topography, texture, and color variation, e.g., such as that found in marbling. It is further believed, without wishing to be bound by the belief, that the whites of meat components such as fats, skin and white muscle fibers are enhanced by having proximate myoglobin bound by myoglobin blooming agents which fix a bright red color as opposed to purplish, bluish or brownish colors. Thus, the whites appear whiter in poultry and other meats including beef and pork. This, in turn, causes consumers to have a perception of greater clarity of the meat surface which increases consumer confidence in their purchase over meats having less visible surface characteristics. It is further believed that the myoglobin blooming agent may cause fats to maintain a desirable white color even in the absence of myoglobin.

EXAMPLES

The following are examples and comparative examples.
Experimental results and reported properties of the following examples are based on the following test methods or substantially similar test methods unless noted otherwise.

Oxygen Gas Transmission Rate ($O_2$ GTR): ASTM D-3985-81

Water Vapor Transmission Rate (WVTR): ASTM F 1249-90

Gauge: ASTM D-2103

Melt Index: ASTM D-1238, Condition E (190° C.) (except for propene-based (>50% $C_3$ content) polymers tested at Condition TL (230° C.))

Melting point: ASTM D-3418, DSC with 5° C./min heating rate

Gloss: ASTM D-2457, 20°, 45° and 60° angles

Slow Impact Strength: ASTM F-1306-40

Shrinkage Values: Shrinkage values are defined to be values obtained by measuring unrestrained shrink of a 10 cm square sample immersed in water at 90° C. (or the indicated temperature if different) for five seconds. Four test specimens are cut from a given sample of the web to be tested. The specimens are cut into squares of 10 cm length in the machine direction by 10 cm length in the transverse direction. Each specimen is completely immersed for 5 seconds in a 90° C. (or the indicated temperature if different) water bath. The specimen is then removed from the bath and the distance between the ends of the shrunken specimen is measured for both the MD and TD directions. The difference in the measured distance for the shrunken specimen and the original 10 cm side is multiplied by ten to obtain the percent of shrinkage for the specimen in each direction. The shrinkage of four specimens is averaged for the MD shrinkage value of the given web sample, and the shrinkage for the four specimens is averaged for the TD shrinkage value. As used herein, the term "heat shrinkable web at 90° C." means a web having an unrestrained shrinkage value of greater than 10% in at least one direction. The term "total free shrink" refers to the sum of the shrink percentages in the MD and TD directions.

Shrink Force: The shrink force of a web is that force or stress required to prevent shrinkage of the web and is determined from web samples taken from each web. Four web samples are cut 1" (2.54 cm) wide by 7" (17.8 cm) long in the machine direction and 1" (2.54 cm) wide by 7" (17.8 cm) long in the traverse direction. The average thickness of the web samples is determined and recorded. Each web sample is then secured between two clamps spaced 10 cm apart. One clamp is in a fixed position and the other is connected to a strain gauge transducer. The secured web sample and clamps are then immersed in a silicone oil bath maintained at a constant, elevated temperature for a period of five seconds. During this time, the force in grams manifested by the shrink tension of the web at the elevated temperature is recorded. At the end of this time, the web sample is removed from the bath and allowed to cool to room temperature whereupon the force in grams at room temperature is also recorded. The shrink force for the web sample is then determined from the following equation wherein the results are obtained in grams per mil of web thickness (g/mil):

Shrink Force (g/mil)=F/T wherein F is the force in grams and T is the average thickness of the web samples in mils.

Other useful tests are provided by the following references, which are incorporated herein in their entirety: U.S. Pat. Nos. 6,869,686; 6,777,046 and 5,759,648.

Provided below are non-limiting examples of the compositions, webs and packages disclosed herein. In all the following examples, unless otherwise indicated, the web compositions are produced generally utilizing the apparatus and method described in U.S. Pat. No. 3,456,044 (Pahlke), which describes a coextrusion type of double bubble method, and in further accordance with the detailed description above. All percentages are by weight unless indicated otherwise.

Single-layer and multilayer tubular webs are made by a biaxial stretching orientation process. Webs of five or more layers are also contemplated. The inventive multilayer webs may include additional layers or polymers to add or modify various properties of the desired film such as heat sealability, interlayer adhesion, food surface adhesion, shrinkability, shrink force, wrinkle resistance, puncture resistance, printability, toughness, gas or water barrier properties, abrasion resistance and optical properties such as gloss, haze, freedom from lines, streaks or gels. These layers may be formed by any suitable method including coextrusion, extrusion coating and lamination. All percentages are by weight unless indicated otherwise.

The polymers used in the examples are identified as follows unless otherwise noted.

ULDPE is an ultra low density polyethylene resin, such as Dow ATTANE 4201G resin.

EVOH is an ethylene vinyl alcohol polymer, such as Soarnol® ET or Soarnol® RT made by Noltex, LLC commercially available from Soarus LLC of Arlington Heights, Ill.

Ionomer is a polymer such as DuPont Surlyn™ 1650 or 1601 resin.

Tie Resin is a maleic anhydride modified polyethylene, such as DuPont BYNEL CXA 41 E710 resin.

Additives typically include antiblock agents, slip agents, and processing aids, antistatic agents, colorants, etc. in order of decreasing amounts. A typical mix of additives in a surface layer includes 3.5 wt % of a suitable antiblocking agent supplied as a concentrate of 20% by weight diatomaceous earth in low density polyethylene by Ampacet as grade 10063, 2 wt % of a suitable slip agent supplied as a concentrate of 4% erucamide and 2% stearamide in low density polyethylene by Ampacet as grade 10061, and 0.3 wt % of a suitable processing aid supplied as a concentrate of 3% of a copolymer of hexafluoropropylene and vinylidene fluoride in linear density polyethylene by Ampacet as grade 10562.

Example 1

A solution of a desired myoglobin blooming agent (MBA) such as described above is prepared by dissolving a suitable amount of the myoglobin blooming agent in a solvent. A suitable concentration of a myoglobin blooming agent is approximately 0.60 moles of myoglobin blooming agent in 60 g of solvent. The solution is made at room temperature by gently agitating the solvent/MBA mixture.

Dow ATTANE® 4201-G ULDPE (obtained from Dow Chemical Company, Midland, Mich.) is loaded into the hopper of a gravimetric dosing unit that is positioned to feed the polymer into the main feed port of an APV Extrusion Systems MP 2050 50 mm corotating twin screw extruder. The feeder is configured to dose the ATTANE at a rate of 41 kg/h. The mixing elements of the twin screw extruder are arranged in a fashion that allows for feeding and melting of the ULDPE, injection and mixing of the solvent/MBA solution, removal of the solvent, pressurization of a die and formation of continuous strands of a homogeneous ULDPE/MBA blend.

The twin screw extruder is electrically heated so that the feed zone is at 200° F. and the rest of the extruder at 330° F. When the extruder zones achieve the intended temperatures, the drive motor is engaged to rotate the extruder screws at about 578 RPM. The ATTANE ULDPE is dosed into the primary feed port at 41 kg/h. Once a stable, homogeneous extrudate is achieved, the solvent/MBA mixture is injected into the molten ULDPE at an injection port. A gear pump is used to deliver the myoglobin blooming agent/solvent solution to the injection port. The injection point is placed in a section of the extruder configured to have high free volume and low pressure. The rate of delivery of the solution is calculated by the time change in mass of the solvent/myoglobin blooming agent mixture. The intended concentration of 5% is achieved by adjusting the pump speed. A suitable pump speed is about 33 RPM. The solvent/MBA delivery rate is preferably about 5.4 kg/h.

The mixing elements of the extruder are arranged in a fashion such that the liquid solvent/MBA solution is prevented from moving upstream to the primary feed port. Full bore orifice plugs are used to prevent the unwanted upstream migration.

Following injection, the solvent/MBA solution rapidly increases in temperature. The solvent fraction of the solution evaporates and eventually boils. The resultant solvent escapes through an atmospheric pressure vent port. Some solvent may also escape through the primary feed port. Following a mixing section, the ULDPE/MBA blend moves into a pressurization section and finally, into an eight-hole strand die. Upon exiting the die, the resultant continuous strands are cooled in a water bath. At the exit of the water bath, an air knife removes some of the moisture clinging to the surface of the stands. After leaving the influence of the air knife, the strands are cut into discrete pellets by a rotating knife-style pelletizer. These pellets are subsequently dried in a convection oven at about 50° C., packed in aluminum foil containing bags and stored for use and referred to as masterbatch pellets. Non-limiting examples of various masterbatch preparation techniques are described in co-pending U.S. patent application Ser. No. 11/408,221, entitled "Process for Introducing an Additive into a Polymer Melt" by Nelson et al., which is hereby incorporated by reference herein.

Films are prepared from the masterbatch pellets. The loading level of the masterbatch pellets is varied to produce ULDPE films with an effective myoglobin blooming agent concentration, and packages are prepared using the film as an inner layer. Food products, in particular, meat products, are vacuum packaged within the packages and observed over a period of time.

Example 2

A myoglobin blooming agent powder, such as sodium nitrite powder (Rapauno Products $NaNO_2$ obtained from Hydrite Chemical Company, Brookfield, Wis.), and Dow ATTANE® 4201-G ULDPE (obtained from Dow Chemical Company, Midland, Mich.) are combined to form a masterbatch with a corotating twin screw extruder. The extruder is heated to 330° F. and the myoglobin blooming agent and ULDPE are simultaneously added to the primary feed port. Selections of the myoglobin blooming agent and ULDPE addition rates are made such that the composition of the mixture is 95% ULDPE and 5% myoglobin blooming agent by weight. The twin screw extruder is configured to disperse the myoglobin blooming agent powder such that the individual powder particles are surrounded by polymer. The discharge of the extruder is fitted with a die of geometry appropriate for shaping the myoglobin blooming agent-ULDPE mixture into continuous strands. The strands are cooled in a water bath. At the exit of the water bath, an air knife removes some of the moisture clinging to the surface of the stands. After leaving the influence of the air knife, the strands are cut into discrete pellets by a rotating knife-style pelletizer. Those pellets are dried in a convection oven at about 50° C., packed in aluminum foil containing bags and stored for use.

Example 3

A myoglobin blooming agent, such as Repauno Products $NaNO_2$, is passed through a rotary pulverizer (e.g., Wiley Mill obtained from Brabender GmbH and Company, Duisburg, Germany). The rotary pulverizer reduces the average particle size of the myoglobin blooming agent powder. The pulverized myoglobin blooming agent is combined with Dow ATTANE® 4201-G ULDPE in the same proportions using the same technique described in Example 2 to form a masterbatch.

Example 4

A 40% solids myoglobin blooming agent solution is prepared by dissolving 8 kg of a myoglobin blooming agent such as Repauno Products $NaNO_2$, in 12 kg of water. The solution is made with tap water at room temperature by gently agitating the water/nitrite mixture.

The myoglobin blooming agent solution is spray dried (e.g., Mobile Minor spray dryer from Niro, Inc. Columbia, Md.) to form a homogeneous powder. The spray dried myoglobin blooming agent is combined with Dow ATTANE® 4201-G ULDPE in the same proportions using the same technique described in Example 2 to form a masterbatch.

Example 5

A 40% solids sodium nitrite solution is prepared in a manner described in Example 4.

Dow ATTANE® 4201-G ULDPE is loaded into the hopper of a gravimetric dosing unit that is positioned to feed the polymer into the main feed port of a corotating twin screw extruder. The extruder is heated to 330° F. and the ULDPE is continuously metered into the extruder where it melts. The 40% solids nitrite/water solution is injected into the molten ULDPE with a gear pump at a rate such that the concentration of the solution is 11.6% by weight. The water portion of the solution vaporizes in the extruder and is removed via a vent port. The remainder of the composition is substantially a mixture of ULDPE and sodium nitrite with a sodium nitrite content of 5% by weight. The resultant mixture is shaped into strands with a die, cooled with water, blown dry with air, chopped into pellets, dried and packaged as described in Example 2.

Example 6

A 4% solids sodium nitrite solution is prepared by dissolving 0.25 kg of Repauno Products $NaNO_2$ in 6 kg of methanol (from Hydrite Chemical Company, Brookfield, Wis.). The sodium nitrite/methanol solution is combined with Dow ATTANE® 4201-G ULDPE in the same proportions using the same technique described in Example 5 to form a masterbatch. The resultant blend is 0.5% by weight of sodium nitrite.

Example 7

A masterbatch comprising a synergist may be formed by substituting a synergist for the myoglobin blooming agent in any of examples 1-6.

Examples 6-16 describe various methods that may be used to produce a film contact surface having a synergist thereon.

Example 8

A 40% solids synergist solution is prepared by dissolving 8 kg of synergist in 12 kg of water. The solution is made with tap water at room temperature by gently agitating the water/synergist mixture.

The synergist solution is spray dried (e.g., Mobile Minor spray dryer from Niro, Inc. Columbia, Md.) to form a homogeneous powder. The spray dried synergist is combined with Dow ATTANE® 4201-G ULDPE in the same proportions using the same technique described in Example 2 to form a masterbatch.

Example 9

Spray-dried synergist is prepared with the materials and method described in Example 8. The powder is applied in a uniform layer using an electrostatic sprayer (e.g., obtainable from Oxy-Dry Corporation, Itasca, Ill.) to the food contact surface of a forming film. The film is fabricated into a lidding film for a tray package containing a retail cut of meat.

Example 10

A 40% solids synergist solution is prepared in a manner described in Example 8.

A continuous film tubing is passed between two sets of nip rollers, one set located above the other. The nips are separated by sufficient space such that the tubing is able to inflate with injected air and exhibit a circular cross section without wrinkling. The inflated tubing is momentarily slit and the air cavity is "slugged" (i.e., replaced) by the 40% solids synergist solution. The slitting device is removed and the inner surface of the tubing is coated with the synergist solution.

Example 11

A 40% solids synergist solution is prepared in a manner described in Example 8.

The food contact surface of a film is coated with a 40% solids solution of the myoglobin blooming agent. The solution is applied to the food contact surface and is metered with a #8 wire wound rod (e.g., Mayer rod or equalizer bar). Following coating, the water is removed using a heated, forced air oven.

Example 12

A 40% solids synergist solution is prepared in a manner described in Example 8.

The food contact surface of a film is coated with a 40% solids solution of synergist. The technique is the same as described in Example 11 except that the metering method uses a smooth rod.

Example 13

A 40% solids synergist solution is prepared in a manner described in Example 8.

The food contact surface of a film is coated with a 40% solids solution of synergist. The technique is the same as described in Example 11 except that the metering method uses a gravure applicator.

Example 14

A 40% solids synergist solution is prepared in a manner described in Example 8.

The food contact surface of a film is coated with a 40% solids solution of synergist. The technique is the same as described in Example 11 except that the metering method uses a flexographic printing plate.

Example 15

A 40% solids synergist solution is prepared in a manner described in Example 8.

The food contact surface of a film is coated with a 40% solids solution of synergist. The technique is the same as described in Example 11 except that the metering method uses transfer rolls.

Example 16

A 40% solids synergist solution is prepared in a manner described in Example 8.

The food contact surface of a film is coated with a 40% solids solution of the synergist. The technique is the same as described in Example 11 except that the metering method uses a spray applicator.

Example 17

Examples 6-16 describe methods used to produce a film with food contact surface having a synergist thereon. By substituting a myoglobin blooming agent for the synergist in any of Examples 6-16 the method may be used to produce a film with a food contact surface having a myoglobin blooming agent thereon.

Example 18

Films are prepared from the masterbatch pellets of Example 1 using sodium nitrite (Rapauno Products $NaNO_2$ obtained from Hydrite Chemical Company, Brookfield, Wis.) as the myoglobin blooming agent. The loading level of the masterbatch pellets is varied to produce ULDPE films at 0.1%, 0.2%, 0.5%, and 1.0% myoglobin blooming agent. Packages are prepared using each of the films as an inner layer.

Example 19

A film is prepared from the masterbatch pellets of Example 1. The loading level of the master batch pellets is adjusted to produce a ULDPE film with a 17,500 ppm (also referred to as "17.5K") loading of $NaNO_2$ (Rapauno Products $NaNO_2$ obtained from Hydrite Chemical Company, Brookfield, Wis.). A multilayer film is prepared using this film as an inner layer. The composition of the film is ULDPE|ionomer|tie|EVOH|tie|ionomer|(ULDPE+$NaNO_2$).

Example 20

Three compounds are evaluated as synergists: sodium erythorbate (CAS Registry #6381-77-7, Molecular Weight 216.12 g/mol), sodium tripolyphosphate (CAS Registry #7758-29-4, Molecular Weight 367.86 g/mol), and sodium chloride (CAS Registry #7647-14-5, Molecular Weight 58.44 g/mol). These compounds are dissolved in distilled water to make solutions that are then sprayed on the meat surface prior to packaging with a nitrite containing film. Additionally, 100 grain distilled vinegar (10% acetic acid, CAS Registry #64-19-7, Molecular Weight 60.05 g/mol) is used as a surface spray to determine if an acidic pH affects the performance characteristics of the nitrite containing film.

Approximately 150 mL of each treatment solution is prepared 24 hours prior to use and kept refrigerated. Table 1 below lists the various treatment solutions showing the concentration of ingredients and the resulting pH.

TABLE 1

Description of treatment spray solutions and pH.

| Treatment | Description (Myoglobin blooming agent composition (ppm), spray) | pH |
| --- | --- | --- |
| A | Non nitrite film, no spray treatment (control) | n/a |
| B | 17.5K film, water spray treatment (control) | 6.96 |
| C | 17.5K film, 0.5% Sodium Erythorbate | 7.50 |
| D | 17.5K film, 3.5% Sodium Tripolyphosphate | 9.91 |
| E | 17.5K film, 5.0% Sodium Chloride | 6.90 |
| F | 17.5K film, 0.5% Sodium Erythorbate, 3.5% Sodium Tripolyphosphate | 9.65 |
| G | 17.5K film, 0.5% Sodium Erythorbate, 5.0% Sodium Chloride | 6.78 |
| H | 17.5K film, 3.5% Sodium Tripolyphosphate, 5.0% Sodium Chloride | 9.11 |
| I | 17.5K film, 0.5% Sodium Erythorbate, 3.5% Sodium Tripolyphosphate, 5.0% Sodium Chloride | 8.92 |
| J | 17.5K film, Vinegar | 2.32 |

Lean ground beef chuck containing approximately 10% visual fat from a Black Angus steer is obtained from a local slaughter house. The meat is ground twice through a ⅛ inch plate 5 days after slaughter, portioned into barrier bags weighing 5-lb, and vacuum packaged on a chamber machine. The ground beef is flattened to approximately ¾ inch slabs and stored refrigerated for 24 hours prior to use. Individual rectangular shaped pieces having a dimension of approximately 3 inches by 5 inches are cut from the slabs and immediately sprayed with the treatment solution by using a fine spray that saturates the surface of the individual meat slab. A Multivac T200 tray sealing skin pack machine is employed to pack the ground beef in rigid polypropylene based barrier trays. The control web used is a VSP 4 mil barrier web without nitrite (ULDPE|Ionomer|tie|EVOH|tie|Ionomer|ULDPE). Similarly, the nitrite containing web is a VSP 4 mil barrier film with nitrite at a 17.5K loading level of Example 19.

All samples are held at 34-36° F. after packaging. The surface color of the packaged meat samples with the various treatments are evaluated and photographed approximately 30 minutes after packaging (referred to as time zero) and after 4 hours, 9 hours 19 hours, 24 hours, 1 week and 2 weeks of refrigerated dark storage. Triplicate meat samples are prepared for each treatment. In order to better capture the changes in surface color, digital photographs are taken at the specified time intervals. An attempt is made to use the same camera settings and artificial lighting at each time interval to best capture the color differences. The same individual units are used as well.

Results

The perceived color of the meat samples as described in Table 1, Treatments A-J, as a function of time (after packaging) is observed and shown in Table 2. Meat samples for Treatments A-I turn to metmyoglobin (brownish plum color) within 30 minutes after packaging. The non-nitrite control (Treatment A) meat sample remains a brownish plum color for at least 24 hours after packaging. The acetic acid treatment (Treatment J) has a noticeably darker hue of brown than the other samples at 30 min. and maintains this color for at least 24 hours after packaging. Without wishing to be bound by theory, it is believed, that the low pH has a detrimental effect on cellular mitochondria ability to carry out its biochemical reactions to reduce metmyoglobin to deoxymyoglobin. As illustrated in Table 2, all meat samples packaged in a nitrite containing film (Treatment B-I) develop a pink color, i.e., bloom, within about 24 hours after packaging except for the vinegar treated meat sample (Treatment J). Meat samples in Treatments A and J remain a brown color for at least 24 hours after packaging. The meat sample treated with erythorbate and phosphate (Treatment F) develops a pink color more quickly compared to samples in Treatments B-E and G-I. At 168 hours (one week) after packaging, the meat samples in Treatments B-I change from a pink color to a purple to pink-purple color, while the meat sample for Treatment J exhibits a plum to purple-plum color. Meat samples for Treatments B-J after 336 hours (two weeks) post-packaging continue to change color, i.e., from a purple to pink-purple color to a plum to purple-plum color.

TABLE 2

Color of meat samples at various times after packaging.

| Treatment | 30 min | 4 h | 9 h | 19 h | 24 h | 168 h | 336 h |
|---|---|---|---|---|---|---|---|
| A | + | + | + | + | + | + | + |
| B | + | + | ++ | ++++ | ++++ | +++ | ++ |
| C | + | + | ++ | ++++ | ++++ | +++ | ++ |
| D | + | ++ | +++ | ++++ | ++++ | +++ | ++ |
| E | + | + | + | +++ | ++++ | +++ | ++ |
| F | + | +++ | ++++ | ++++ | ++++ | +++ | ++ |
| G | + | + | + | +++ | ++++ | +++ | ++ |
| H | + | ++ | +++ | ++++ | ++++ | +++ | ++ |
| I | + | + | ++++ | ++++ | ++++ | +++ | ++ |
| J | + | + | + | + | + | ++ | ++ |

The plus symbols represent the observed color on the surface of the meat sample.
The "+" symbol indicates a brown to plum-brown color,
the "++" symbol indicates a plum to purple-plum color,
the "+++" symbol indicates a purple to pink-purple color,
and the "++++" symbol indicates a pink color.

Example 21

A 15% by weight solids sodium erythorbate solution is prepared by dissolving 1.5 kg of sodium erythorbate in 8.5 kg of water. The solution is made with tap water at room temperature by gently agitating the water/sodium erythorbate mixture. The sodium erythorbate solution is spray dried (e.g., Mobile Minor spray dryer from Niro, Inc. Columbia, Md.) to form a homogeneous powder.

Example 22

A sodium nitrite containing film coated with sodium erythorbate is prepared by treating the film of Example 19 with any of the coating methods of Examples 9-16. The synergist solution of Example 21 is used with the methods of Examples 9-16.

The above examples are illustrative only, and should not be interpreted as limiting since further modifications of the disclosed embodiments will be apparent to those skilled in the art in view of this teaching. All such modifications are deemed to be within the scope of the invention described herein and defined by the following claims.

What is claimed:

1. A food packaging article having an interior surface and an exterior surface, the article comprising:
    an oxygen barrier layer;
    a food contact layer comprising a myoglobin blooming agent and a synergist, the myoglobin blooming agent selected from the group consisting of nitric oxide donating compounds, nitrogen heterocycles, and sulfur monoxide donating compounds and -combinations thereof, and the synergist selected from the group consisting of acidulants selected from the group consisting of erythorbic acid, lactic acid, benzoic acid, glucono delta lactone, acidic phosphates and combinations thereof, basifying agents, reducing agents, postmortem muscle metabolism modifiers and combinations thereof; and
    wherein the myoglobin blooming agent is present on the food contact layer surface in a concentration sufficient to produce a desirable surface coloration of the meat product and prevent undesirable extension of the color into the body of the meat product;
    wherein the concentration of myoglobin blooming agent is between 0.001 and 0.900 mg/in$^2$.

2. The article of claim 1, wherein the synergist is an acidulant selected from the group consisting of organic acids and acidic phosphates.

3. The article of claim 1, wherein the synergist is a basifying agent selected from the group consisting of dibasic phosphates, tribasic phosphates, tetrabasic diphosphates, pentabasic triphospates and combinations thereof.

4. The article of claim 1, wherein the synergist is a reducing agent selected from the group consisting of antioxidants, peroxide reducing agents, peroxynitrite reducing agents, nitrite reducing agents, nitrate reducing agents, oxygen scavengers and combinations thereof.

5. The article of claim 1, wherein the synergist is a postmortem muscle metabolism modifier.

6. The article of claim 1, wherein both the food contact layer and the oxygen barrier layer are the same layer.

7. The article of claim 1, wherein the article is a monolayer film, a multilayer film, a monolayer sheet, a multilayer sheet or a combination thereof.

8. The article of claim 1, wherein the article is a monolayer film or a multilayer film each having a thickness of less than 10 mil.

9. The article of claim 1, wherein the article is a monolayer sheet or a multilayer sheet each having a thickness of at least 10 mil.

10. The article of claim 1, wherein the article is a monolayer sheet or a multilayer sheet each having a thickness of between 10 mil and 50 mil.

11. The article of claim 1, wherein the article is a monolayer sheet or a multilayer sheet each having a thickness of between 10 mil and 30 mil.

12. The article of claim 1, wherein the oxygen barrier layer comprises PVDC, EVOH, polyamide, nanocomposite, polyester, metal foil, metallized film, metal-oxide coated film, rubber modified acrylonitrile methyl acrylate copolymer or combination thereof.

13. The article of claim 1, wherein the article has an oxygen transmission rate of less than 310 cm$^3$/m$^2$/24 hours measured at 0% relative humidity and 23° C.

14. The article of claim 1, wherein the article has an oxygen transmission rate of less than about 75 cm$^3$/m$^2$/24 hours measured at 0% relative humidity and 23° C.

15. The article of claim 1, wherein the article has an oxygen transmission rate of less than 20.0 cm$^3$/m$^2$/24 hours measured at 0% relative humidity and 23° C.

16. The article of claim 1, wherein the article further comprises an exterior surface layer, and wherein the oxygen barrier layer is positioned between the food contact layer and the exterior surface layer.

17. The article of claim 16, wherein the article comprises at least five polymeric layers, and has a first tie layer positioned between the food contact layer and oxygen barrier layer, and a second tie layer positioned between the oxygen barrier layer and the exterior surface layer.

18. The article of claim 16, wherein the exterior surface layer comprises polyolefin, polyamide, polyester, polystyrene or blend thereof.

19. The article of claim 1, wherein the food contact layer comprises cellulose.

20. The article of claim 1, wherein the food contact layer is non-woven.

21. The article of claim 1, wherein the food contact layer is selected from the group consisting of polyolefin, polyester, polystyrene or blends thereof.

22. The article of claim 21, wherein the polyester is selected from the group consisting of homopolymers or copolymers of polyethylene terephthalate, polylactic acid and blends thereof.

23. The article of claim 1, wherein at least one layer of the article is crosslinked.

24. The article of claim 16, wherein at least one layer of the article irradiatively crosslinked.

25. The article of claim 1, further comprising at least one additional layer of a polyamide, a polyester, a polyethylene, a polypropylene, a polybutylene, a polystyrene, a polycarbonate, a cyclic olefin copolymer, a polyurethane, a polyacrylamide, an anhydride-modified polymer, an acrylate-modified polymer, or blends thereof.

26. The article of claim 1, wherein the food contact layer further comprises at least one of an antioxidant, a slip agent, an antiblock agent, a colorant, a flavorant, an odorant, an organoleptic agent, a coefficient of friction modifying agent, a lubricant, a surfactant, an encapsulating agent, an oxygen scavenger, a pH modifying agent, a meat spoilage indicator, a film forming agent, an emulsifier, a polyphosphate, a humectant, a drying agent, an antimicrobial agent, a chelating agent, a binder, a starch, a polysaccharide or a combination thereof.

27. The article of claim 1, wherein the food contact layer comprises between about 0.10 weight % and about 5.0 weight % of the myoglobin blooming agent.

28. The article of claim 1, wherein the food contact layer comprises at least about 0.10 weight % and less than 2.0 weight % of the myoglobin blooming agent.

29. The article of claim 1, wherein the food contact layer comprises between about 0.75 weight % to about 1.75 weight % of the myoglobin blooming agent.

30. The article of claim 1, wherein the food contact layer has a food contact surface comprising between about 0.01 to about 10 μmole/inch$^2$ of the myoglobin blooming agent.

31. The article of claim 1, wherein the food contact layer has a food contact surface comprising at least 0.1 mg/inch$^2$ of the myoglobin blooming agent.

32. The article of claim 1, wherein the food contact layer has a food contact surface comprising less than 0.25 mg/inch$^2$ of the myoglobin blooming agent.

33. The article of claim 1, wherein the food contact layer comprises a heat sealable polymer.

34. The article of claim 1, wherein the food contact layer comprises a heat sealable polymer selected from the group of polyolefin, polyethylene, very low density polyethylene (VLDPE), linear low density polyethylene (LLDPE), low density polyethylene (LOPE), high density polyethylene (HOPE), ethylene alpha-olefin copolymer, polypropylene (PP), polybutylene (PB), ionomer, polyester, ethylene vinyl acetate copolymer (EVA), ethylene methyl acrylate copolymer (EMA), ethylene butyl acrylate copolymer (EBA), ethylene ethyl acrylate copolymer (EEA), ethylene acrylic acid copolymer (EAA), ethylene methacrylic acid copolymer (EMAA) and combinations thereof.

35. The article of claim 1, wherein at least 10% of the article is transparent.

36. The article of claim 1, wherein the article has a gloss value of at least 70 at 45'.

37. A food package comprising:
a myoglobin-containing food product having a water content of at least 5 weight %; and
a container comprising a polymeric web having an oxygen barrier polymeric layer and a food contact layer, the food contact layer having a food contact surface; at least a portion of which is in contact with at least a portion of a surface of the myoglobin-containing food product;
a synergist and a myoglobin blooming agent in contact with at least a portion of a surface of the myoglobin-containing food product, the synergist selected from the group consisting of acidulants selected from the group consisting of erythorbic acid, lactic acid, benzoic acid, glucono delta lactone, acidic phosphates and combinations thereof, basifying agents, reducing agents, and postmortem muscle metabolism modifiers and combinations thereof, and the myoglobin blooming agent selected from the group consisting of nitric oxide donating compounds, nitrogen heterocycles, sulfur monoxide donating compounds and combinations thereof; and
wherein the myoglobin blooming agent is present on the food contact layer surface in a concentration sufficient to produce a desirable surface coloration of the meat product and prevent undesirable extension of the color into the body of the meat product;
wherein the concentration of myoglobin blooming agent is between 0.001 and 0.900 mg/in$^2$.

38. The food package of claim 37, wherein the food contact layer comprises the synergist.

39. The food package of claim 37, wherein the food contact layer comprises the myoglobin blooming agent.

40. The food package of claim 37, wherein the food contact layer comprises the synergist and the myoglobin blooming agent.

41. The food package of claim 37, wherein the food contact layer comprises the myoglobin blooming agent as a first myoglobin blooming agent; and
wherein the food product further comprises a second myoglobin blooming agent comprising a carbon monoxide donating compound.

42. The food package of claim 37, wherein the container encloses the myoglobin-containing food product in a reduced oxygen environment.

43. The food package of claim 37, wherein the synergist is an acidulant selected from the group consisting of organic acids and acidic phosphates.

44. The food package of claim 37, wherein the synergist is a basifying agent selected from the group consisting of dibasic phosphates, tribasic phosphates, tetrabasic diphosphates, pentabasic triphospates and combinations thereof.

45. The food package of claim 37, wherein the synergist is a reducing agent selected from the group consisting of antioxidants, peroxide reducing agents, peroxynitrite reducing agents, nitrite reducing agents, nitrate reducing agents, oxygen scavengers and combinations thereof.

46. The food package of claim 37, wherein the synergist is a postmortem muscle metabolism modifier.

47. The food package of claim 37, wherein the myoglobin-containing food product is a fresh meat product maintained in a reduced oxygen environment.

48. The food package of claim 37, wherein the myoglobin-containing food product is a fresh meat product maintained in a vacuum.

49. The food package of claim 37, wherein at least a portion of the food contact layer is transparent and in contact with the myoglobin-containing food product.

50. The food package of claim 37, wherein the container further comprises a tray.

51. The food package of claim 50, wherein at least a portion of the myoglobin-containing food product is maintained in contact with a modified atmosphere having an elevated level of carbon monoxide, carbon dioxide, nitrogen, an oxide of nitrogen, or mixtures thereof relative to the atmosphere outside the container.

52. The food package of claim 37, wherein the myoglobin blooming agent is nongaseous.

53. The food package of claim 37, wherein the food contact surface comprises between about 0.01 to about 10 µmole/inch$^2$ of the myoglobin blooming agent.

54. The food package of claim 37, wherein the myoglobin-containing food product comprises between about 0.1 to about 25 mg of myoglobin per gram of food product.

55. The food package of claim 37, wherein the myoglobin-containing food product comprises between about 3 to about 20 mg of myoglobin per gram of the myoglobin-containing food product.

56. The food package of claim 37, wherein the myoglobin-containing food product comprises between about 1 to about 5 mg of myoglobin per gram of the myoglobin-containing food product.

57. The food package of claim 37, wherein the myoglobin-containing food product comprises less than about 1 mg of myoglobin per gram of the myoglobin-containing food product.

58. The food package of claim 37, wherein the myoglobin-containing food product comprises at least 1 mg myoglobin per gram of food product.

59. The food package of claim 37, wherein the myoglobin-containing food product is a fresh meat product.

60. The food package of claim 37, wherein the myoglobin-containing food product is a fresh meat product selected from the group consisting of beef, veal, pork, mutton, lamb, poultry, chicken, turkey, duck, goose, game, fish, and seafood.

61. The food package of claim 37, wherein the myoglobin-containing food product is a fresh meat product selected from the group consisting of primal, subprimal, retail cut, comminuted, ground and combinations thereof.

62. The food package of claim 37, wherein the myoglobin-containing food product is fresh, frozen, hard chilled, or thawed.

63. The food package of claim 37, wherein the web has an oxygen transmission rate of less than about 310 cm$^3$/m$^2$/24 hours measured at 0% relative humidity and 23° C.

64. The food package of claim 37, wherein the web has an oxygen transmission rate of less than about 20 cm$^3$/m$^2$/24 hours measured at 0% relative humidity and 23° C.

65. The food package of claim 37, wherein the package comprises a pouch, bag, casing, overwrapped tray, form shrink package, vacuum skin package, flow wrap package, thermoformed package or a combination thereof.

66. The food package of claim 37, wherein the package is hermetically sealed.

67. The food package of claim 37, wherein the food contact layer and the oxygen barrier layer are the same layer.

68. The food package of claim 37, wherein the food contact layer has a uniform distribution of myoglobin blooming agent on a food contact surface of the food contact layer.

69. The food package of claim 37, wherein the food contact layer comprises between about 0.1 weight % to about 5.0 weight % of a myoglobin blooming agent incorporated therein.

70. The food package of claim 37, wherein the food contact layer comprises at least about 0.1 weight % of a myoglobin blooming agent incorporated therein.

71. The food package of claim 37, wherein the food contact layer comprises less than 2.0 weight % of a myoglobin blooming agent incorporated therein.

72. The food package of claim 37, wherein the food contact layer comprises between about 0.75 weight % to about 1.75 weight % of the myoglobin blooming agent.

73. The food package of claim 37, wherein the myoglobin blooming agent is present in an amount sufficient to cause a food surface of the myoglobin-containing food product to have a visible red hue at least 10 days after hermetically sealing the myoglobin-containing food product in a vacuum environment.

74. The food package of claim 37, wherein the myoglobin-containing food product is packaged less than 20 days postmortem.

75. The food package of claim 37, wherein the myoglobin-containing food product is packaged less than 12 days postmortem.

76. The food package of claim 37, wherein the myoglobin-containing food product is packaged less than 48 hours postmortem.

77. The food package of claim 37, wherein the myoglobin-containing food product has a water content of at least 40 weight %.

78. The food package of claim 37, wherein the myoglobin-containing food product has a water content of at least 60 weight %.

79. The food package of claim 37, wherein the myoglobin-containing food product has a sodium chloride content of less than 2.0 weight %.

80. The food package of claim 37, wherein the myoglobin-containing food product has a sodium chloride content less than or equal to 1.0 weight %.

* * * * *

UNITED STATES PATENT AND TRADEMARK OFFICE
CERTIFICATE OF CORRECTION

PATENT NO. : 8,741,402 B2
APPLICATION NO. : 11/506322
DATED : June 3, 2014
INVENTOR(S) : Dan G. Siegel et al.

It is certified that error appears in the above-identified patent and that said Letters Patent is hereby corrected as shown below:

Title Page

On the page 4, in column 2, under "Other Publications", line 66, delete "Modidfied" and insert -- Modified --, therefor.

On the page 5, in column 2, under "Other Publications", line 8, delete "Annua" and insert -- Annual --, therefor.

In the Specification

In column 4, line 4, delete "postmortem" and insert -- post-mortem --, therefor.

In column 4, line 16, delete "postmortem" and insert -- post-mortem --, therefor.

In column 4, line 31, delete "postmortem" and insert -- post-mortem --, therefor.

In column 4, line 39, delete "and or" and insert -- and/or --, therefor.

In column 4, line 50, delete "infared" and insert -- infrared --, therefor.

In column 8, line 55, delete "derivitization" and insert -- derivatization --, therefor.

In column 12, lines 6-7, delete "carboxymyoglin" and insert -- carboxymyoglobin --, therefor.

In column 12, lines 12-13, delete "nitrosohaemachromagen," and insert -- nitrosohemochromogen, --, therefor.

In column 14, line 37, delete "(postmortem" and insert -- (post-mortem --, therefor.

In column 16, line 32, delete "postmortem" and insert -- post-mortem --, therefor.

In column 16, line 35, delete "and or" and insert -- and/or --, therefor.

In column 16, line 63, delete "monooxide." and insert -- monoxide. --, therefor.

In column 17, line 6, delete "triphospates" and insert -- triphosphates --, therefor.

In column 18, line 26, delete "postmortem" and insert -- post-mortem --, therefor.

In column 18, line 27, delete "postmortem" and insert -- post-mortem --, therefor.

Signed and Sealed this
Eleventh Day of August, 2015

Michelle K. Lee
*Director of the United States Patent and Trademark Office*

CERTIFICATE OF CORRECTION (continued)
U.S. Pat. No. 8,741,402 B2

In column 18, lines 42-43, delete "postmortem" and insert -- post-mortem --, therefor.

In column 18, line 51, delete "infared" and insert -- infrared --, therefor.

In column 20, line 48, delete "S-nitroylated" and insert -- S-nitrosylated --, therefor.

In column 21, line 65, delete "3-butyroylpyridine," and insert -- 3-butylpyridine, --, therefor.

In column 21, line 66, delete "S-formylpyiridine," and insert -- 3-formylpyridine, --, therefor.

In columns 21-22, line 67 (in column 21) line 1 (in column 22), delete "N - diethyinicotinamide," and insert -- N-diethylnicotinamide, --, therefor.

In column 24, line 34, delete "awhile" and insert -- a while --, therefor.

In column 43, line 40, delete "postmortem" and insert -- post-mortem --, therefor.

In column 44, lines 16-17, delete "myogobin." and insert -- myoglobin. --, therefor.

In column 47, line 30, delete "and or" and insert -- and/or --, therefor.

In column 48, line 58, delete "awhile" and insert -- a while --, therefor.

In column 52, line 65, delete "(Rapauno" and insert -- (Rapuano --, therefor.

In the Claims

In column 58, line 23, in claim 1, delete "and -combinations" and insert -- and combinations --, therefor.

In column 58, line 28, in claim 1, delete "postmortem" and insert -- post-mortem --, therefor.

In column 58, line 43, in claim 3, delete "triphospates" and insert -- triphosphates --, therefor.

In column 58, lines 49-50, in claim 5, delete "postmortem" and insert -- post-mortem --, therefor.

In column 60, line 16, in claim 34, delete "(LOPE)," and insert -- (LDPE), --, therefor.

In column 60, line 17, in claim 34, delete "(HOPE)," and insert -- (HDPE), --, therefor.

In column 60, line 27, in claim 36, delete "45'." and insert -- 45°C. --, therefor In column 60, line 43, in claim 37, delete "postmortem" and insert -- post-mortem --, therefor.

In column 61, line 10, in claim 44, delete "triphospates" and insert -- triphosphates --, therefor.

In column 61, line 17, in claim 46, delete "postmortem" and insert -- post-mortem --, therefor.